United States Patent [19]
Trif et al.

[11] Patent Number: 5,870,731
[45] Date of Patent: Feb. 9, 1999

[54] ADAPTIVE PROBLEM SOLVING METHOD AND SYSTEM

[75] Inventors: Ioan Trif; Niculaie Trif, both of Aylmer, Canada

[73] Assignee: Intellectum Plus Inc., Ontario, Canada

[21] Appl. No.: 790,353

[22] Filed: Jan. 24, 1997

Related U.S. Application Data

[60] Provisional application No. 60/011,056 Jan. 25, 1996.

[51] Int. Cl.$^6$ .................................................. G06F 15/18
[52] U.S. Cl. .............................. 706/52; 706/45; 706/927; 434/118
[58] Field of Search ............................ 434/118; 395/927, 395/61; 706/52, 45

[56] References Cited

U.S. PATENT DOCUMENTS

| | | | |
|---|---|---|---|
| 4,521,199 | 6/1985 | Harte | 434/339 |
| 4,561,852 | 12/1985 | Harte | 434/339 |
| 4,586,905 | 5/1986 | Groff | 434/307 R |
| 5,034,898 | 7/1991 | Lu et al. | 706/62 |
| 5,211,563 | 5/1993 | Haga et al. | 434/322 |
| 5,274,749 | 12/1993 | Evans | 706/55 |
| 5,384,894 | 1/1995 | Vassiliadis et al. | 395/61 |
| 5,627,958 | 5/1997 | Potts et al. | 395/336 |

FOREIGN PATENT DOCUMENTS

| | | | |
|---|---|---|---|
| 2040614 | 10/1991 | Canada | G06F 3/33 |
| 1252810 | 8/1986 | U.S.S.R. | G09B 19/02 |
| 1376272 | 12/1974 | United Kingdom | G09B 7/00 |
| WO 93/02622 | 2/1993 | WIPO | A61B 5/16 |

OTHER PUBLICATIONS

L.W. Hawkes and S.J. Derry, "Error Diagnosis and Fuzzy Reasoning Techniques for Intelligent Tutoring Systems," J. of Artificial Intelligence in Education, vol. 1(2), pp. 43–56, Dec. 1989.

K. Hirosawa, "On–Line Management of Student Progress and Application of Fuzzy Logic," Fujitsu, 42, 5, pp. 501–506. (in Japanese and including an English Language translation), Sep. 1991.

J. Liu, "The Use of Fuzzy Reasoning in Intelligent Computer Aided Instructional Systems," 18th Int'l. Symposium on Multiple–Valued Logic, pp. 346–351, May 1988.

L. W. Hawkes and S.J. Dery, "Error Diagnosis and Fuzzy Reasoning Techniques for Intelligent Tutoring Systems," J. of Artificial Intelligence in Education, vol. 1(2), pp. 43–57, Dec. 1989.

K. Yoon and C. Wang, "Authoring System for the Development of ITS," Proc. 1994 IEEE Region 10's Ninth Annual Int'l. Conf., vol. 1, pp. 97–101, Aug. 1994.

*Primary Examiner*—Robert W. Downs
*Attorney, Agent, or Firm*—McDermott, Will & Emery

[57] ABSTRACT

A computerized learning machine for implementing adaptive problem solving includes an information processing device, a storage device, an output device and an input device. The adaptive problem solving method is implemented by: a) retrieving from the storage device a first question; b) outputting to the output device the first question; c) receiving from the input device an answer from the user; d) assigning a fuzzy logic coefficient to the answer; e) accessing from the storage device a learning route authority to determine the identity of a second question, the determination being dependent on the fuzzy logic coefficient; and f) repeating steps a) to e) for the second question.

11 Claims, 104 Drawing Sheets

KCLR = { {LT$_k$, KE$_i$ }, {MPS}, {SPS} }

WK = {KD$_1$, KD$_2$, ... , KD$_k$, ... , KD$_n$}   with:   k = 1 to n

WK = { Mathematics, Physics, Human Behavior, Biology, Chemistry, Engineering, Medical Science, Political Science, Computer Science, ..., Environmental Science }

A Knowledge Domain contains a set of Knowledge Entities.

$KD_k = \{ KE_1, KE_2, ..., KE_i, ..., KE_u \}$ with: k = 1 to n
i = 1 to u with: i = 1 to 72

A Knowledge Domain contains a set of Knowledge Entities.

Physics = {Rest and Motion, Velocity and Acceleration, ... , Electric Field, ... , Light. Wave or Particle}

A Knowledge Domain can be seen as a set of Learning Tools.

$KD_k = \{ LT_1, LT_2, ..., LT_i, ..., LT_t \}$   with:   $k = 1$ to $n$
$i = 1$ to $t$ with: i = 1 to 9

A Knowledge Domain can be seen as a set of Learning Tools.

Physics = {Force and Motion, Work and Energy, ... , Electricity and Magnetism, ... , Light and Optics}

A Learning Tool is a cluster of related Knowledge Entities.

$LT_k = \{ KE_1, KE_2, ..., KE_i, ..., KE_m \}$   with:   k = 1 to t
i = 1 to m
m < u with: i = 1 to 7

A Learning Tool is a cluster of related Knowledge Entities.

Work and Energy = {Mechanical System, Work, ... ,
 Kinetic Energy, ... , Conservation of Energy}

During the Learning Process, the Knowledge Entities are transferred from KP to KC by Static and/or Dynamic Learning Methods.

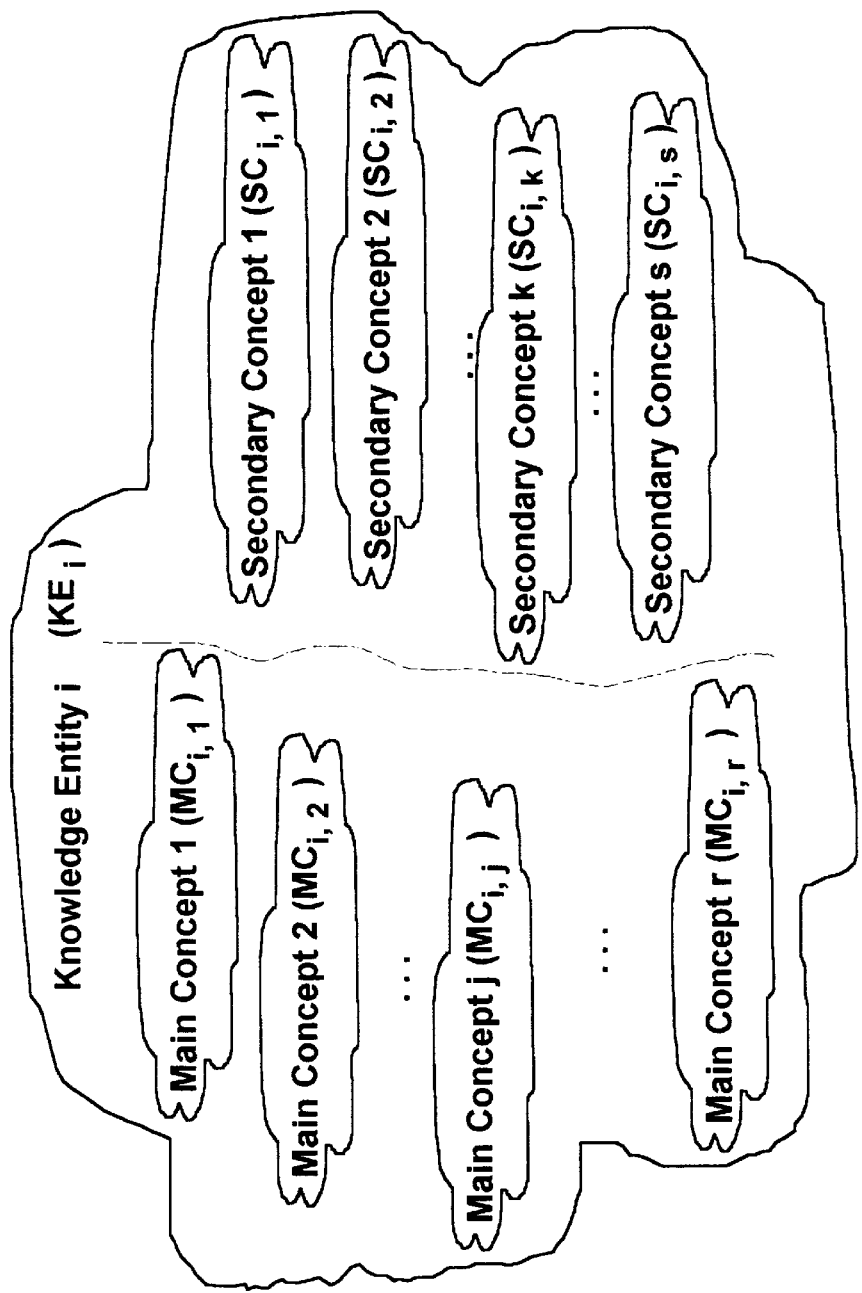

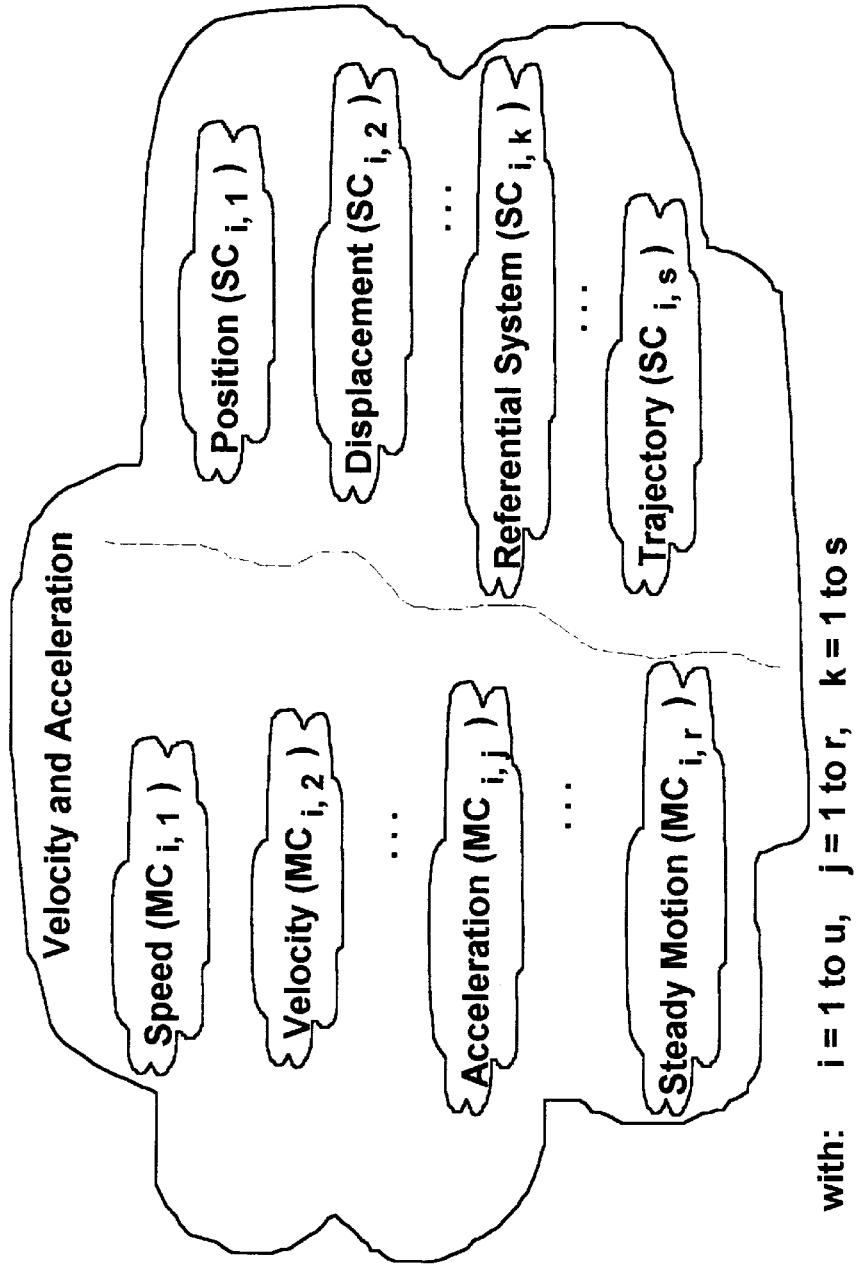

Fig. 11

Static Learning Methods:

- Tutorials
- Figures
- Animation
- Funny Stories
- Real Life Examples
- Video/Sound Clips
- Knowledge Domain Personalities
- Concept Relationships
- Ask Your Teacher
- Tell Your Friends
- Minimum Prerequisite

Fig. 12

Dynamic Learning Methods:
- Interactive Problem Solving
- Interactive Lab Experiments
- Interactive Games A Knowledge Entity has associated the following Sets:

$KE_i$ = { {Problem}, {Lab Experiment}, {Games}, {Funny Stories},
{Real Life Examples}, {Personalities},
{Concept Relationships}, {Ask Your Teacher},
{Prerequisite}, {Sound Clips}, {Animation},
{Tell Your Friends}, {Video Clips}, {Tutorial},
{Figure} } with: i = 1 to u, j = 1 to p

A Knowledge Entity has associated a set of problems:

$KE_i = \{ P_{i,1}, P_{i,2}, \ldots, P_{i,j}, \ldots, P_{i,p} \}$ with: i = 1 to u, j = 1 to p A Problem ( $P_{i,j}$ ) which belongs to a Knowledge Entity ( $KE_i$ ) has two sets of concepts. The elements of these sets belong to the corresponding sets of the $KE_i$, namely the Main Concept and Secondary Concept set.

with:   i = 1 to u,   j = 1 to p

A Problem $P_{i,j}$, has two sets of concepts:

Main Concepts = {Speed, Velocity }
Secondary Concepts = {Trajectory, Position, Time } with: i = 1 to u, j = 1 to o

A Knowledge Entity ( $KE_i$ ) is logically divided into a number of floor ($F_{i,o}$).

The elements of the Problem set ( $P_{i,p}$ ) belonging to ($KE_i$) are unequally distributed on these floors ( $F_{i,j}$ ).

Fig. 17

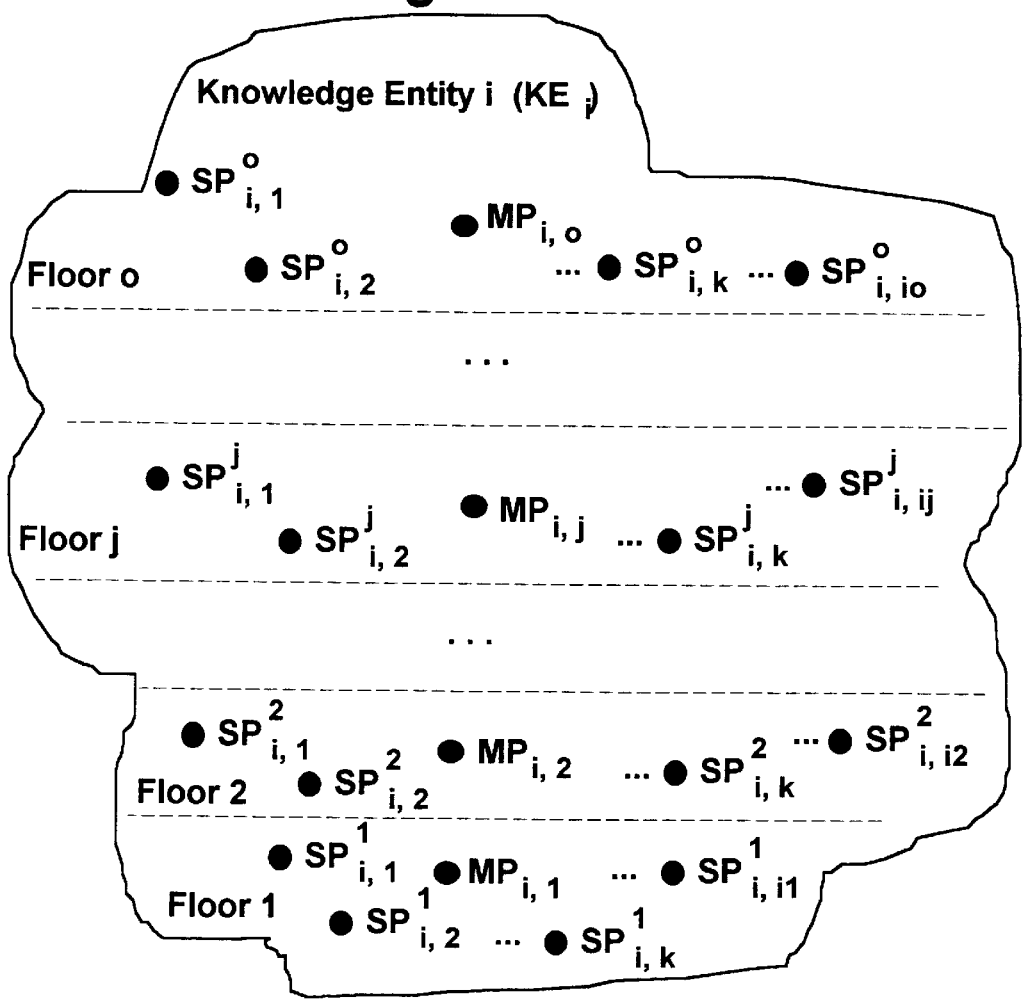

with:  i = 1 to u,   j = 1 to o,   k = 1 to $i_o$

On each floor ( $F_{i,j}$ ) of a Knowledge Entity ( $KE_i$ ) there is a Main Problem ($M_{i,j}$) and a set of Secondary Problems
{ $SP^j_{i,1}, SP^j_{i,2}, ..., SP^j_{i,k}, ..., SP^j_{i,ij}$ }

Notes:

1. The union of all Main Problems ( $MP_{i,j}$ ) that belongs to a Knowledge Entity ($KE_i$) and all its Secondary Problem sets is in fact the problem set ( $P_{i,p}$ ) associated to that ( $KE_i$ ).
2. We call the Main Problem Set (MPS) - the union of all Main Problems of all Knowledge Entities, and Secondary Problem Set (SPS) - the union of all Secondary Problems of all Knowledge Entities.

with: i = 1 to u, j = 1 to o, k = 1 to s, u ≠ r ≠ s

During the Learning Process, as soon as the Knowledge Consumer progresses from one floor to the next, all the Main Concepts that belong to that floor become Secondary Concepts. In other words, the $MC_{i,j}$ undergoes a transformation.

Fig. 19

$$(1) \quad R = \sum_{i=1}^{N-m} \left( A_{N-m}^{i} \sum_{j=1}^{\min(i,m-1)} P_j \right)$$

$$(2) \quad P_j = j! = 1 \cdot 2 \cdot 3 \cdot \ldots \cdot j$$

$$(3) \quad A_n^k = n(n-1)(n-2)\ldots(n-k+1)$$

Where: R - number of Learning Routes
N - total number of problems in the system
m - number of Main Route Problem
min(i , m-1) - minimum value between i and m-1

There are virtually an infinite number of Learning Routes:
- the Shortest Possible Learning Route (SPLR)
- the Longest Possible Learning Route (LPLR), and
- any possible combination which falls in between the two with:  i = 1 to u,   u ≠ $o_1$ ≠ $o_2$ ≠ ... $o_i$ ≠... $o_u$ During the Learning Process:
If a Knowledge Consumer achieves a knowledge transfer efficiency of 100% for each problem concept then, the Shortest Possible Learning Route (SPLR) is followed.

SPLR = {   $MP_{1,1}$, $MP_{1,2}$, ..., $MP_{1,o1}$, $MP_{2,1}$, $MP_{2,2}$, ..., $MP_{2,o2}$, ...,
          $MP_{u,1}$, ... $MP_{u,ou}$ } with: i = 1 to u, k = 1 to m, u ≠ m ≠ $o_1$ ≠ $o_2$ ≠ ... $o_i$ ≠... $o_u$

During the Learning Process:
If a Knowledge Consumer achieves a knowledge transfer efficiency less than 100% for any problem concept then, his/her Learning Route is one of any combination of the Secondary Problems which belong to the current floor and/or any previous floors.

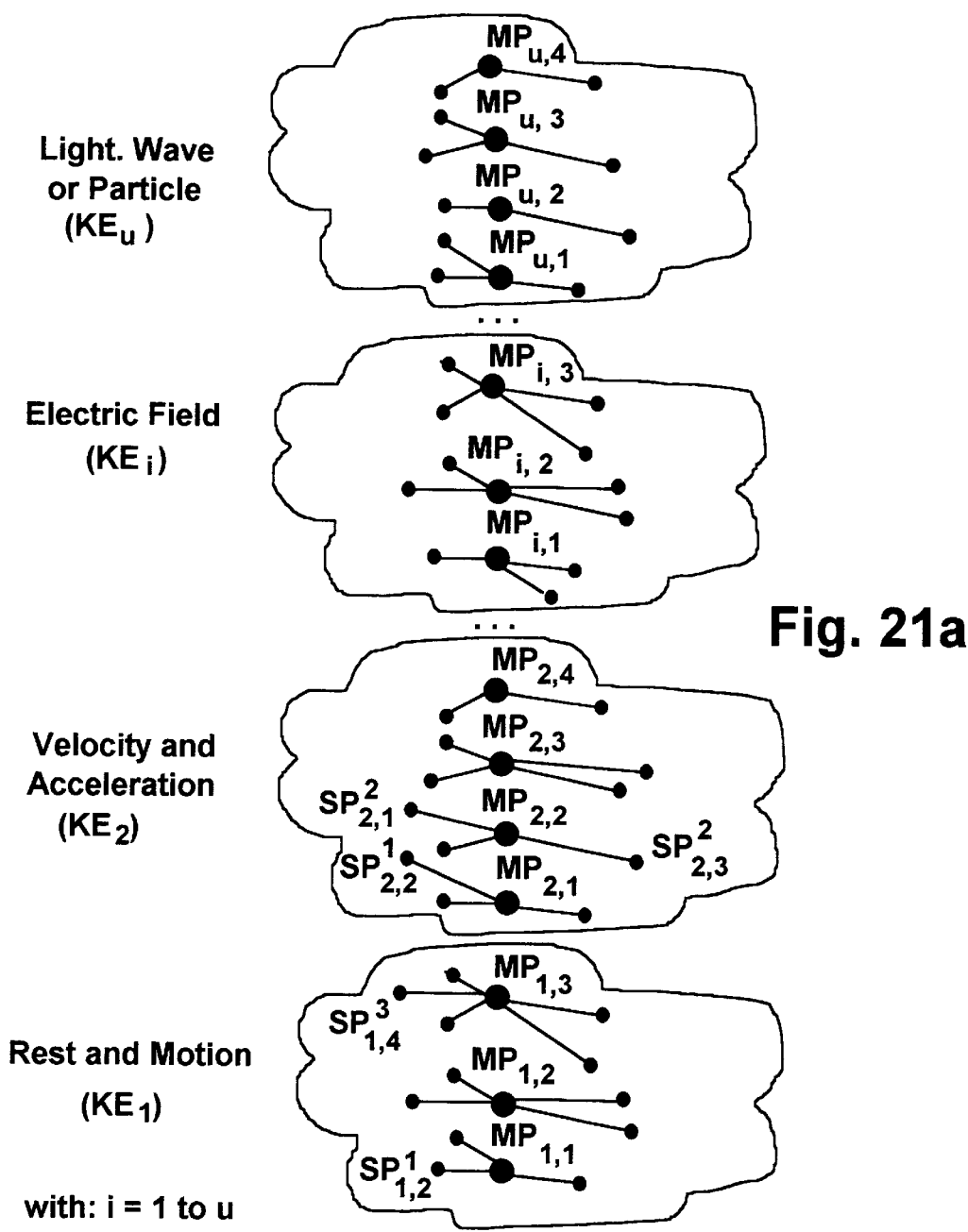

Fig. 21a with: i = 1 to u

During the Learning Process:
Depending on the Knowledge Consumer's Learning abilities, from a Main Problem ($MP_{i,j}$) or a Secondary Problem ($SP^j_{i,k}$) the Learning Route Authority can send him/her to any Secondary Problem of the current floor or any other Secondary Problem which resides on previous floors of the current Knowledge Entity or any previous Knowledge Entity.

Fig. 22

The default Knowledge Consumer Learning Route ( $KCLR_{default}$ ) is associated to the Knowledge Consumer at the time when he/she registers with the system:

$$KCLR_{default} = \{ \{LT_1, KE_1\}, \{MP_{1,1}, MP_{1,2}, \ldots, MP_{1,o1}, \ldots, MP_{2,1}, MP_{2,2}, \ldots, MP_{2,o2}, \ldots, MP_{u,1}, \ldots, MP_{u,ou}\}\}$$

with:     $LT_1$ - the first Learning Tool
            $KE_1$ - the first Knowledge Entity
            $MP_{i,j}$ - Main Problem set The Interactive Problem Solving method transfers each concept ( $MC_{i,j}$ or $SC_{i,k}$ ) from KP to the KC by posing multiple choice questions.

with: i = 1 to u, j = 1 to p, u ≠ p

A Problem ( $P_{i,j}$ ) which belongs to a Knowledge Entity ( $KE_i$ ) has a Question Set. Each element of this set is one of the following types: Analysis ( $Q_A$ ), Resolution ( $Q_R$ ), or Verification ( $Q_V$ ).

The output of each question is one of the following sets:
Facts, Relationships, or Calculations.

The elements of the Facts Set are one of the following type: Known, Unknown.

Fig. 27

Each Problem has:

1. a maximum number of points ($P_{max} = 100$)
2. a set of questions which refers to its main and secondary concepts
3. a set of figures
4. a set of animation scenarios

Fig. 28

Each Question has:

1. a maximum number of points ($Q_{max}$ = 30)
2. a hint message
3. a flag called "First Try"
4. a set of figures
5. a set of animation scenarios
6. a set of four choices

Fig. 29

Each choice has:

1. a Fuzzy Logic Assessment Coefficient (FLAC)
2. a "Why" message
3. a set of figures
4. a set of animation scenarios A choice can be one of the following types:
a) row,  b) column,  c) anywhere

Fig 29a $$(1)\ Q^j = \frac{f^j_{FT} + f^j_{ST}}{2} \cdot Q^j_{max}$$

$$P^j_{max} = \sum_{j=1}^{n} Q^j_{max} = 100 \quad (3)$$

$$(2)\ P^i = \sum_{j=1}^{n} Q^j$$

Where:
n — the number of questions of problem i
$Q^j$ — the number of points obtained for question j
$Q^j_{max}$ — the maximum number of points of question j
$P^i$ — the number of points obtained for problem i
$P^i_{max}$ — the maximum number of points for problem i
$f^j_a, f^j_b, f^j_c, f^j_d$ — the Fuzzy Logic Assessment Coefficients associated to choice a, choice b, choice c, choice d of question j
$f^j_{FT}$ — the Fuzzy Logic Assessment Coefficient obtained at the First Try (one of $f^j_a, f^j_b, f^j_c, f^j_d$)
$f^j_{ST}$ — the Fuzzy Logic Assessment Coefficient obtained at the Second Try (one of $f^j_a, f^j_b, f^j_c, f^j_d$)

Note: At the time when question j is posted the $f^j_{FT}$ and $f^j_{ST}$ are set to 1 (that is: $f^j_{FT} = f^j_{ST} = 1$)

Fig. 29b

| | |
|---|---|
| When the submarine has reached point S, which of the following statements is false? (See Fig. 3) | |
| ⓐ | The submarine has covered a distance of 7 km. |
| ⓑ | The dispalcement of the submarine from the port is 5 km. |
| ⓒ | The submarine has covered a distance of 7000 m. |
| ⓓ | The dispalcement of the submarine from the port is 7 km. |

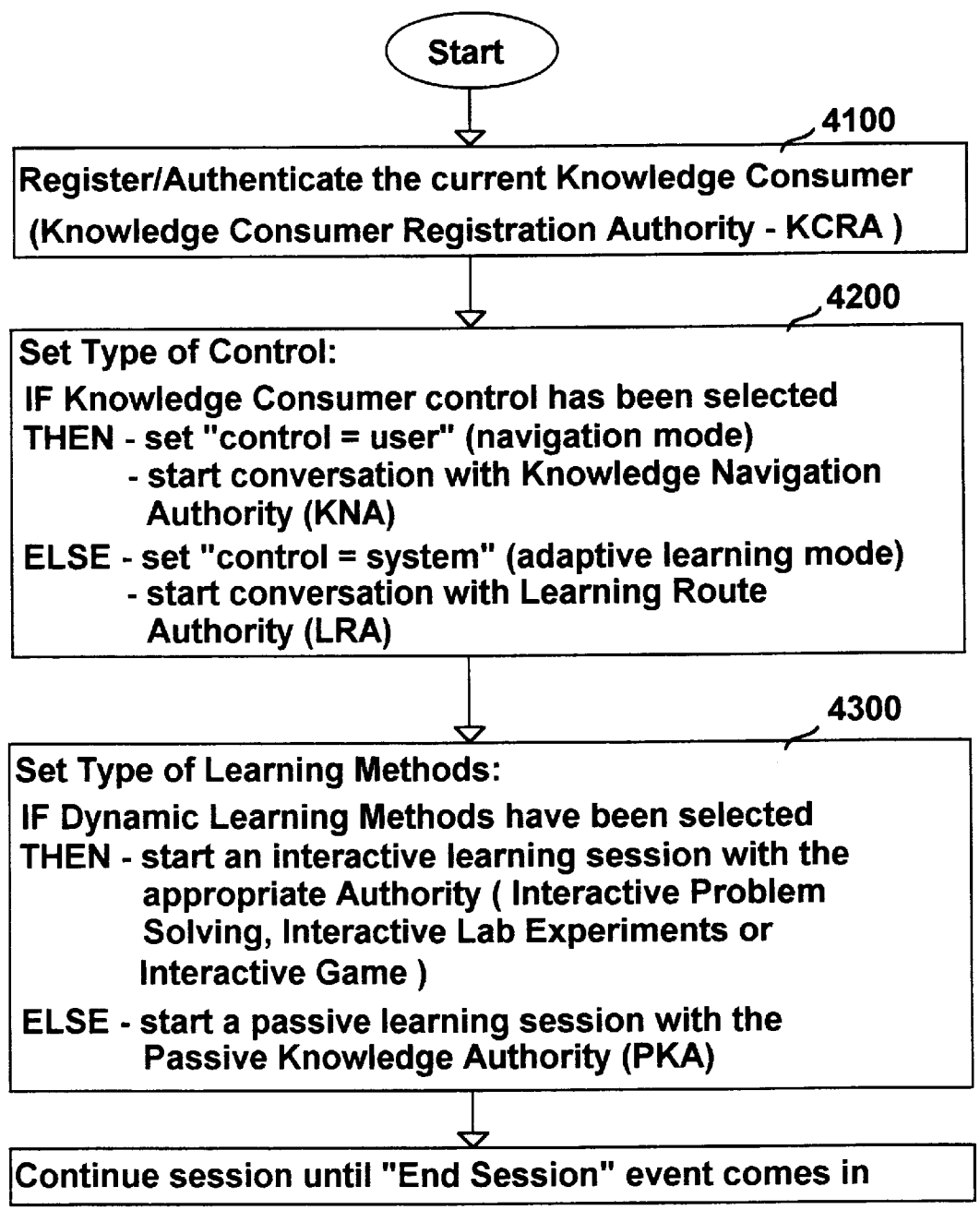

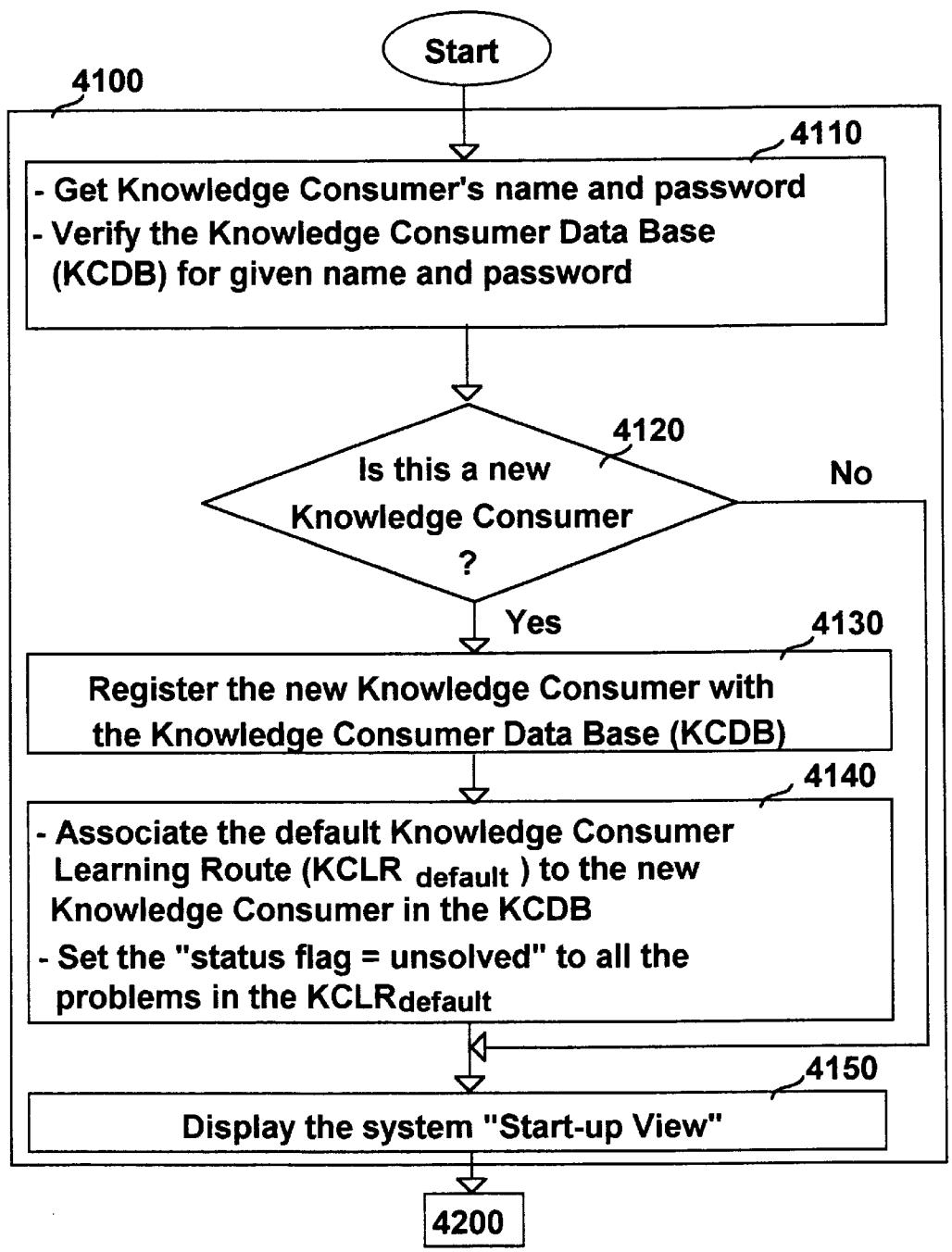

KCLR = { {LT$_k$, KE$_i$}, {MPS}, {SPS} }

KCLR = { {LT$_k$, KE$_i$}, {MPS}, {SPS} }

Fig. 55

Each Lab Experiment has:

1. an info set (title, objective, and the number of tasks)
2. a set of interactive tasks and their associated tables
3. a procedure
4. a theory
5. a set of sample calculations
6. a set of apparatus or instruments
7. a conclusion

Fig. 70

The Learning Process Visual Object criteria:

1. to have a set of "hot areas"
2. to dynamically display the name of a "hot area"
3. to provide means of navigation through the "hot areas"
4. to inspire the iterative nature of the Learning Process
5. to inspire the building nature of the Learning Process

Fig. 71

The Knowledge Entity Visual Object criteria:

1. to have a set of "hot areas"
2. partially and dynamically to display the content of a "hot area"
3. to provide means of navigation through the "hot areas"
4. to inspire the essence of a Knowledge Entity
5. to show the "hot areas" relationships

Fig. 72

The Dynamic Learning Route Visual Object criteria:

1. to build dynamically the Knowledge Consumer Learning Route at the Knowledge Entity level or at the Knowledge Repository level (system scope)

Fig. 73

The Dynamic Visual Assessment Object criteria:

1. from the first step of a particular task to show the total number of steps and their value
2. to inspire the incremental nature of executing a task
3. to dynamically update itself after the execution of each step with the assessment made to the step

Fig. 74

The Problem Solving Summary Visual Object criteria:

1. To make a visual statement by showing:
    a) the known and unknown facts (input)
    b) the relationships among facts
    c) the reasoning steps made to solve the problem
    d) the outcome or conclusion (output)

Problem Solving View

Analysis and Resolution

A submarine departs from a port and travels on the surface of the water 3 km towards east, 4 km towards south, and then submerges 200 m (Fig. 1). Assuming that the submersion was vertical, analyze the motion of the submarine.

| Problem | Facts | Relationships | Calculations | ◁▷ |

When the submarine has reached point S, which of the following statements is false? (See Fig. 3).

ⓐ The submarine has covered a distance of 7 km.
ⓑ The displacement of the submarine from the port is 5 km.
ⓒ The submarine has covered a distance of 7000 m.
ⓓ The displacement of the submarine from the port is 7 km.

Figures and Animation

P —— 3 km —— E
                    |
                    | 4 km
                    |
                    S $PS^2 = PE^2 + ES^2$

| Fig1 | Fig2 | Fig3 | Animation △ |

Score: Q1 Q2 Q3 Q4 Q5 Q6 Q7

Character: The submarine traveled 3 km due east, and 4 km due south.

| Hint ! | Why ? | Take Answer | Refine |
| ▷▷Next | ◁◁Previous | Summary | |

ADAPTIVE PROBLEM SOLVING METHOD AND SYSTEM

This application claims the benefit of U.S. Provisional Application Ser. No. 60/011,056, filed Jan. 25, 1996.

BACKGROUND OF THE INVENTION

The present invention relates to an intelligent computer assisted learning system and an adaptive problem solving method in which blocks of knowledge (referred to as "Knowledge Entities", herein-below) are transferred from the system (referred to as the "Knowledge Provider", herein-below) to the learner (referred as the "Knowledge Consumer", herein-below).

The rapid advances made by computers and in related fields, such as, Object Oriented Methodology, Artificial Intelligence, and the Event Driven Systems have provided a great opportunity to utilize these devices in the areas of education and training in homes, schools, and corporations.

The Related Art, often referred to as Computer Aided Instruction Systems, is classified into three configuration types, namely, 1) center system, 2) network system, and 3) stand-alone system.

1) At the heart of a center system is a host computer which stores the learning material and has total control. The Knowledge Consumer accesses this material via a terminal or a personal computer connected to the host computer.

2) In a network system (a host computer may, or may not be present), the control resides with the computers connected to the network. The learning material may be stored by the host computer (if this exists) or on a specialized system called a server.

3) For a stand-alone system everything is self-contained within that system, including the teaching material and the control. The Knowledge Consumer interacts directly with the system by different input-output devices attached directly to the system.

The above configurations of the Computer Aided Instruction Systems have been described in more detail by Haga et al. in the U.S. Pat. No. 5,211,563, dated May 18, 1993.

The present invention is a stand-alone system belonging to the third category noted above.

SUMMARY OF THE INVENTION

Today, education has become central an important focus for all levels of government in their search for new ways of coping with the dramatic changes taking place in our society. These continuous-changes are fuelled daily by new technological advances, processes, methods, and discoveries which create an enormous stress on everyone. Many governments are aware that tomorrow's competitive edge belongs to societies which have well educated work forces, particularly in the technological field, which is based on math and science. As a result, steps are being taken, at both macro and micro levels, by the appropriate authorities (example: Provincial Governments and Boards of Education in Canada, and State Boards of Education in the United States), to find and implement new approaches to the education system.

It is, therefore, one objective of the present invention to provide an effective solution for improving the education system as a whole by improving the efficiency and the quality of the Learning Process at the individual input level, namely, at the Knowledge Consumer level. The present invention is a direct response to some of the findings, observations, and recommendations reported by The US National Association of State Boards of Education in the report entitled "Math & Science, It All Adds Up!— Education Policies for the Future" researched and written by David Kysilko and Janice Earle, and published in 1990.

The present invention provides an adaptive problem solving method, which is relative to the Knowledge Consumer's abilities and which combines a set of static learning methods with a set of dynamic learning methods. The specialized knowledge stored in the system is transferred during the Learning Process, at the Knowledge Consumer's own pace, by these static or dynamic methods. For the dynamic problem solving method, the efficiency of the knowledge transfer is evaluated by the system at each step, and the result obtained is used by the adaptive method (presented herein-below) for building up the learning route for that particular Knowledge Consumer. The system remembers the individual learning route of every Knowledge Consumer registered with the system.

The knowledge stored in the system is organized around the concept of "Knowledge Entities" which represent pieces of related knowledge transferred to the Knowledge Consumer in a static or dynamic way. In order to facilitate this knowledge transfer the system makes use of visual objects, interactive visual objects, problems, explanations, funny stories, real life examples, lab experiments, and games. The Knowledge Consumer is provided with a choice of several different levels of knowledge navigation from the system scope (where all the stored knowledge can be browsed and any item selected) to the Knowledge Entity or problem scope. The navigation means presented by this invention are based on visual objects and give the Knowledge Consumer an opportunity to see the knowledge contained in the system in a very efficient way.

One objective of the present invention is to provide a means of learning assessment which mimics as close as possible the way in which humans perform such activity. This has been achieved by associating fuzzy logic coefficients to some blocks of knowledge being transferred to the Knowledge Consumer. These coefficients are used by the system to calculate and determine a more accurate final assessment.

Another objective of the present invention is to provide means of human like interaction between the Knowledge Consumer and the system. This has been achieved by an event driven system capable of processing events generated from different sources, an adaptive problem solving method, and a visual interface, all working together as a unit.

The system also provides means of knowledge dissemination, curiosity development, learning problem solving skills, developing analysis and resolution skills, and focusing on concept understanding rather than memorization of terms, facts, and formulas.

The present invention also contributes to what is known as the Graphical User Interface (GUI) component of a system. In many existing Computer Aided Instruction Systems, the GUI interface is presented to the Knowledge Consumer as a set of screen areas called windows where the information is displayed. The interface presented by the present invention goes a step further by providing visual objects as a means of interaction. For example, ideas such as the Learning Process, the Learning Route, Dynamic Assessment and Knowledge Entity are visualized. The actual navigation activity uses some of these visual objects and has the following advantages: 1) it improves the efficiency of the knowledge transfer by presenting, in a visual form, ideas which usually are not easy to explain; and 2) the real estate of the screen is used very efficiently because far more information is presented per square inch.

BRIEF DESCRIPTION OF THE DRAWINGS

FIG. 10 illustrates a Knowledge Entity as two sets of concepts: Main Concept and Secondary Concept set.

FIG. 10a is an example of Main and Secondary concepts associated to the Velocity and Acceleration knowledge entity.

FIG. 11 is a diagram showing the possible forms of knowledge encapsulation suitable for the Static Learning Methods.

FIG. 12 is a diagram showing the possible forms of knowledge encapsulation suitable for the Dynamic Learning Methods.

FIG. 17 shows the problem distribution on the Floors.

FIG. 19 is a diagram showing the possible Learning Routes in the Problem space.

FIG. 21a is an example of a Learning Route which might be achieved by a Knowledge Consumer in the Knowledge Domain of Physics.

FIG. 22 is a diagram showing the default Learning Route associated to each Knowledge Consumer at the time of registration.

FIG. 27 is a diagram showing the main components associated to a Problem.

FIG. 28 is a diagram showing the main components associated to a Question.

FIG. 29 is a diagram showing the main components associated to a Choice.

FIG. 29a shows how the number of points obtained for a question and for a problem is calculated.

FIG. 29b is an example of a Row type Choice.

FIG. 30 illustrates the high level flowchart describing how an embodiment of the present invention works.

FIG. 31 is a more detailed flowchart of step 4100 of the high level flowchart depicted by FIG. 30.

FIG. 55 is a diagram showing the main components associated with a Lab Experiment.

FIG. 70 is a diagram showing the criteria for the Learning Process Visual Object.

FIG. 71 is a diagram showing the criteria for the Knowledge Entity Visual Object.

FIG. 72 is a diagram showing the criteria for the Dynamic Learning Route Visual Object.

FIG. 73 is a diagram showing the criteria for the Dynamic Visual Assessment Object.

FIG. 74 is a diagram showing the criteria for the Problem Solving Summary Visual Object.

FIG. 77 is an example of the Knowledge Entity View screen for the Knowledge Domain of Physics.

FIG. 78*a* is an example of the Interactive Problem Solving View screen for the Knowledge Domain of Physics.

DETAILED DESCRIPTION OF THE INVENTION

Figure 1:
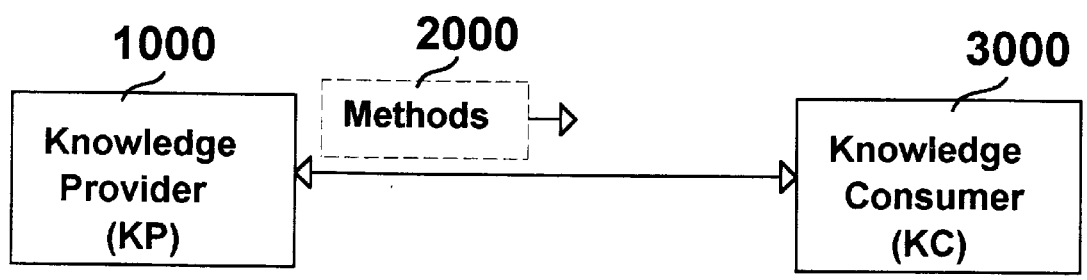
FIG. 1 illustrates the Learning Process model.

Referring now to the drawings, a detailed description will be given of one possible embodiment of the present invention.

FIG. 1 represents the Learning Process Model which forms the foundation of the present invention. In this model, two parties, the Knowledge Provider 1000 and the Knowledge Consumer 3000, interact with each other for the purpose of knowledge transfer. The Learning Process can be dramatically improved by a set of methods 2000 deployed by the Knowledge Provider. It should be noted that the subject of the present invention is the Knowledge Provider 1000 and the Methods 2000.

With regard to the Learning Process Model described above the following examples are given: a) Knowledge Providers—human experts, books, magazines, Knowledge Consumer's every day environment, computer systems, radio, television; b) Methods—the way the knowledge is structured, the way the knowledge is transferred to the Knowledge Consumer (dynamic or static), the way the knowledge is presented to the Knowledge Consumer (textual, visual, sound objects, or any combination of those), the way the Knowledge Consumer is involved in the knowledge transfer (a step by step approach or a start and stop approach); c) Knowledge Consumers—humans, computer systems, robots, some animals.

Figure 2:
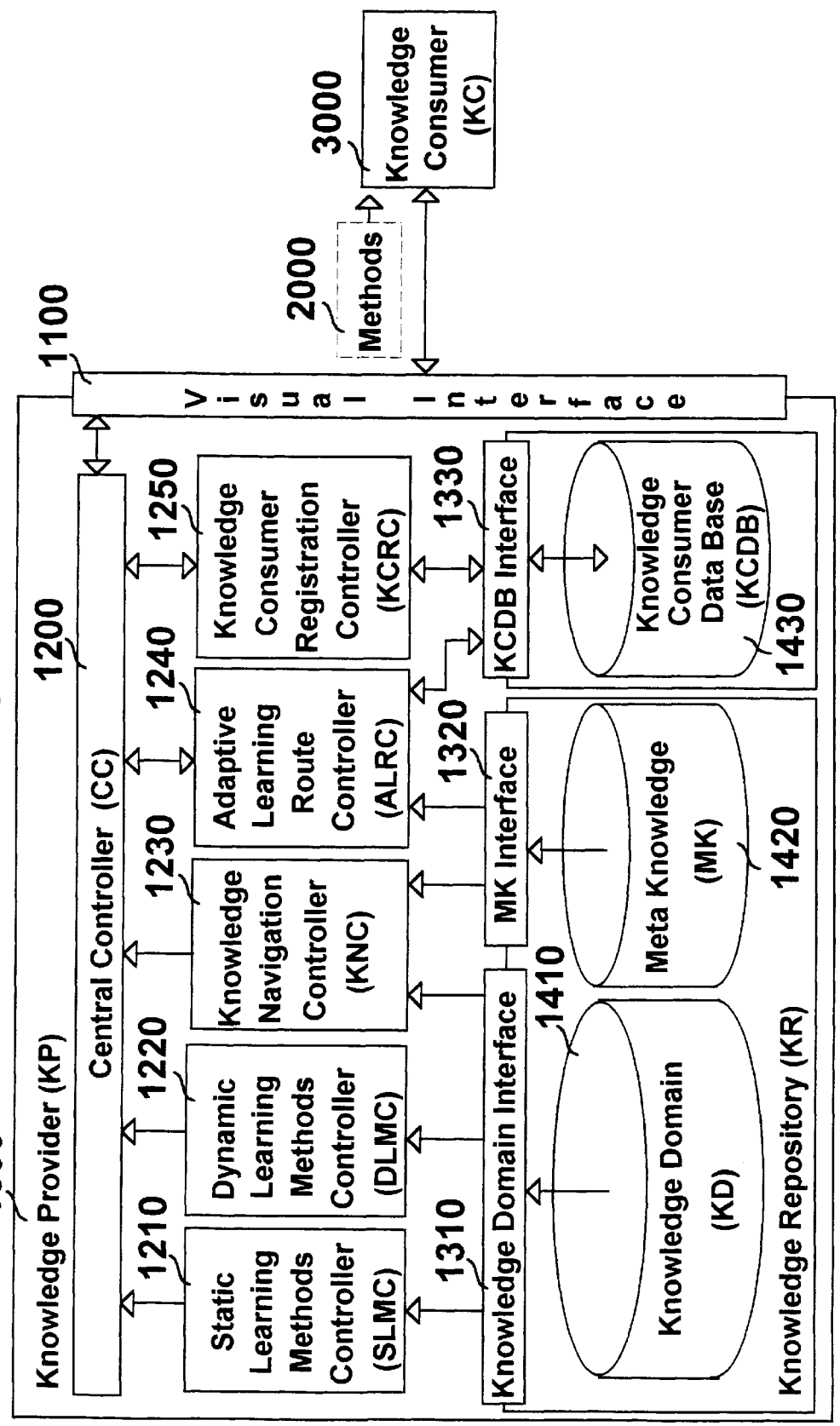
FIG. 2 is a schematic block diagram illustrating an Adaptive Problem Solving system according to an embodiment of the present invention.

FIG. 2 is a schematic diagram of an Adaptive Computer System Knowledge Provider which represents one embodiment of the present invention. It is called adaptive because, during the Learning Process, depending on the Knowledge Consumer's learning abilities, the system selects the most suitable learning route.

At the heart of the system is a Central Controller 1200 which communicates directly with a Visual Interface 1100 and a set of specialized controllers: Static Learning Methods Controller 1210, Dynamic Learning Methods Controller 1220, Knowledge Navigation Controller 1230, Adaptive Learning Route Controller 1240, and Knowledge Consumer Registration Controller 1250.

The Knowledge Repository is a specialized storage of knowledge with two main components: Knowledge Domain

1410 and Meta Knowledge 1420. Its content can be represented by either relatively old approaches—like production rules, semantic networks, frames, or relational tables—or the new approach called object-oriented methodology. A discussion with regard to the use of rules vs. frames vs. semantic networks is presented in "A Hierarchical Expert System for Computer Process Control", (August 1988) Dept. of Electrical Engineering, University of Ottawa, Ontario, Canada, pages 42–46. Moreover, object-oriented modelling, analysis, and design methodologies are described by Kemper, Heinrich, et al. in "Object-oriented Database Management. Applications in Engineering and Computer Science" (Englewood Cliffs, N.J. Prentice-Hall, 1994).

One objective of the present invention is to provide means of easy coupling and de-coupling of the Knowledge Repository from the rest of the system. This has a very important benefit with regard to the speed of building new systems. That is, in order to build a new system, one only needs to provide a new specialized Knowledge Repository and "plug it in" to the existing system. To attain this objective, two interfaces are provided: Knowledge Domain Interface 1310 and Meta Knowledge Interface 1320. It is obvious that these two interfaces always expect the same internal structure of attachments, namely, the Knowledge Domain and the Meta Knowledge.

The Knowledge Domain component 1410 contains specialized knowledge on different subjects of interest to the Knowledge Consumer and is organized around the concept of "Knowledge Entity". A Knowledge Entity is a well defined block of the Knowledge Domain which has associated and gathered together problems, tutorials, lab experiments, funny stories, etc. A Knowledge Domain is divided into a set of Knowledge Entities by experienced teaching experts of that particular field.

The Meta Knowledge component 1420 contains knowledge about the Knowledge Domain, how it is organized and how different pieces of knowledge are related. It also contains information about all possible Learning Routes a Knowledge Consumer can take during the Learning Process.

The Knowledge Consumer Data Base component 1430 provides means for allowing multiple user access of the system. Each time a Knowledge Consumer registers with the system a new version of this component is created. All the private data, such as a Knowledge Consumer's Learning Route and performance, is stored in the new version of this component. In other words, the Knowledge Consumer Data Base is used by the system as a recall mechanism so that the next time the same Knowledge Consumer initiates a session with the system, the Learning Process continues from the same point at which it was previously interrupted.

Figure 2A:
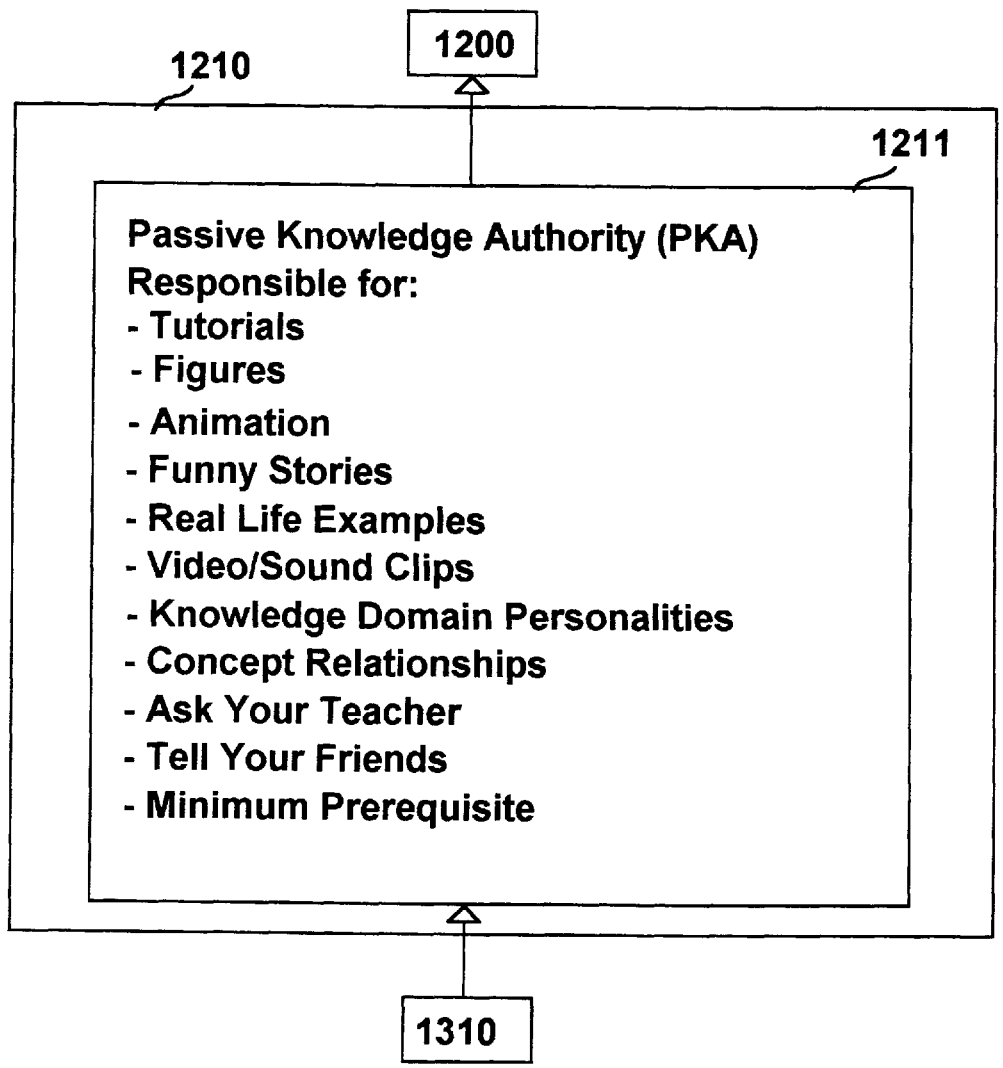
FIG. 2a is an inside view of the box 1210 of FIG. 2.

The Static Learning Methods Controller 1210, which is depicted in more detail in FIG. 2a, is responsible for all the Static Learning Methods described by this invention. In a Static Learning Method the Knowledge Consumer has a passive role during the knowledge transfer in terms of interaction with the Knowledge Provider. The Knowledge Provider just extracts the requested piece of knowledge from the Knowledge Repository and presents it to the Knowledge Consumer in its associated screen. From this point, the control of the knowledge transfer is left to the Knowledge Consumer. The system does not know the efficiency of this transfer or even if the transfer actually occurred. For a Static Learning Method, there is no continuous, step by step dialog between the system and the Knowledge Consumer. The only interaction is one of pause, resume, or stop the knowledge transfer.

The present invention proposes the following as examples of possible Static Learning Method: a) Tutorials—a Knowledge Entity has an associated tutorial set to provide an introduction; b) Figures—this is a set of all figures of all problems and tutorials associated to a Knowledge Entity; c) Animation—this set contains all animation scenarios of all problems and tutorials associated to a Knowledge Entity; d) Funny Stories—a set of funny stories that presents in a funny way the most important aspects of a Knowledge Entity; e) Real Life Examples—a set of animated scenarios which show how and where the most important concepts associated to a Knowledge Entity are encountered in everyday life; f) Video and Sound Clips—a set composed of video and sound objects associated to a Knowledge Entity; g) Knowledge Domain Personalities—a set of biographies and pictures of the experts who contributed, by way of observations, work, and discoveries to that particular Knowledge Domain; h) Concept Relationships—a set of relationships that exist among all concepts associated to a Knowledge Entity; i) Minimum Prerequisite—a set of statements describing the minimum knowledge, a Knowledge Consumer should have in order to successfully absorb a Knowledge Entity; j) Ask Your Teacher—a set of advanced questions associated with a Knowledge Entity. The idea behind this method is to get the human Knowledge Provider, namely the teacher, involved in the Learning Process even when the Knowledge Consumer, namely the student, uses a computer system for his/her knowledge acquisition; k) Tell Your Friends—a set of suggestions to form the basis of discussions among the Knowledge Consumers and their friends, parents, and relatives with regard to the concepts presented by a Knowledge Entity. The idea behind this method is to spread out knowledge, that is, to activate and facilitate the creation of a learning environment in the most elementary cells of society, namely, family and friends. The Static Learning Methods described above are located in the Passive Knowledge Authority 1211 of FIG. 2a jurisdiction.

Figure 2B:
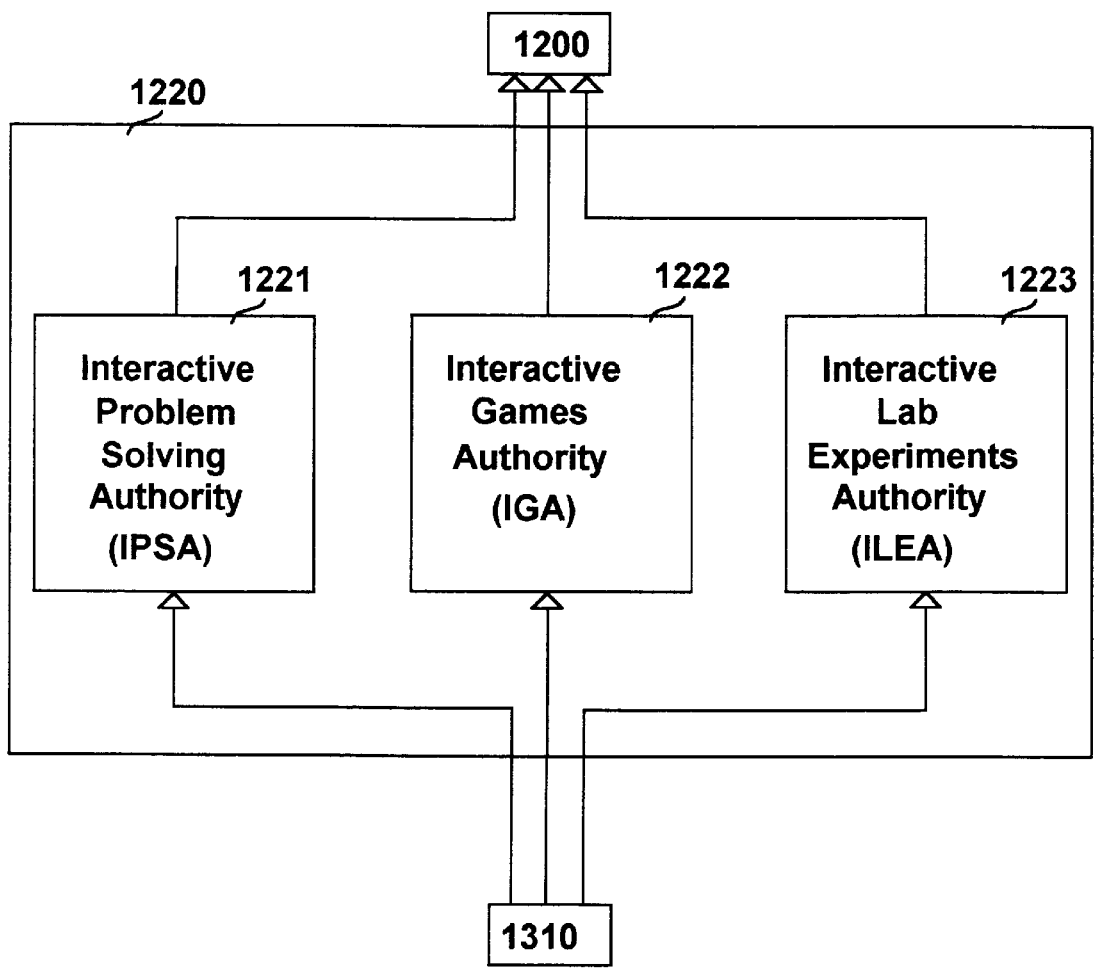
FIG. 2b is an inside view of the box 1220 of FIG. 2.

The Dynamic Learning Methods Controller 1220, which is shown in more detail in FIG. 2b, is responsible for all the Dynamic Learning Methods proposed by the present invention. This type of learning method is highly interactive. The knowledge transfer is a continuous, step by step dialog between the system and the Knowledge Consumer. After each step the efficiency of the transfer is analyzed by the system and the result is used for determining the best Learning Route to be used for the Knowledge Consumer.

The following Dynamic Learning Methods are several possible examples proposed by the present invention: a) Problem Solving—a Knowledge Entity has associated a set of problems specific to the Knowledge Domain. During the Learning Process, each problem is solved by the Knowledge Consumer, in a step by step fashion, with help from the system. One objective of this invention is to make this Problem Solving Process very interesting and to have it mimic the natural way humans solve everyday problems. This is accomplished by the Interactive Problem Solving Method which falls under the control of the Interactive Problem Solving Authority 1221 shown by FIG. 2b, and is presented herein-below. b) Lab Experiments—a Knowledge Entity has associated a set of lab experiments which facilitate the understanding of its main concepts. An Interactive Lab Experiment Method is also presented herein-below by the present invention. It should be noted that the lab experiments are controlled by the Interactive Lab Experiments Authority 1223 of FIG. 2b. c) Games—a Knowledge Entity has associated a set of games designed in a way to communicate to the Knowledge Consumer the essence of the Knowledge Entity. It should be noted that the objective is simply to incorporate this type of dynamic method as a means of knowledge transfer and not to present an Interactive Game Method. Such a method shall be controlled by the Interactive Games Authority 1222 of FIG. 2b. Examples of games which may satisfy these requirements are described by the U.S. Pat. Nos. 4,407,502 and 4,428,581.

Figure 2C:
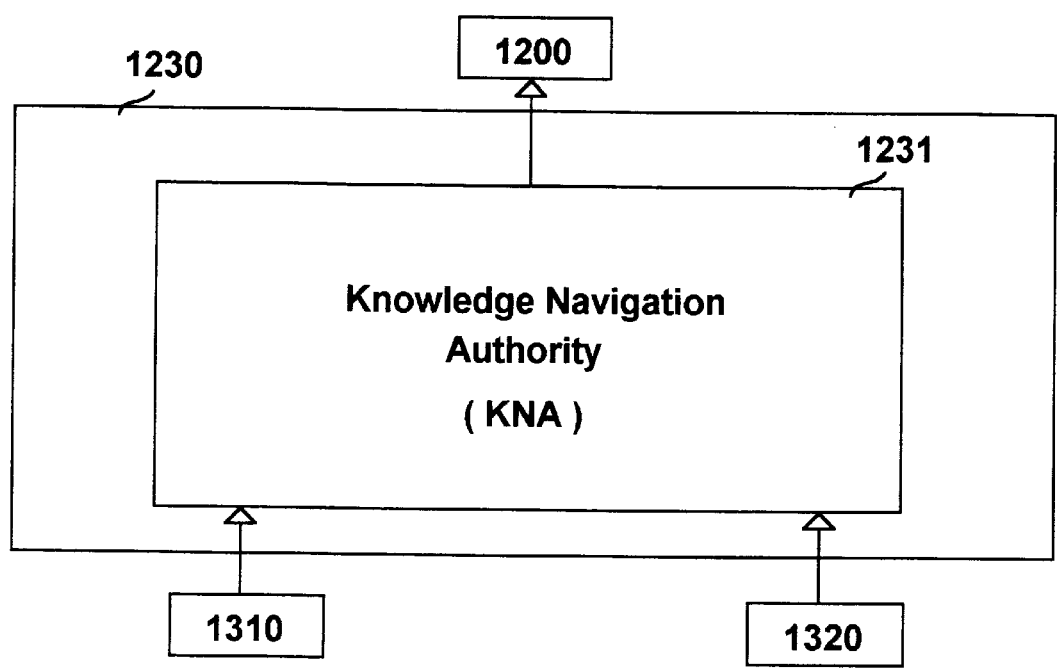
FIG. 2c is an inside view of the box 1230 of FIG. 2.

The Knowledge Navigation Controller 1230, which is depicted in more detail in FIG. 2c, is the component that allows the Knowledge Consumer to surf the content of the Knowledge Repository. It is connected to the Knowledge Domain 1410 and the Meta Knowledge 1420 through the appropriate interface, namely, box 1310 and 1320 respectively. The activities related to knowledge navigation all fall under the jurisdiction of the Knowledge Navigation Authority 1231.

Figure 2D:
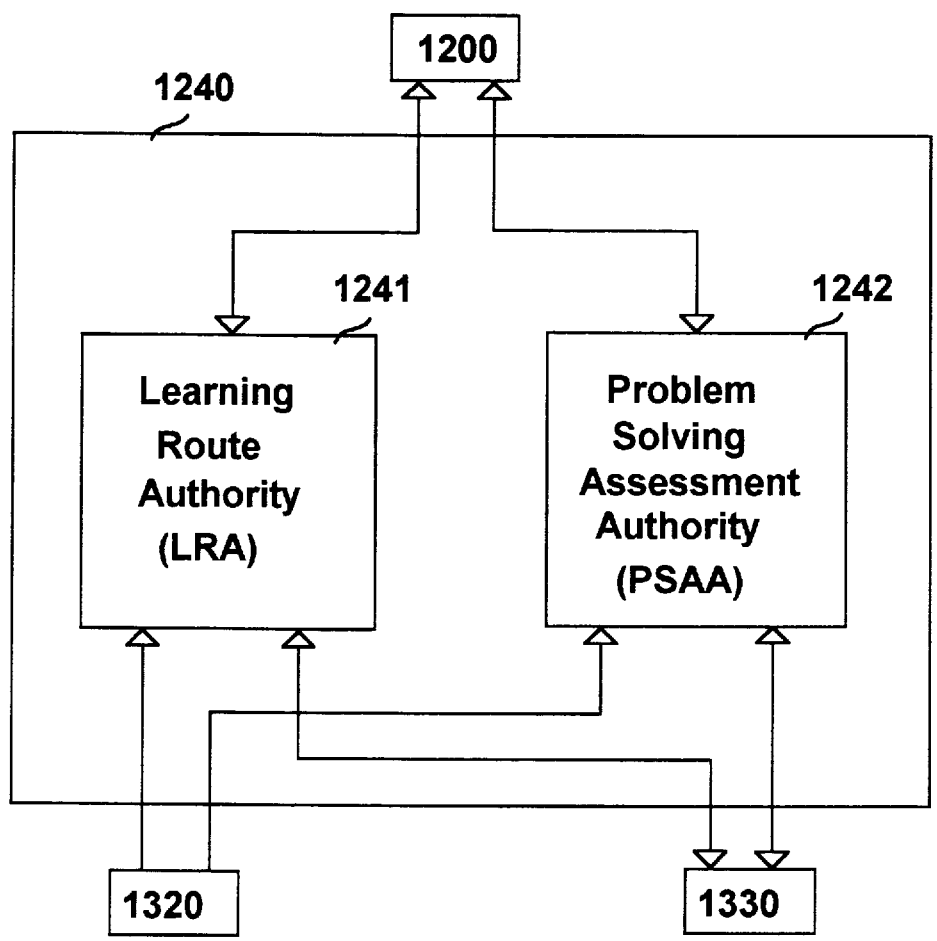
FIG. 2d is an inside view of the box 1240 of FIG. 2.

The Adaptive Learning Route Controller 1240, which is shown in more detail in FIG. 2d, is responsible for dynamically building the Knowledge Consumer's Learning Route by using the assessment results of each step made during the Problem Solving Process. All these activities are coordinated by the Central Controller 1200 and executed by the Learning Route Authority 1241 and the Problem Solving Assessment Authority 1242 respectively.

Figure 2E:
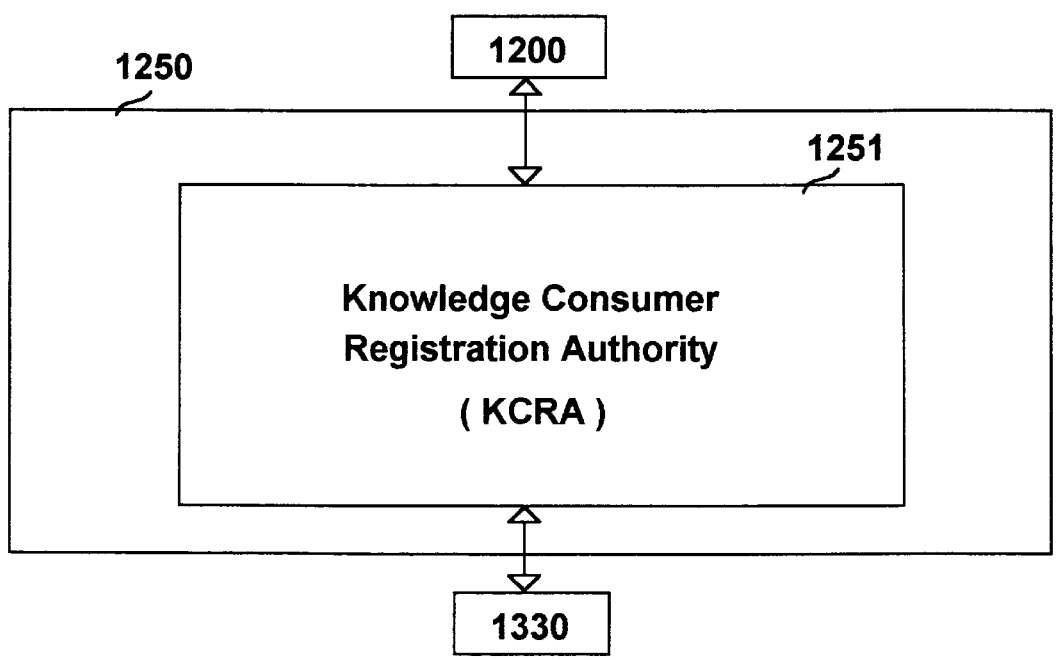
FIG. 2e is an inside view of the box 1250 of FIG. 2.

The Knowledge Consumer Registration Controller 1250 which is depicted in more detail in FIG. 2e, is responsible for the Knowledge Consumer registration and authentication activities. It accesses the Knowledge Consumer Data Base component 1430 through the Knowledge Consumer Data Base Interface 1330.

The Visual Interface 1100 is the communication link between the Knowledge Consumer and the Knowledge Provider. It is represented by a collection of screens that contain visual objects. The Knowledge Consumer can interact with these objects by means of keyboard, pointing devices, and voice processing devices. At the same time, the Visual Interface provides to the Knowledge Consumer a means for looking deep into the content of the Knowledge Repository 1310 and 1320.

Figure 3:
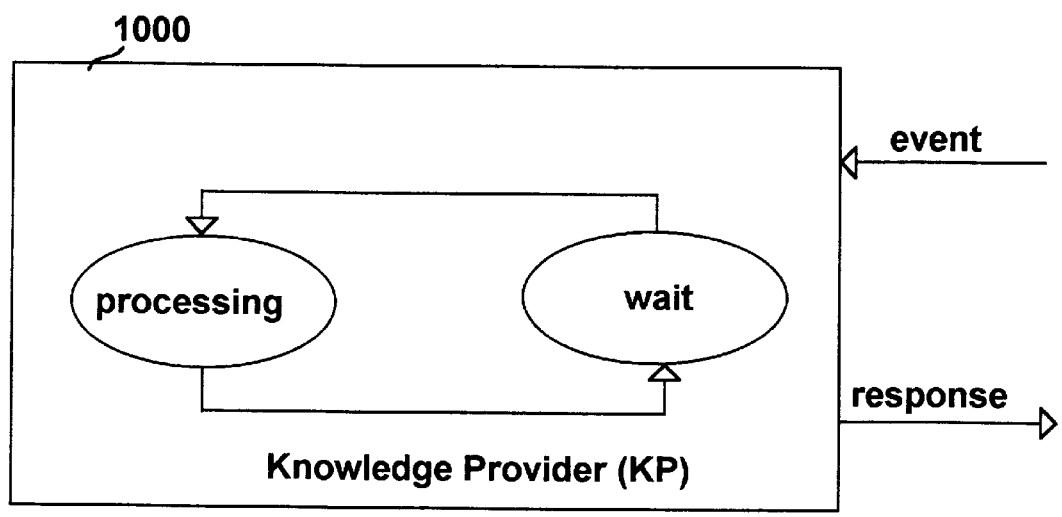
FIG. 3 shows an event driven system, its main internal states, inputs, and outputs.

FIG. 3 illustrates that the Knowledge Provider system 1000 described by the present invention is an event driven system with two main internal states—wait and processing. The events are generated by different sources, such as: keyboard, pointing devices and voice processing devices. The responses to these events take different forms such as presenting or moving visual objects on the system display, generating sound objects, or displaying the conclusion of a reasoning activity.

Figure 4:
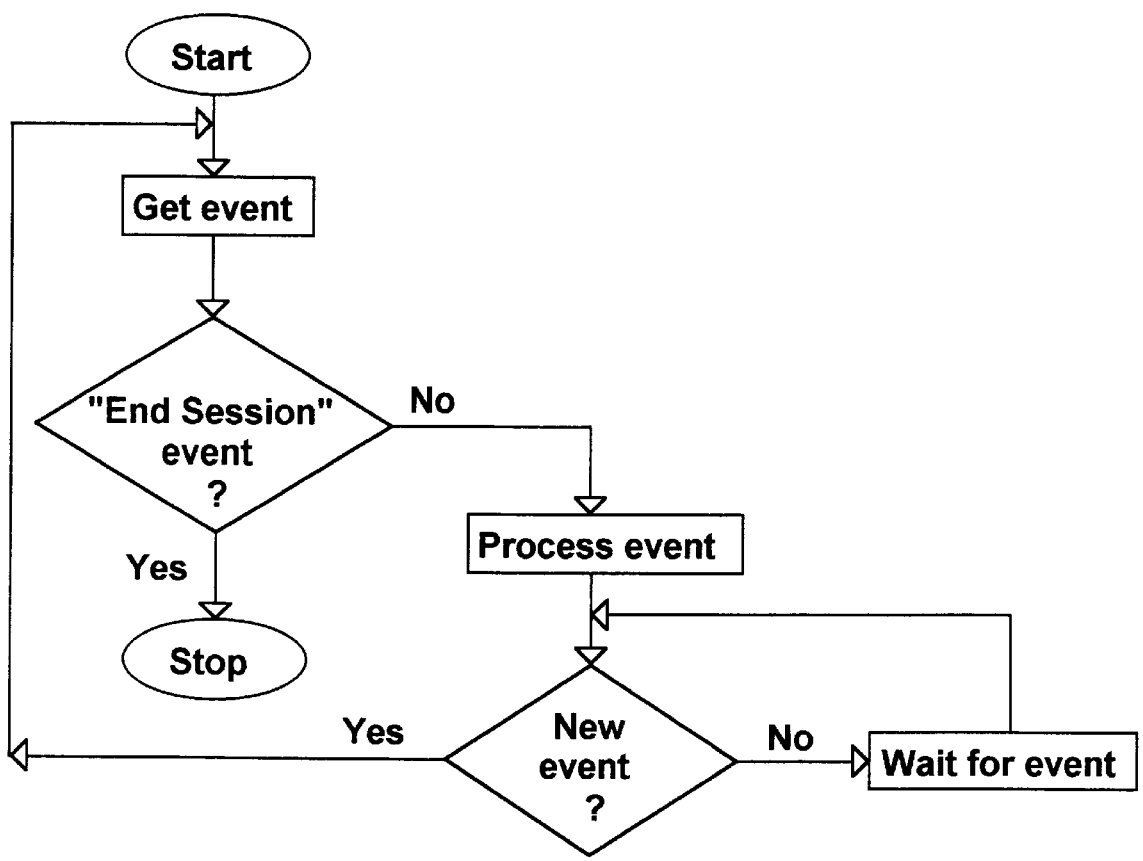
FIG. 4 is a high level flowchart explaining the functionality of an event driven system.

FIG. 4 explains the functionality of an event driven system. It should be pointed out that all of the events arriving during the system processing state are queued in a system queue for later processing. The system always takes first events from the queue (if any) for processing.

Figure 5:
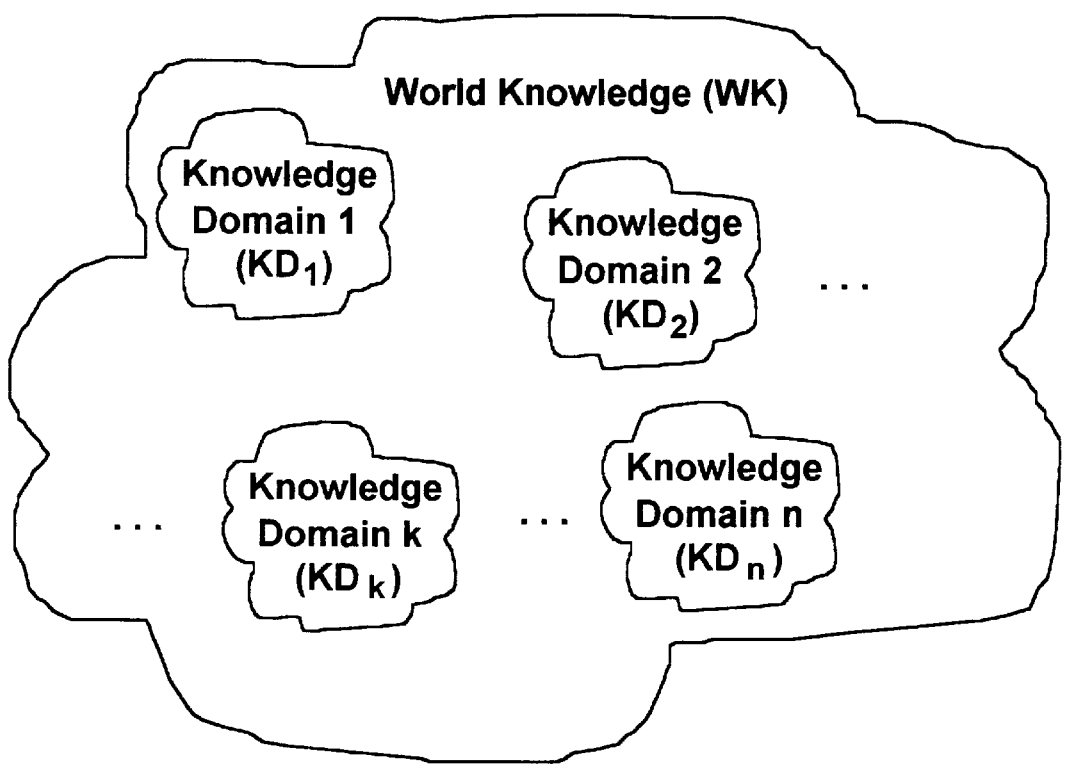
FIG. 5 depicts the logical grouping of World Knowledge into Knowledge Domains.
Figure 5A:
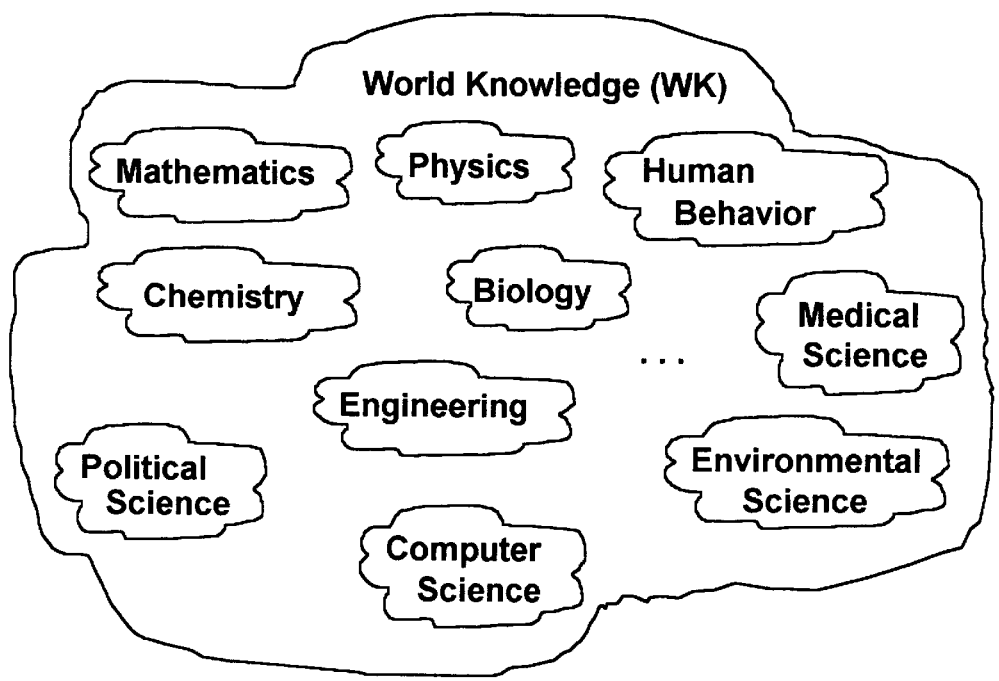
FIG. 5a is an example of Knowledge Domains.

FIG. 5 shows how the knowledge accumulated by humanity over the years, the World Knowledge, is logically divided into Knowledge Domains. An example of one possible logical division is depicted by FIG. 5a.

Figure 6:
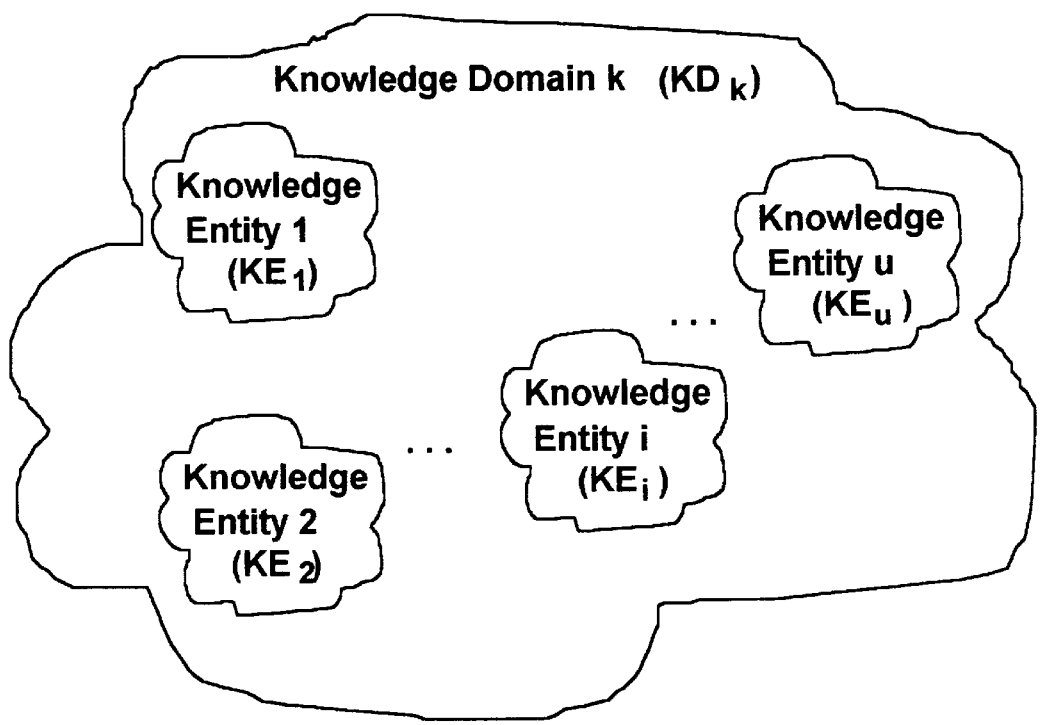
FIG. 6 shows a Knowledge Domain logically divided into Knowledge Entities.
Figure 6A:
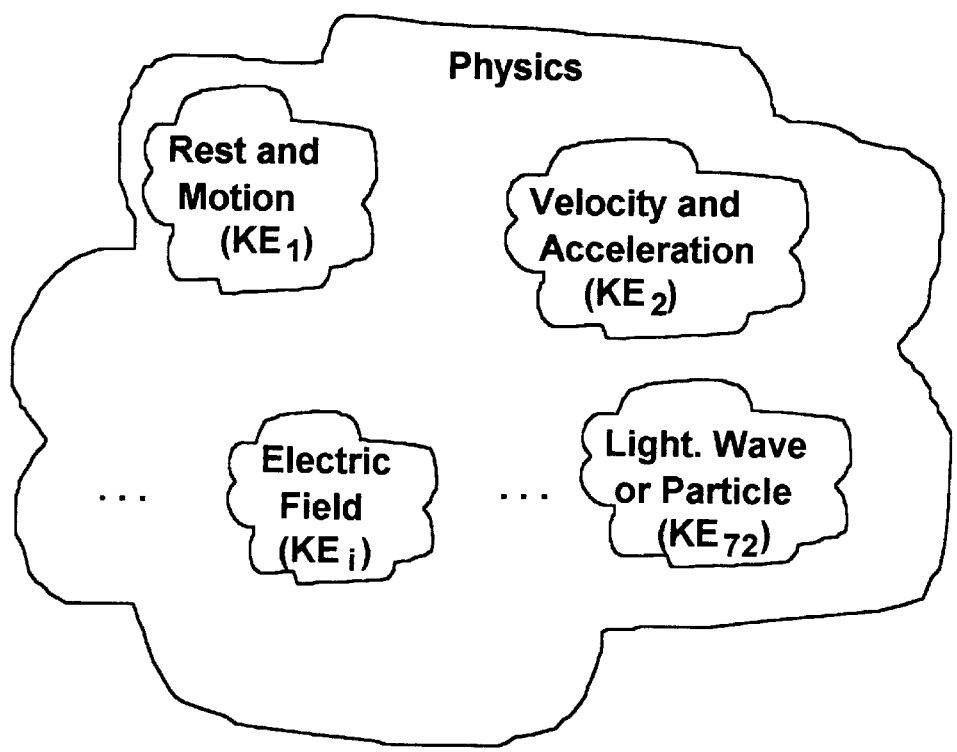
FIG. 6a illustrates an example of Knowledge Entities from the Knowledge Domain of Physics.

FIG. 6 shows a Knowledge Domain ($KD_k$) logically divided into a set of Knowledge Entities. As stated above, a Knowledge Entity is a very well defined block of a Knowledge Domain which has associated a set of Static and Dynamic Methods. The modelling of a given Knowledge Domain into the right number of Knowledge Entities is made by a subject matter team which includes domain experts and domain teaching experts. For example, in FIG. 6a, the Knowledge Domain of Physics has been logically divided into 72 Knowledge Entities, from Mechanics to Light and Optics.

Figure 7:
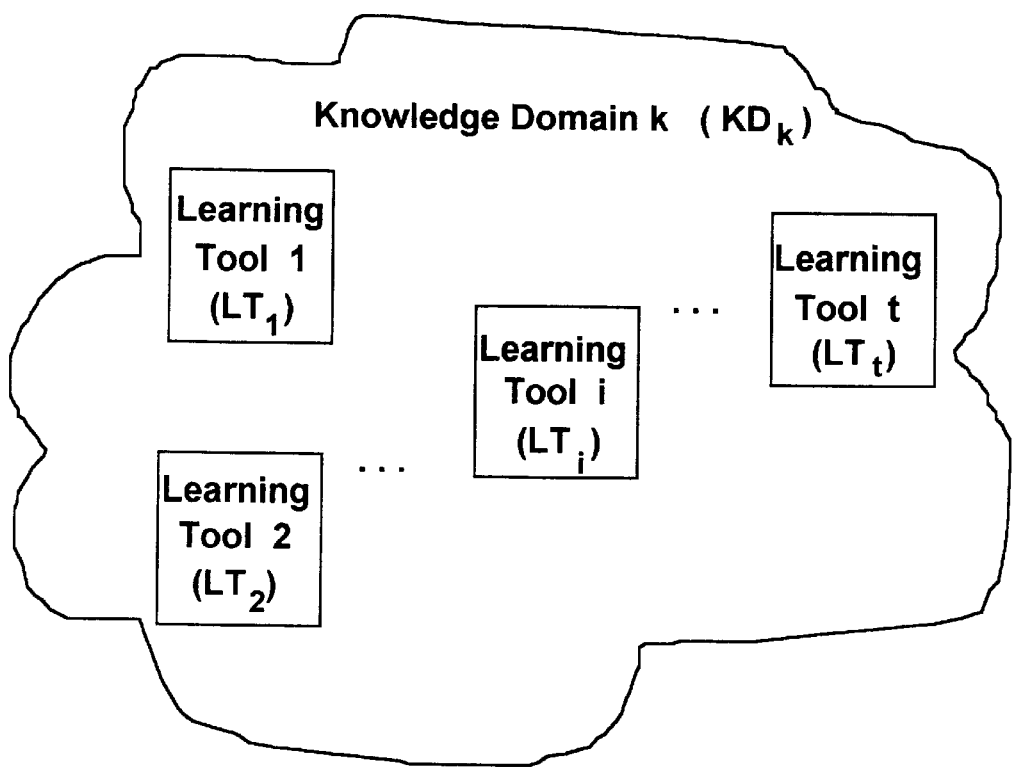
FIG. 7 shows another logical division of the Knowledge Domain, namely, by Learning Tools.
Figure 7A:
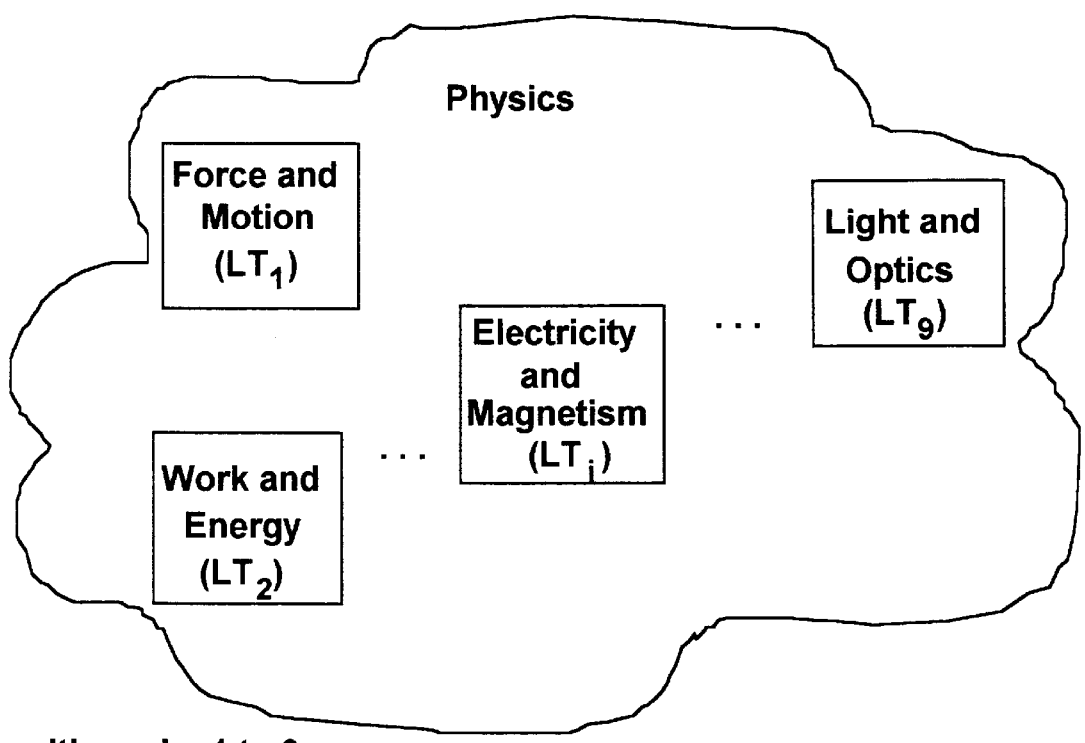
FIG. 7a is an example of Learning Tools used during the learning process to transfer the Knowledge Domain of Physics from the Knowledge Provider to the Knowledge Consumer.

FIG. 7 depicts a grouping of the Knowledge Entities of a given domain into Learning Tools. A Learning Tool associates a logical cluster of Knowledge Entities that belong to a given domain. At the same time, a Learning Tool can be seen as a means of transferring a specific Knowledge Entity cluster from the Knowledge Provider to the Knowledge Consumer. For example, as shown in FIG. 7a, the Knowledge Entities of the Knowledge Domain of Physics can be logically associated to a set of 9 Learning Tools, such as: Force and Motion, Work and Energy, Electricity and Magnetism, etc.

Figure 8:
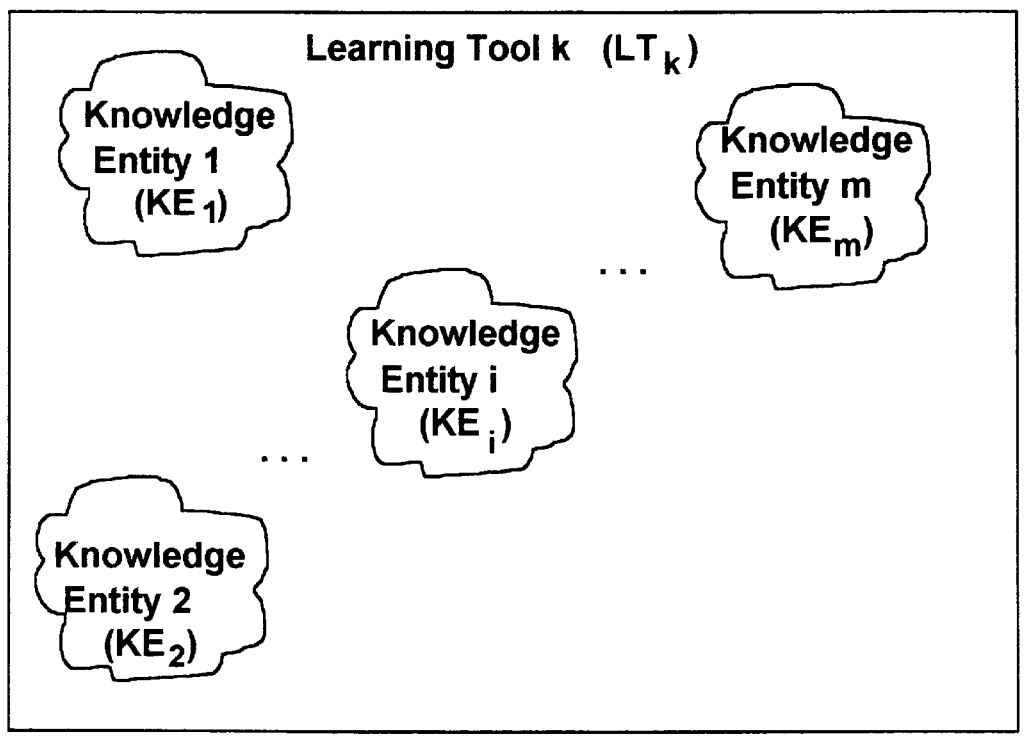
FIG. 8 depicts a Learning Tool as a logical set of Knowledge Entities.
Figure 8A:
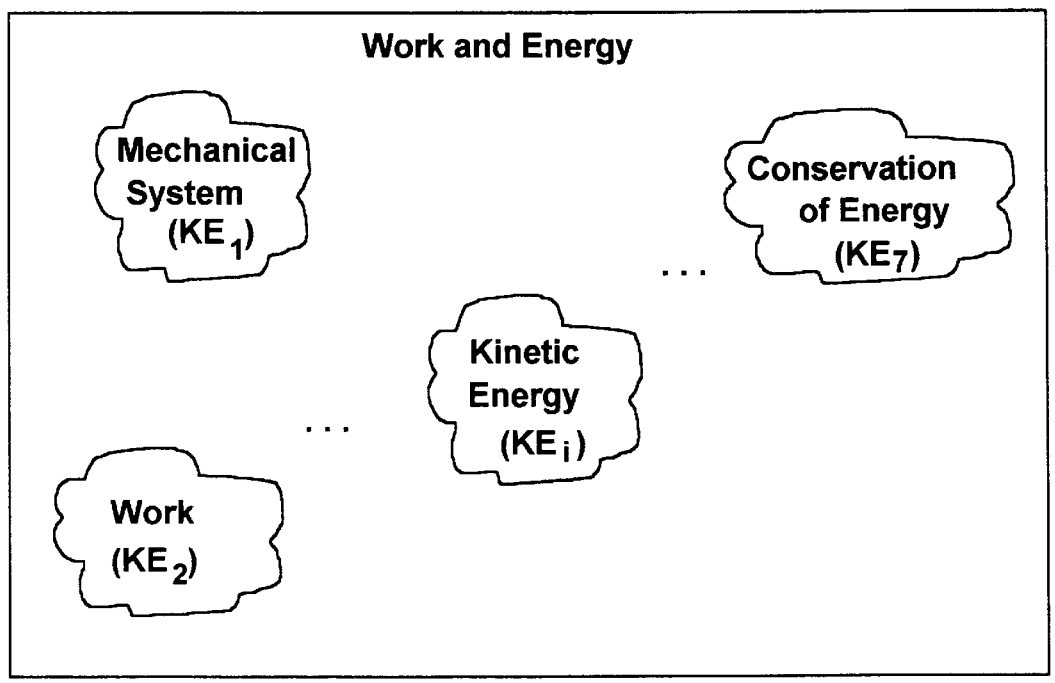
FIG. 8a is an example of a Learning Tool along with its associated Knowledge Entities.

FIG. 8 shows the Knowledge Entity cluster associated to a given Learning Tool ($LT_k$). FIG. 8a is an example of such a Learning Tool, namely, the Work and Energy tool which has 7 Knowledge Entities.

Figure 9:
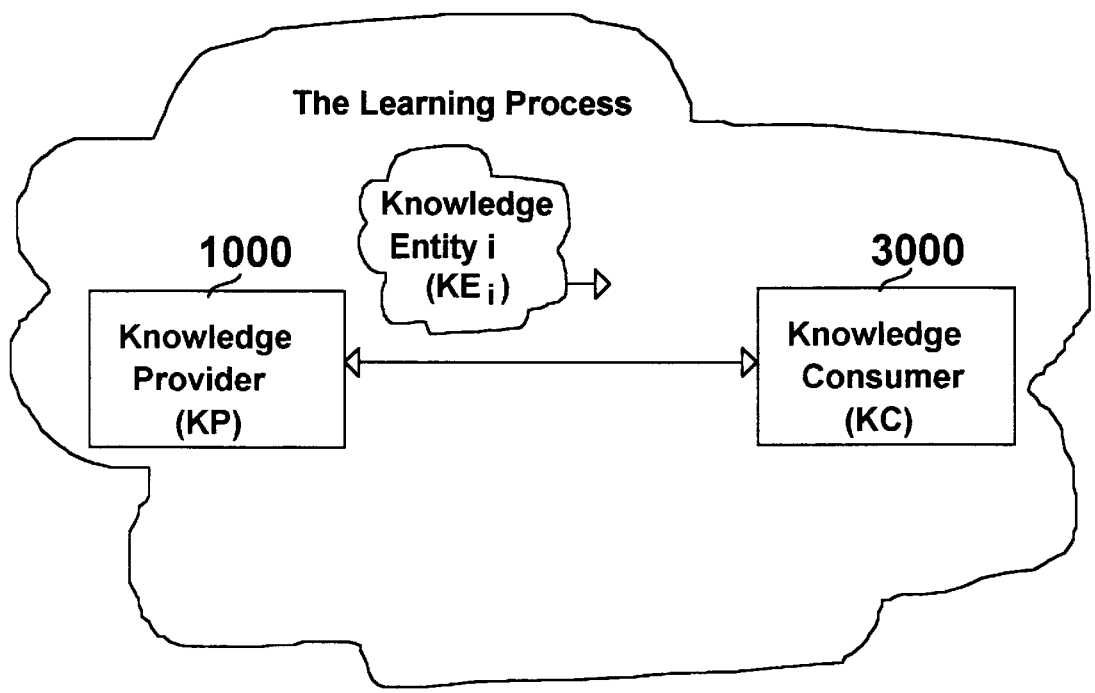
FIG. 9 illustrates the Learning Process from the Knowledge Provider's perspective.
Figure 9A:
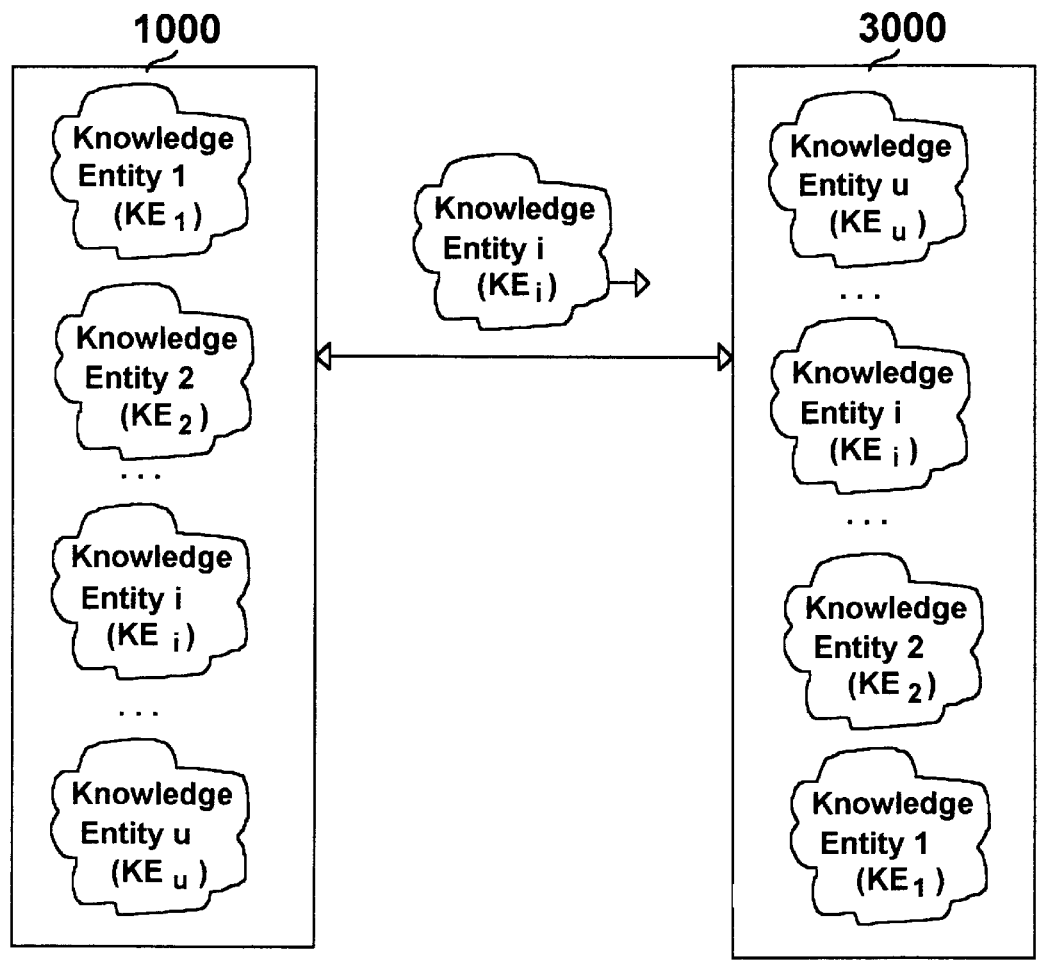
FIG. 9a shows the order in which the Knowledge Entities are transferred during the Learning Process.

FIG. 9 is a schematic representation of the Learning Process where a Knowledge Entity ($KE_i$) is transferred from the Knowledge Provider 1000 to the Knowledge Consumer 3000 by Static and/or Dynamic Learning Methods. Further, FIG. 9a shows the order in which this knowledge transfer is accomplished. It should be noted, that the present invention considers the Learning Process as an orderly transfer of Knowledge Entities from one party to another. The result of this knowledge transfer is the building up of a foundation of knowledge on the Knowledge Consumer side. Metaphorically speaking, the Knowledge Entities are the bricks of this foundation and the methods used for their transfer is the mortar which holds them together. The foundation is as good as its bricks, and as strong as the mortar that holds them together. It is obvious that the order in which the Knowledge Entities are transferred is very important, therefore, it is essential that this order be defined by the subject matter team.

FIG. 10 depicts a Knowledge Entity ($KE_i$) as a union of the Main Concept set and the Secondary Concept set. The elements of the Main Concept set ($MC_{i,j}$) are the new concepts which that particular Knowledge Entity intends to transfer to the Knowledge Consumer. As soon as a concept has been transferred, it becomes a Secondary Concept ($SC_{i,k}$) for that Knowledge Entity or for any other Knowledge Entity to be transferred in the future. In other words, the elements of the Secondary Concept set are main concepts which have been previously transferred during the Learning Process. FIG. 10a gives an example of such sets for the Velocity and Acceleration knowledge entity.

FIG. 11 is a diagram showing the forms of Knowledge Domain encapsulation for the Static Learning Methods, namely, Tutorials, Figures, Animation scenarios, Funny stories, Real Life examples, Video and Sound clips, Personalities, Concept relationships, Ask your teacher, Tell your friends, and Minimum pre-requisite.

FIG. 12 shows the forms of Knowledge Domain encapsulation for the Dynamic Learning Methods, that is, Interactive Problem Solving, Interactive Lab Experiments, and Interactive Games.

Figure 13:
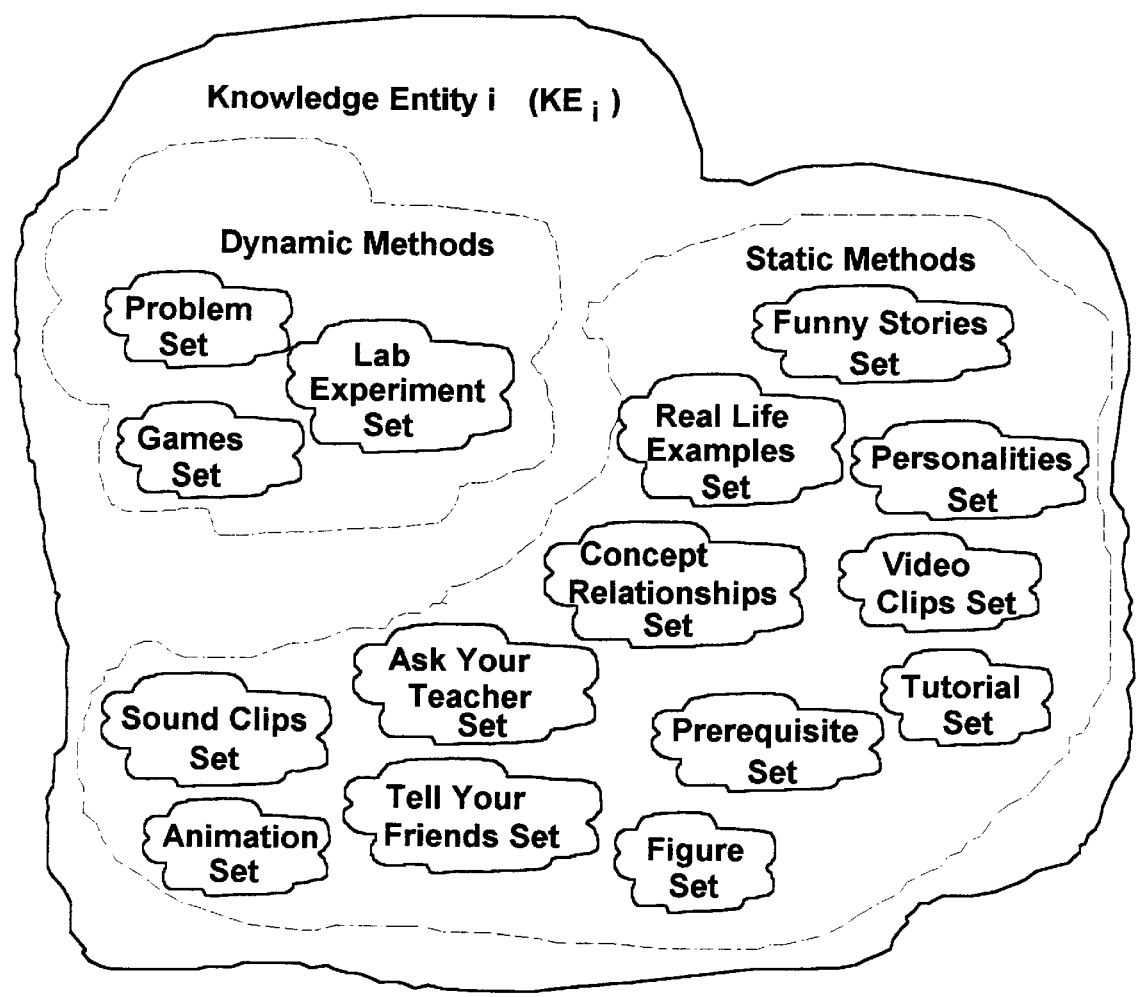
FIG. 13 illustrates a Knowledge Entity and its associated knowledge encapsulation sets proposed by the present invention.

FIG. 13 is an inside view of the content of a Knowledge Entity ($KE_i$) from the perspective of the method used for its transfer.

Figure 14:
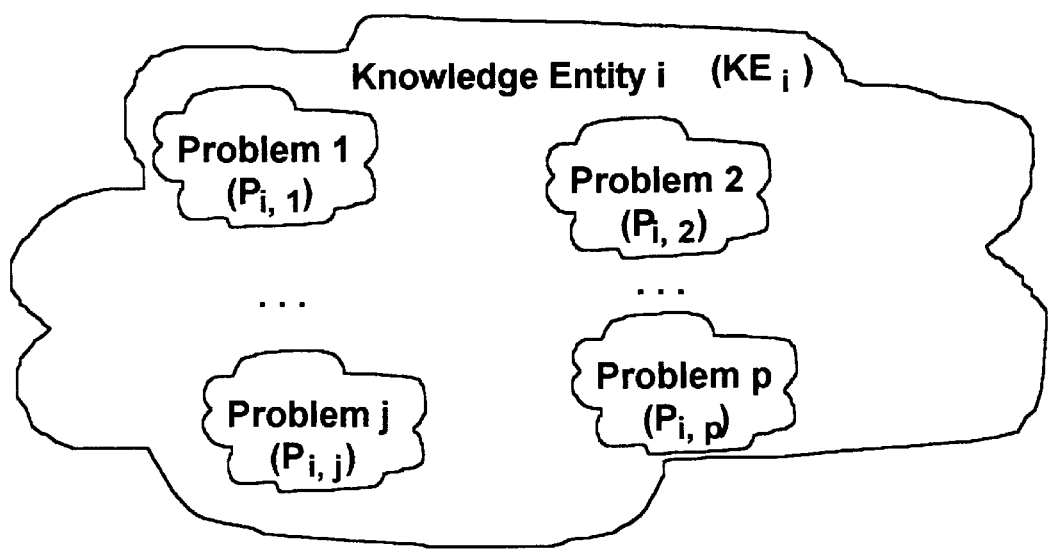
FIG. 14 shows a Knowledge Entity and its associated problem solving set.

FIG. 14 shows the problem set associated to a given Knowledge Entity ($KE_i$). This set is carefully designed by the subject matter team in such a way that it covers all the new concepts contained by the Knowledge Entity.

Figure 15:
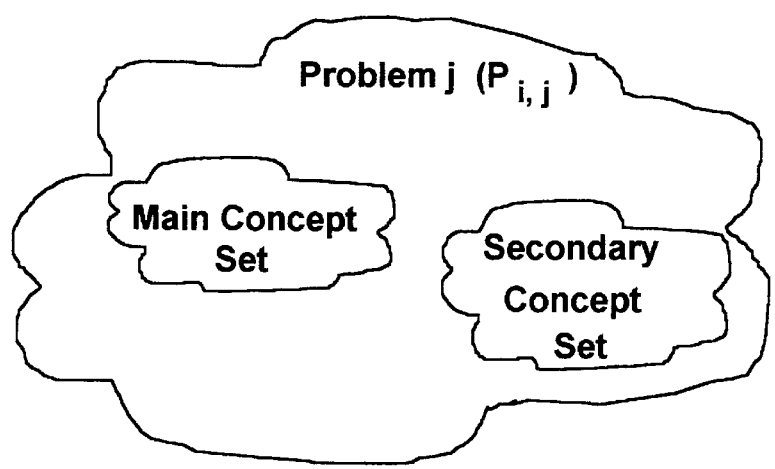
FIG. 15 illustrates a Problem as two sets of concepts: the Main Concept set and Secondary Concept set.
Figure 15A:
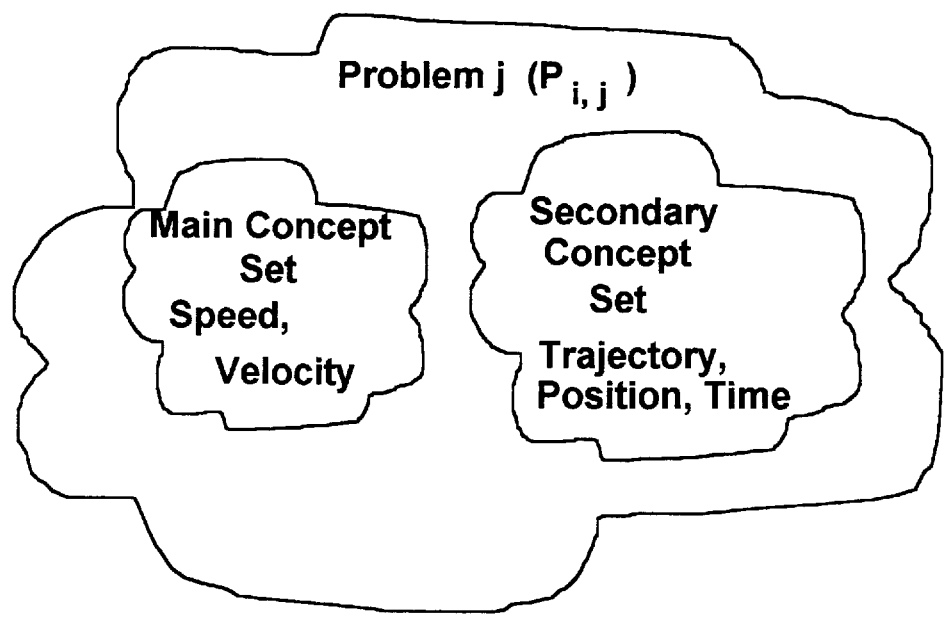
FIG. 15a is an example of a Problem according to the statement made by FIG. 15.

FIG. 15 presents the essential components of a Problem ($P_{i,j}$). In the present invention, the subject matter team designs each problem to have at least one new concept that belongs to the Knowledge Domain. We recommend a maximum of three Main Concepts per problem to be used for an actual implementation. FIG. 15a is an example where the Main Concept set has two elements, speed and velocity, and the Secondary Concept set has three elements, trajectory, position, and time.

Figure 16:
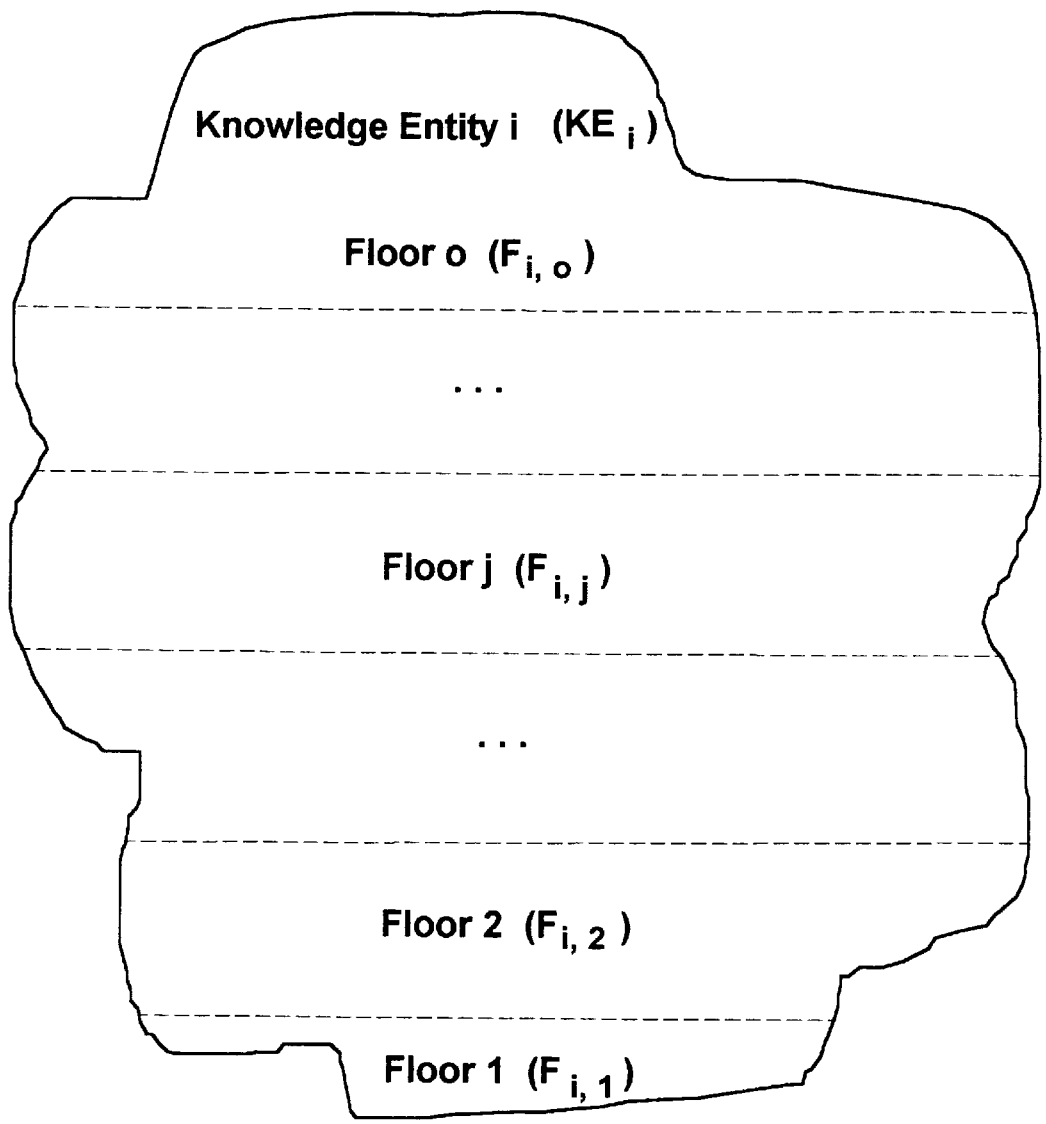
FIG. 16 depicts the logical division of a Knowledge Entity into Floors.

FIG. 16 is an inside view of a Knowledge Entity ($KE_i$) showing how it is organized from the problem distribution perspective. As shown, a Knowledge Entity is divided into a number of floors. The problems associated to the Knowledge Entity are usually unequally distributed on each floor. These problems are solved starting with the first floor ($F_{i,1}$) up to the last floor ($F_{i,o}$) The level of difficulty of the problems increases on each floor with the most difficult being on the last floor ($F_{i,o}$) For an actual implementation of the present invention, it is recommended that the number of floors be greater than two and less than six.

FIG. 17 shows two types of problems that exist on each floor of a given Knowledge Entity ($KE_i$), namely, the Main Problems and Secondary Problems. On each floor there is only one Main Problem (for example: on floor two there is the $MP_{i,2}$ problem). It should be noted that: 1) the Main Problem is the most complex problem on its floor; 2) during the Learning Process, the Knowledge Consumer always progresses from one floor to the next through the Main Problem. In other words, when going to the next floor, the first problem required to be solved is always the Main Problem of the new floor; 3) the union of all Main Problems of all Knowledge Entities is a set called the Main Problem Set (MPS); 4) if the learning process is under system control, it does not matter how good the learning abilities of a Knowledge Consumer are, all the elements of the Main Problem Set must be solved.

On each floor there is at least one Secondary Problem type (for example: on the second floor there is a set of Secondary Problems. The $SP^2_{i,k}$ notation indicates—the Secondary Problem k which resides on floor 2 of the Knowledge Entity i ($KE_i$)). It should be noted that: 1) the Secondary Problems of a given floor are less complex than the Main Problem of that floor; 2) depending on the Knowledge Consumer's learning abilities: a) if the efficiency of the knowledge transfer for the Main Problem of the floor is 100% then no Secondary Problem is included into the Knowledge Consumer Learning Route; b) if the efficiency of the knowledge transfer for the Main Problem is less than 100% then one or more Secondary Problems are included into the Knowledge Consumer Learning Route by the Learning Route Authority 1241 of FIG. 2d; 3) the main goal of the Secondary Problems is to present, in a simplified way, the main concepts of the Main Problem; 4) the union of all Secondary Problems of all Knowledge Entities is called the Secondary Problem Set (SPS); 5) the subject matter team must take into account all the aspects presented above when designing the Main and Secondary Problem sets. We recommend that the number of Secondary Problems on a floor should be greater than two and smaller than five for an actual implementation.

Figure 18:
FIG. 18 shows the transformation of a Main Concept into a Secondary Concept.

FIG. 18 depicts the transformation of a Main Concept ($MC_{i,j}$) into a Secondary Concept ($SC_{i,k}$). This transformation takes place at a precise time during the Learning Process, namely, at the time when the problem which contains the Main Concept is solved. From this moment that concept is considered secondary for the entire Learning Process with respect to that particular Knowledge Consumer. In other words, this transformation is irreversible.

FIG. 19 shows that there are virtually an infinite number of Learning Routes which a Knowledge Consumer can take during the Learning Process. The number depends on how many Knowledge Entities are incorporated by the system, how many floors contained in each Knowledge Entity, and the number of problems which reside on each floor. The boundaries of the Knowledge Consumer Learning Route are: 1) the Shortest Possible Learning Route (SPLR) which is realized when the efficiency of the knowledge transfer of all Main Problems of all Knowledge Entities is 100%, that is, in this scenario only the Main Problems are solved; 2) the Longest Possible Learning Route (LPLR) which is realized when all Secondary Problems of all floors of all Knowledge Entities are solved. This means that, the efficiency of the knowledge transfer for each element of the Main Problem Set (MPS) is very low; and 3) any possible combination which falls between the Shortest Possible Learning Route (SPLR) and the Longest Possible Learning Route (LPLR) discussed above. For example, according to formulae (1) FIG. 19, for a system which has 16 problems, 2 Knowledge Entities, and 5 Main Problems (there 5 floors), the number of Learning Routes, R, is equal to 25,592,665,851.

Figure 20:
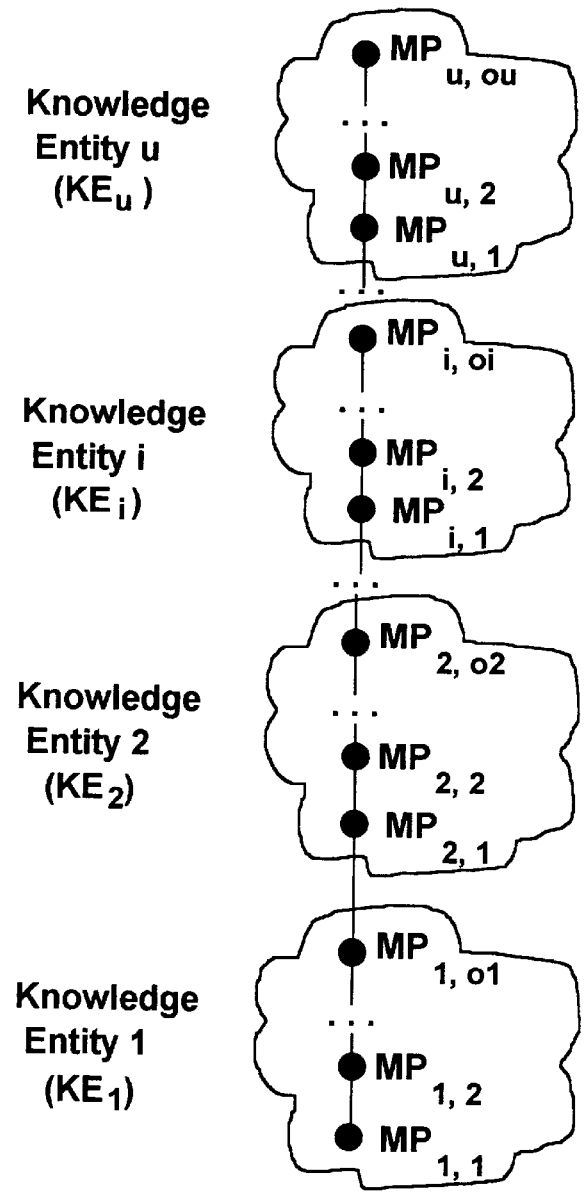
FIG. 20 illustrates the Shortest Possible Learning Route which can be realized by a Knowledge Consumer.

FIG. 20 shows the Shortest Possible Learning Route (SPLR) as discussed above.

Figure 21:
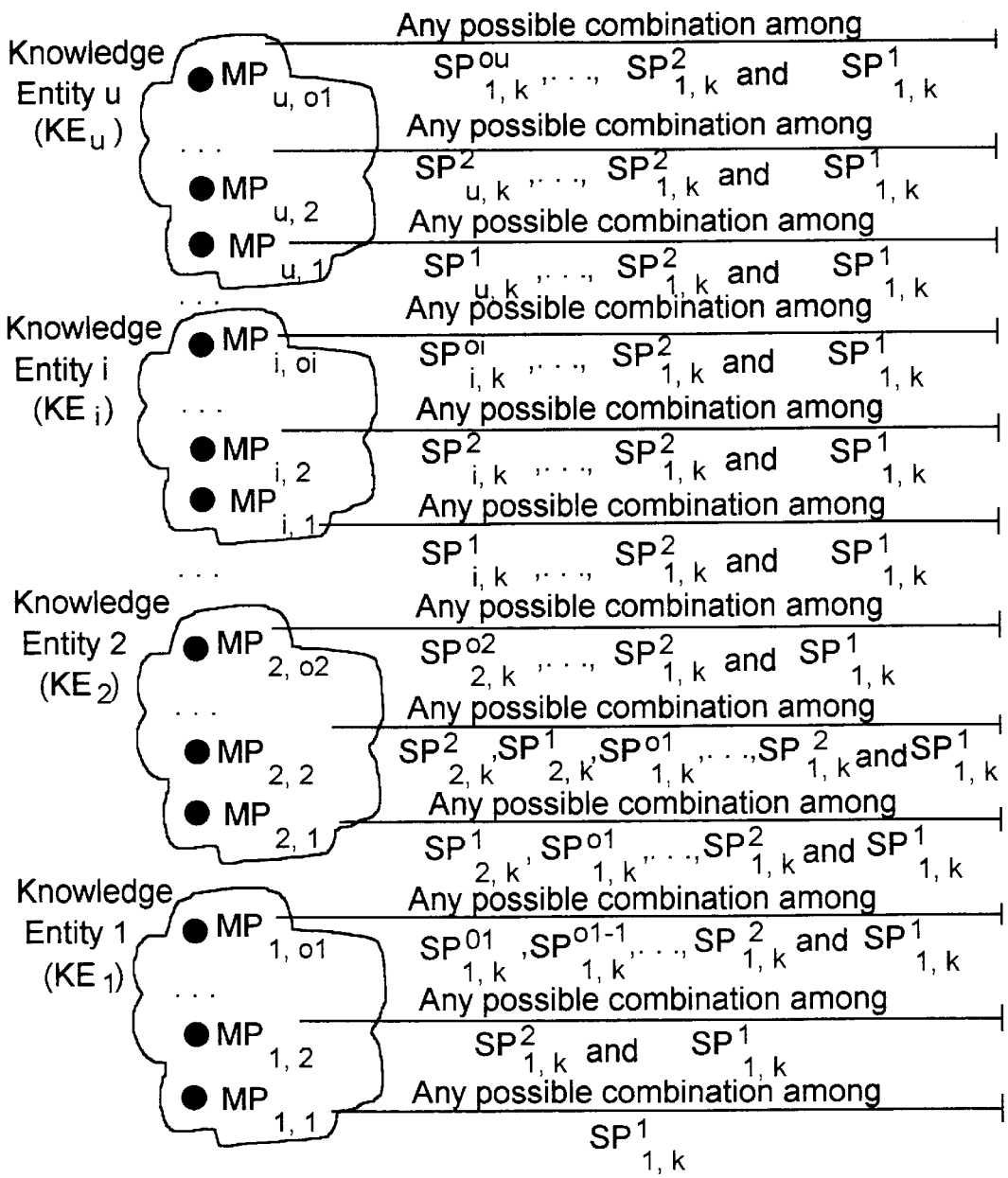
FIG. 21 illustrates all possible combinations of the Learning Route a Knowledge Consumer may achieve.

FIG. 21 is a simplified representation of the Longest Possible Learning Route (LPLR). With regard to this figure, it should be noted that in order to keep it as simple as possible: 1) the Secondary Problems are not shown; 2) the way these problems are linked to create a Knowledge Consumer Learning Route is not shown. The example that follows, illustrated by FIG. 21a, will help to clarify how the present invention works with regard to the Knowledge Consumer Learning Route.

With reference to FIG. 21a, assume that the Learning Process of a particular Knowledge Consumer is at the Main Problem $MP_{2,2}$ (that is the Main Problem of floor 2 of the Knowledge Entity 2—Velocity and Acceleration) and the knowledge transfer efficiency for this problem is less than 100%. From this point, the Learning Route Authority 1241 of FIG. 2d will decide what problems need to be solved next. This decision is made by using the efficiency of the knowledge transfer reported by the Problem Solving Assessment Authority 1242 of FIG. 2d and the Meta Knowledge stored by the Knowledge Repository 1420 of FIG. 2. Let us further assume that the Knowledge Consumer's performance achieved during the Problem Solving Process of the problem $MP_{2,2}$ is less than 100%, therefore, the Learning Route Authority decides that the Knowledge Consumer has to solve a set, S1, of unsolved Secondary Problems (depending on the performance achieved, this set may have one or more elements). Each element of the set S1 may reside on the same floor as the $MP_{2,2}$ problem (that is, floor 2 of the Knowledge Entity 2), on the first floor of the Knowledge Entity 2, or on any other floor of the previous Knowledge Entity (namely, Knowledge Entity 1—Rest and Motion—in this example). Let us also assume that, after the $MP_{2,2}$ problem is solved, the Learning Route Authority has determined the following elements of set S1: the Secondary Problem number 3 of the same floor 2 of the same Knowledge Entity 2, and the Secondary Problem number 4 of floor 3—the last floor—of the Knowledge Entity 1—Rest and Motion. This assumption is reflected in the following statement and notation: the next problems to be solved are the elements of the set S1, that is, $SP^2_{2,3}$ and $SP^3_{1,4}$ in this order (the superscript represents the floor, the first element of the subscript is the Knowledge Entity index, and the second element of the subscript represents the problem number). Assume that when the $SP^2_{2,3}$ problem is solved the efficiency of the knowledge transfer is less than 100%. As a result, the Learning Route Authority decides that the Knowledge Consumer has to solve a new set, S2, of unsolved Secondary Problems, that is, $SP^2_{2,1}$, $SP^1_{2,2}$, and $SP^1_{1,2}$. It is important to note that: 1) the first set, S1, of Secondary Problems is always generated from the Main problem; 2) the next set generated, S2, is nested into the set S1; 3) each time a Secondary Problem is solved a new nested set may be generated; 4) in our example, a new set, S3—which is nested into S2, may be generated when $SP^2_{2,1}$ or $SP^1_{2,2}$ or $SP^1_{1,2}$ is solved; 5) the Problem Solving method described by the present invention first solves all the problems of the most inner set before solving the problems from the outer set. That is, in our example, only after all the elements of S3 (assuming that no set S4 has been generated) are solved will the remaining elements of S2 be solved. After all elements of set S2 are solved (note that new nested sets may be generated any time during the solving process of a secondary problem), waiting in line are the remaining elements of set S1. Finally, when all the problems of set S1 have been solved the Knowledge Consumer is directed to the next Main Problem (the next floor) to be solved, namely, the $MP_{2,3}$, in our example.

The Problem Solving Method presented above is adaptive with respect to the Knowledge Consumer's ability to learn. That is, for two Knowledge Consumers with different learning abilities the system generates two different Learning Routes. Such a method is very close to simulates human learning needs and is far superior to any known Static Learning Method. The novelty of this Adaptive Problem Solving Method becomes more evident when its essence is captured in a flowchart and discussed herein-below.

FIG. 22 is a diagram showing the default Knowledge Consumer Route ($KCLR_{default}$) which is associated to each Knowledge Consumer by the Knowledge Consumer Authority 1251 of FIG. 2e at the registration time. The default Knowledge Consumer Route has two components: 1) a two elements header (the first Learning Tool, $LT_1$, and the first Knowledge Entity, $KE_1$); and 2) a set which contains all the Main Problems embedded in the Knowledge Repository, namely, the Main Problem Set (MPS) as discussed above.

Figure 23:
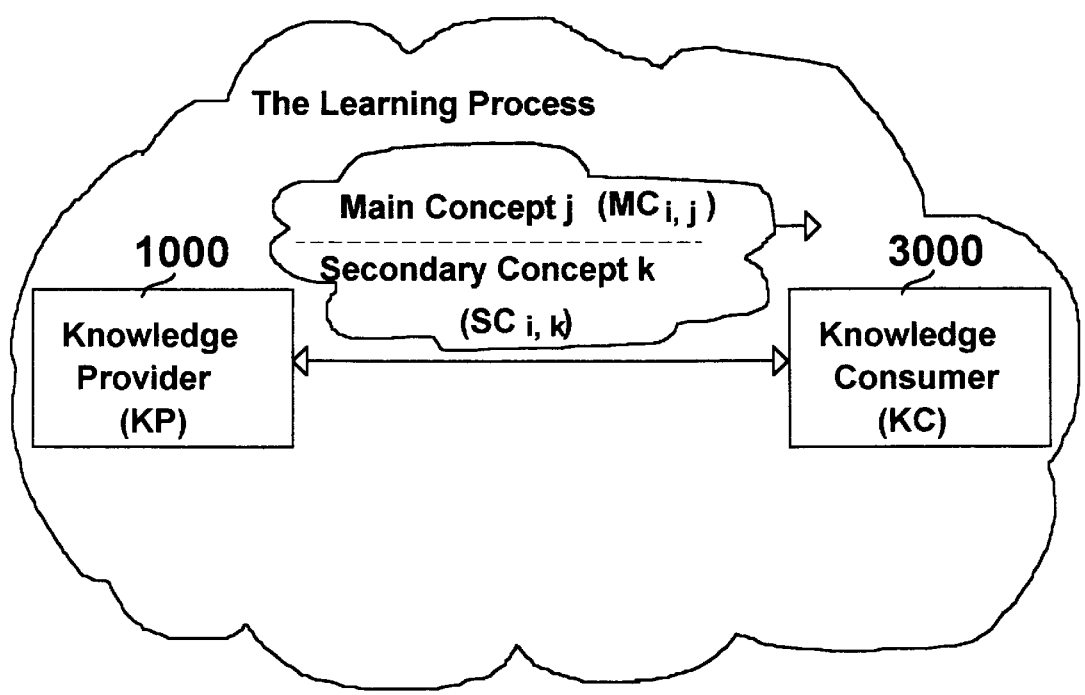
FIG. 23 shows the transfer of the Main and Secondary Concepts of a Problem from the Knowledge Provider to the Knowledge Consumer.

FIG. 23 shows what is actually transferred during the Problem Solving activity, namely, the Main and Secondary Concepts ($MC_{i,j}$ and $SC_{i,k}$) of the problem being solved.

Figure 24:
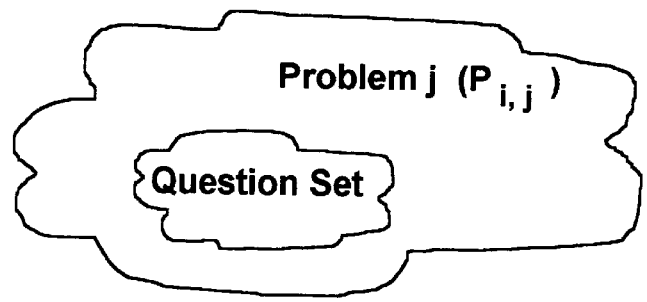
FIG. 24 illustrates a Problem and its associated Question set.

FIG. 24 depicts a problem and its associated Question Set. Each element of this set is one of the following types: 1) Analysis ($Q_A$)—the main goal of this type of question is to help the Knowledge Consumer understand the problem, that is, what is given and what is required to find out. The output of this type of question is usually a set of facts or a set of simple relationships among facts; 2) Resolution ($Q_R$)—this type of question acts as a catalyst for the reasoning the Knowledge Consumer must make in order to solve the problem. The output of the Resolution type is usually a set of calculations or a set of complex relationships among facts; 3) Verification ($Q_V$)—is the type of question designed to increase the Knowledge Consumer's confidence in the conclusion or results reached. The output of this type of question is usually a set of: facts, relationships, or calculations.

The Adaptive Problem Solving Method presented by the present invention involves a continuous conversation interaction between the Knowledge Provider and the Knowledge Consumer. Solving a problem always starts with an Analysis type question and ends with a Verification type question. Any type of question may appear in any order between the first and the last questions. It is important that the subject matter team design the appropriate set of questions and the order they are posed in such a way so as to achieve a natural flow of the steps involved in solving a problem. That is, analyze to understand, reason to discover, and verify to determine that the conclusion reached is right.

Figure 25:
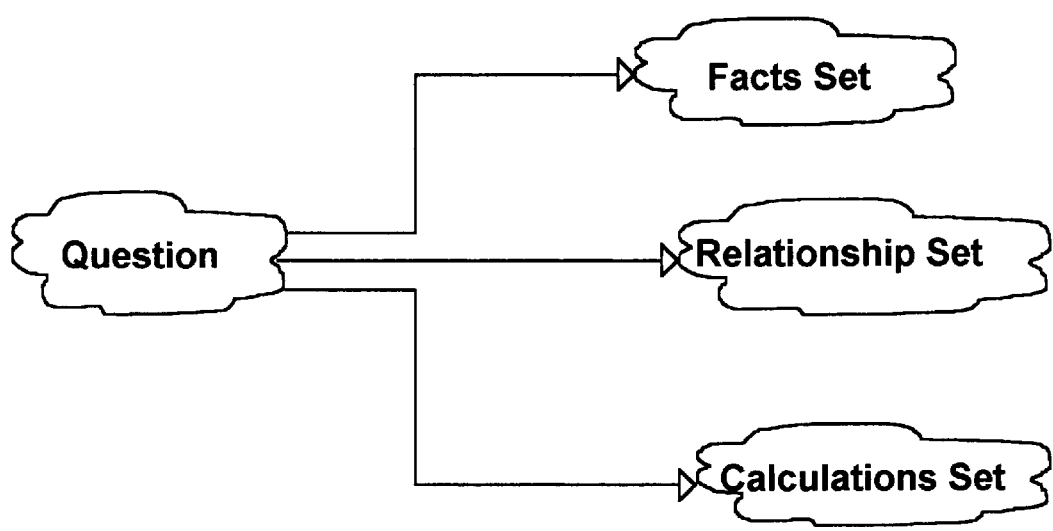
FIG. 25 depicts the possible output of a Question.

FIG. 25 shows the kind of output a question can have, namely, a set of: Facts, Relationships, or Calculations.

Figure 26:
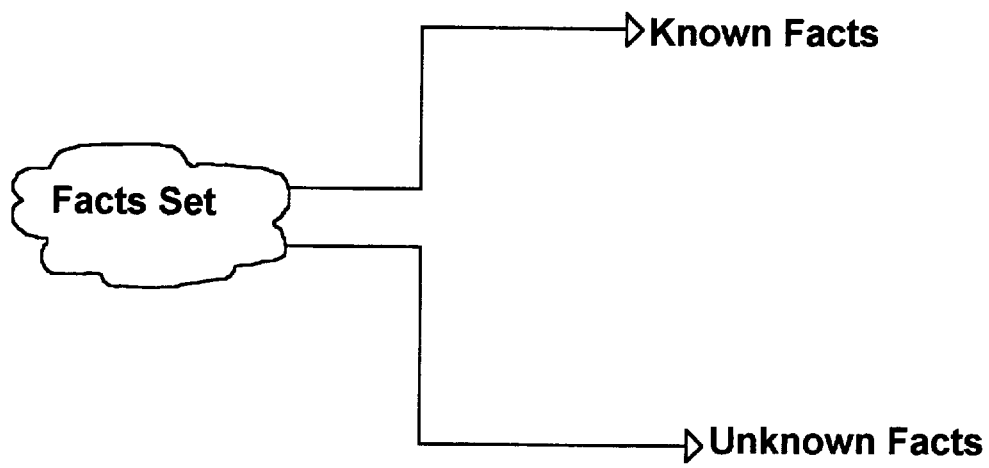
FIG. 26 shows the Facts Set elements.

FIG. 26 shows the Facts Set as having two types of elements, namely, the Known and the Unknown Facts. The Known Facts are the facts given by the problem statement or considered known from the Knowledge Domain. The Unknown Facts are the facts to be discovered in the problem scope.

Another advantage of the Adaptive Problem Solving Method of the present invention is that the knowledge transfer is realized by discovering the Known Facts, the Unknown Facts and the relationships between them. This helps the Knowledge Consumer to develop a set of skills which are always in demand in today's society, namely, problem solving, analysis, and resolution.

FIG. 27 is a diagram showing the components associated to a problem. The maximum number of points, $P_{max}$, is always 100 and is distributed to each question according to its level of difficulty. The question set is designed by the subject matter team in such a way that its elements communicate the problem's Main and Secondary Concepts.

The figure and animation scenario sets help the Knowledge Consumer, in a visual way, understand the problem.

FIG. 28 is a diagram showing what is associated to a question. The maximum number of points, $Q_{max}$, a question can have is 30. As stated above, for each problem, the sum of the points of all its questions is $P_{max}=100$. A question always has a Hint message, and a set of four choices. It might also have a set of figures and animation scenarios designed to help the Knowledge Consumer understand the concepts that particular question aims to transfer. At the time a question is posted, the system sets a flag, called "First Try flag", to TRUE. If the correct answer is not obtained on the first attempt, the system sets this flag to FALSE and gives the Knowledge Consumer one more chance. The status of the First Try flag is used by the Problem Solving Assessment Authority 1242 of FIG. 2d for knowledge transfer efficiency evaluation.

FIG. 29 is a diagram showing the elements associated to a choice. The Fuzzy Logic Assessment Coefficient (FLAC) associated to a choice is a number which belongs to the [0,1] interval. As stated above, a question has four choices, therefore, a question has four Fuzzy Logic Assessment Coefficients. One of these four coefficients always has the value of 1, and one has the value of 0. These values represent the best and the worst choice associated to that question. The remaining two coefficients can have any value which is greater than 0 and smaller than 1. The Fuzzy Logic Assessment Coefficient associated to the selected choice (or choices if the second chance is used) is used by the Problem Solving Assessment Authority 1242 of FIG. 2d for knowledge transfer efficiency evaluation. FIG. 29a depicts the formulas used to make the assessment: a) formula (1) is used to compute the number of points obtained for a given question, b) formula (2) is used to compute the points obtained for a given problem, and; c) formula (3) gives the maximum number of points that can be obtained for a given problem. This assessment mechanism, based on the fuzzy logic concept, has a big advantage because it is very close to the way humans make an assessment, namely, even when the given answer is not the best one it still can have some value.

Another element associated to a choice is a "Why" message. This represents a means to better learn the concepts the questions convey. For example, by invoking the "Why" message after the best choice has been selected the Knowledge Consumer gets the explanation of the reason why this is the best answer. Therefore, even if the choice selection was made randomly there is a benefit from the Learning Process. In the same manner, if the selected choice is not the best answer or if it represents the worst answer, the Knowledge Consumer can invoke the "Why" message to find out the reason why the selected choice was wrong. In real life, this is called "Learning from your mistakes".

With regard to the "Why" message, the present invention goes a step further and provides a refine mechanism. The idea is to have different complexities of explanation for the same "Why" message. That is, the first level of complexity gives the reason why the selected choice is right or wrong for (what is considered to be) a Knowledge Consumer with normal learning abilities. From this level, if the refine mechanism is invoked, the next level of complexity refines the "Why" message by explaining the same thing but in a much simpler way. Further, the next level of complexity provides an even simpler explanation. Theoretically, this "refine" mechanism can have as many levels as desired but for a real life implementation we recommend a maximum of three levels. It should be noted that, in order to make life easier for the Knowledge Consumer, the explanation conveyed by a "Why" message may contain dynamic or static visual objects.

A choice may also have a set of figures and a set of animation scenarios which are attached directly to the choice or to the "Why" message associated to that choice. By attaching visual elements to a choice, particularly to a "Why" message, it dramatically improves the chance that the Knowledge Consumer will understand the concepts conveyed by the question the choice belongs to.

Figure 29C:
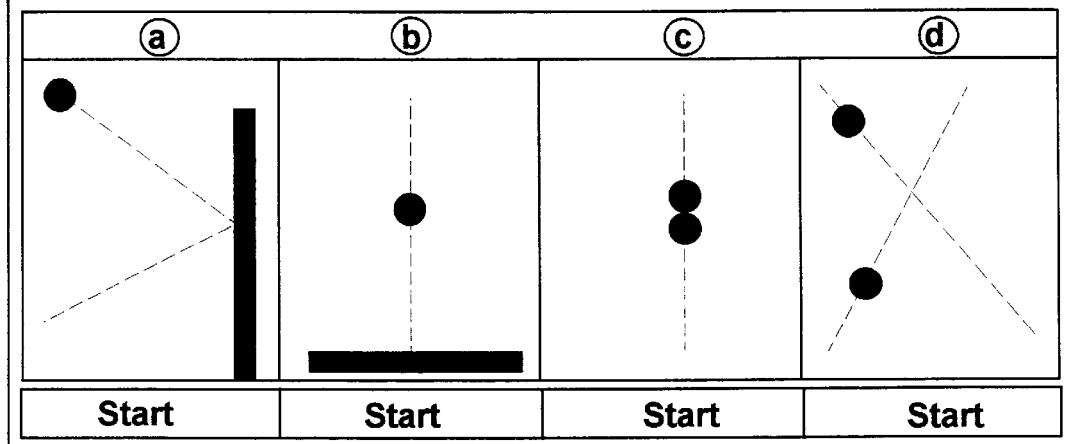
FIG. 29c is an example of a Column type Choice.
Figure 29D:
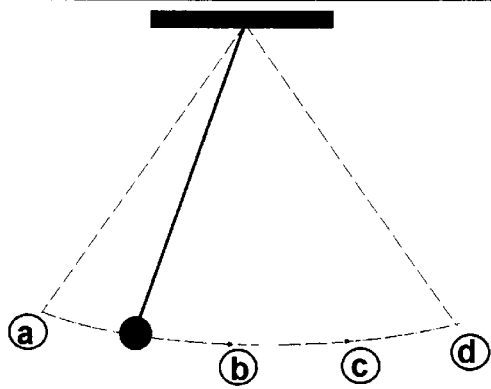
FIG. 29d is an example of an Anywhere type Choice.

In the context of the present invention, a choice can be either Row, Column, or Anywhere. The Row type, which is just plain text (see FIG. 29b as an example), is suitable for a narrative choice. For the Column type, each choice of a question is presented as a static or dynamic (animated) set of visual objects on its own screen. FIG. 29c shows an example of a dynamic presentation of a Column type choice. The Anywhere type, which is shown by FIG. 29d, presents all four choices as a unit by static or dynamic objects. It is obvious that the Column and Anywhere types are far superior to the Row type because they facilitate the Learning Process by using visualization and animation techniques.

As presented above, the subject matter team must have a very strong teaching background in order to design the "Question—Choice—Why" triad as an efficient mechanism for transferring Knowledge Entities from the Knowledge Provider to the Knowledge Consumer.

FIG. 30 is a high level flowchart showing how one embodiment of the present invention works. There are three phases, namely, Registration/Authentication (step 4100), Set Type of Control (step 4200), and Set Type of Learning Method (step 4300).

FIG. 31 is a detailed flowchart of step 4100. As shown, at step 4110 the system verifies the name and password given by the Knowledge Consumer with the Knowledge Consumer Data Base. A decision is made at step 4120 with regard to the Knowledge Consumer history. If this is a new Knowledge Consumer, step 4130 makes the registration by creating an entry in the Knowledge Consumer Data Base to be used by the new user, and then step 4140 writes the default Knowledge Consumer Learning Route to the data base and sets the status flag to unsolved all problems included into the default learning route. At step 4150, the system prepares for a learning session by displaying the system Start-up View screen.

Figure 32:
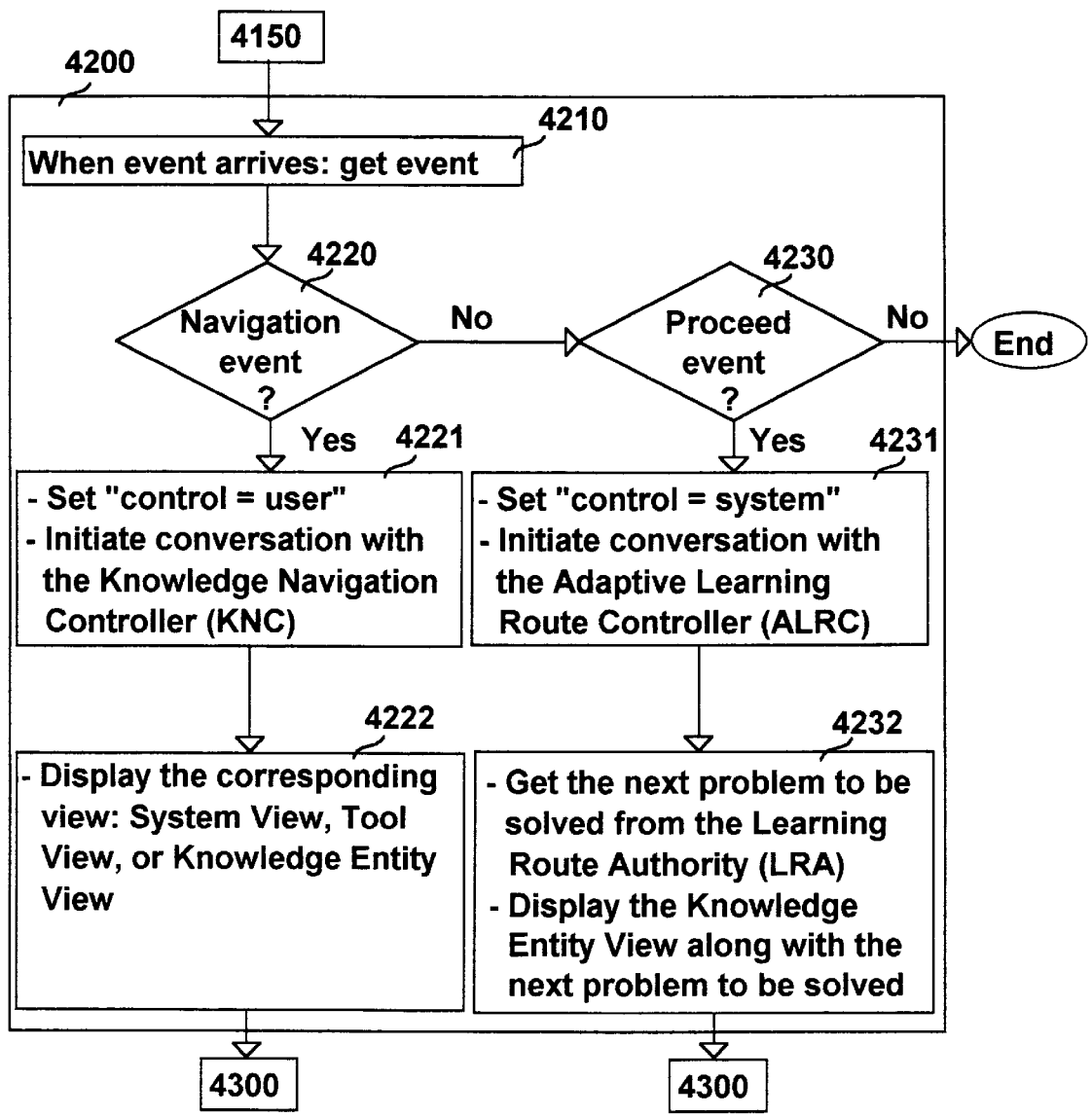
FIG. 32 is a more detailed flowchart of step 4200 of the high level flowchart depicted by FIG. 30.

FIG. 32 is a detailed flowchart of step 4200 which includes the following activities: step 4210 gets the event (Navigation, Proceed, or End Session) and steps 4220 and 4230 make decisions based on the nature of this event. If the presence of the Navigation event has been determined, step 4221 sets the "control" variable to "user", initiates conversation with the Knowledge Navigation Controller 1230 of FIG. 2, via the Central Controller 1200 of FIG. 2, and then, step 4222 displays the corresponding navigation screen, namely, System Level, Tool Level, or Knowledge Entity Level. It should be noted that, in the context of the present invention: 1) navigation from the System Level provides to the Knowledge Consumer a means of browsing—the whole content of the Knowledge Repository (System scope),—and a means of selection of any specific item the Knowledge Consumer is interested in; 2) navigation from the Tool Level provides the same means, but the scope is much smaller, restricted to the selected tool (Tool scope); 3) navigation from Knowledge Entity Level reduces the scope even further, namely, to the selected Knowledge Entity (Knowledge Entity scope). The navigation mechanism presented above also uses the data stored by the Knowledge Consumer Data Base 1430 of FIG. 2 to present, in a visual way, the progress of the Knowledge Consumer through the Learning Process. The visualization of the Learning Process will be discussed herein-below.

Continuing with FIG. 32, if the Proceed event has been identified, step 4231 sets the "control" variable to "system", and initiates conversation (via the Central Controller 1200) with the Adaptive Learning Controller 1240 of FIG. 2. This choice gives entire control to the system, so from now on, the responsibility to select the next problem to be solved belongs to the system. At step 4232, the next problem to be solved is obtained from the Learning Route Authority 1241 of FIG. 2d, and the Knowledge Entity View screen is displayed to the Knowledge Consumer.

Figure 33:
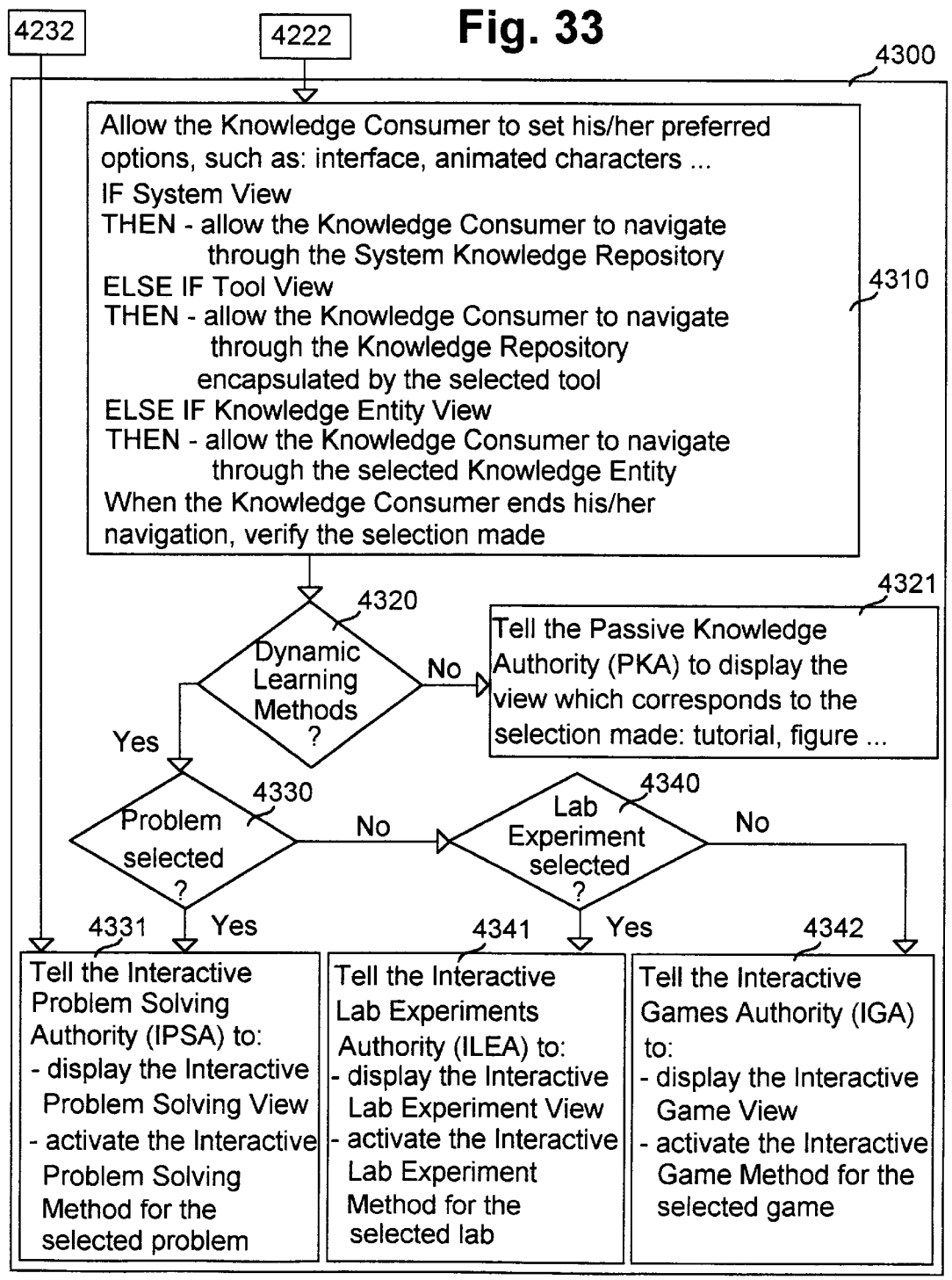
FIG. 33 is a more detailed flowchart of step 4300 of the high level flowchart depicted by FIG. 30.

FIG. 33 is a detailed flowchart of step 4300 and depicts what is involved in setting the type of learning method. Among other things, step 4310 gives an opportunity to the Knowledge Consumer to set the preferred options such as interface and animated characters. The Visual Interface objects can take different shapes (example: gem stone—knowledge is very precious, galaxy, abstract forms) and different colors (examples: emerald, ruby, topaz). The issues related to the interface options will become more clear later when a detailed presentation of the Visual Interface is made.

The animated characters option allows the Knowledge Consumer to select the characters involved in all animation scenarios by sex and race. The system presented by the present invention is not sex nor race biased, therefore, by default, it sets these characters (category: children, teachers, men and women) to a mixture of sexes and races. A library of races, for each of these categories, is available to the Knowledge Consumer to set his/her preferences. Next, at step 4310, the Knowledge Consumer performs the actual navigation on the selected level. Step 4320 verifies the type of Learning Method selected (Dynamic or Static). If one of the Static Methods has been selected, at step 4321, the Passive Knowledge Authority 1211 of FIG. 2a is contacted and the corresponding screen is displayed. Contrary, if a Dynamic Learning Method has been selected, steps 4330 and 4340 identify this method. At step 4331 the Interactive Problem Solving Authority 1221 of FIG. 2*b* is contacted, the Interactive Problem Solving View screen is displayed, and the Interactive Problem Solving Method is activated for the selected problem. Note: the selected problem can be a problem selected by the Learning Route Authority at step 4232 (system control), or selected by the Knowledge Consumer at step 4330 (user control). Further, if a Lab Experiment has been selected, at step 4341, the Interactive Lab Experiments Authority 1223 of FIG. 2*b* is contacted (via the same route—Central Controller), the Interactive Lab Experiment View screen is displayed, and the Interactive Lab Experiment Method is activated for the selected laboratory. Similarly, at step 4342, the Interactive Games Authority 1222 of FIG. 2*b* is contacted, the Interactive Game View screen is displayed, and the Interactive Game Method is activated for the selected game.

Figure 34:
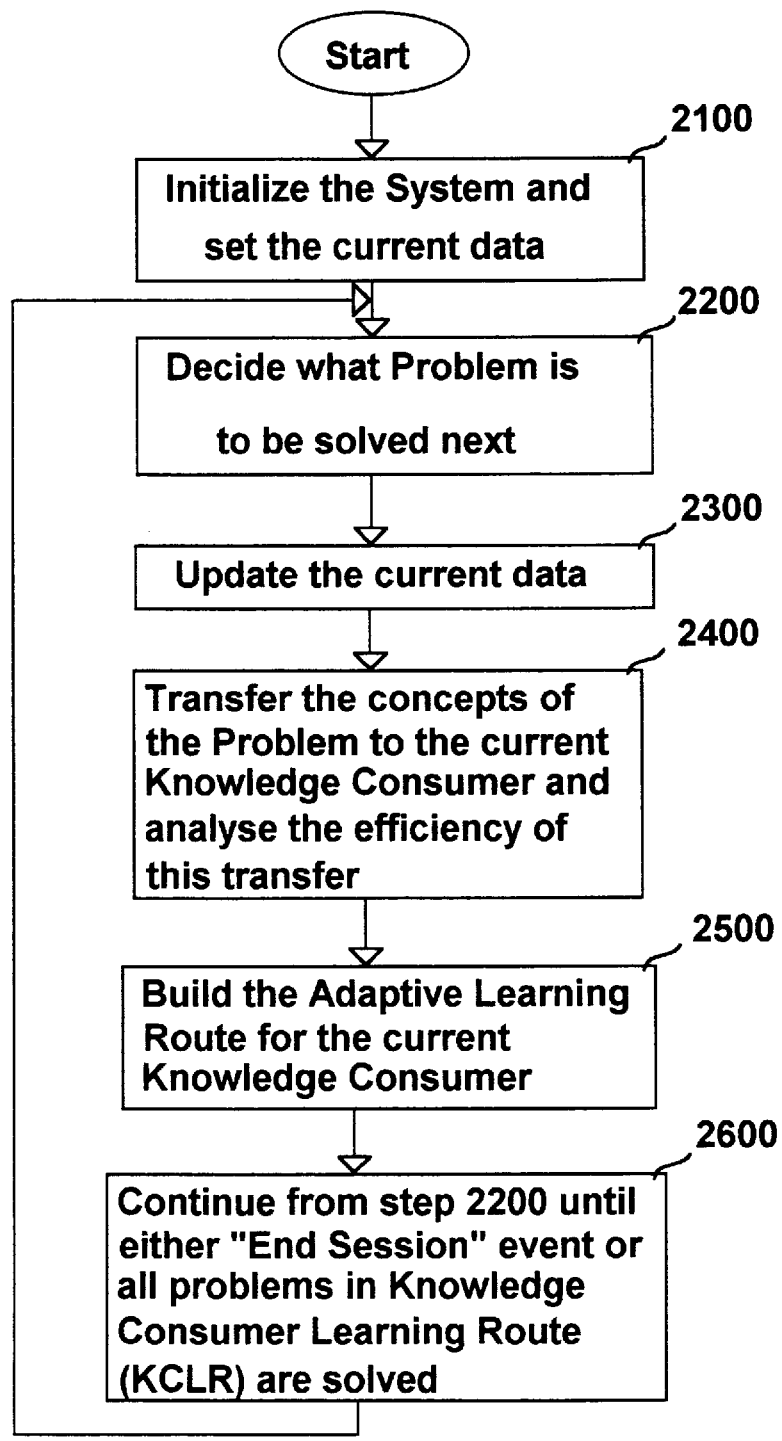
FIG. 34 illustrates the high level flowchart describing the Adaptive Learning Method presented by the present invention.

FIG. 34 is a high level flowchart of the Adaptive Problem Solving Method described by the present invention. It should be noted that this method can be seen as having two first component is its adaptive characteristic, and the second is the Problem Solving Method itself. Five major steps (2100, 2200, 2300, 2400, and 2500) are relevant to the understanding of how the Adaptive Problem Solving Method works (The last step depicted by FIG. 34, namely step 2600, is a feedback to step 2200). It should be noted that: 1) each of these major steps are presented separately in a more detailed manner by the flowcharts that follow; 2) the Knowledge Consumer Route (KCLR) is defined as a union of three sets. The first set has two elements, the current Learning Tool ($LT_k$) and the current Knowledge Entity ($KE_i$). These two elements are updated as required during the Problem Solving Process. The second set is the Main Problem Set (MPS). The elements of this set (which were described above, see FIG. 17 and FIG. 22) are associated to each Knowledge Consumer at registration. The last set, the Secondary Problem Set (SPS), is in fact created dynamically by the system using the adaptive method discussed above (see description of FIG. 21). The elements of this set were presented by FIG. 17 and their number depends on the learning abilities of the current Knowledge Consumer.

Figure 35:
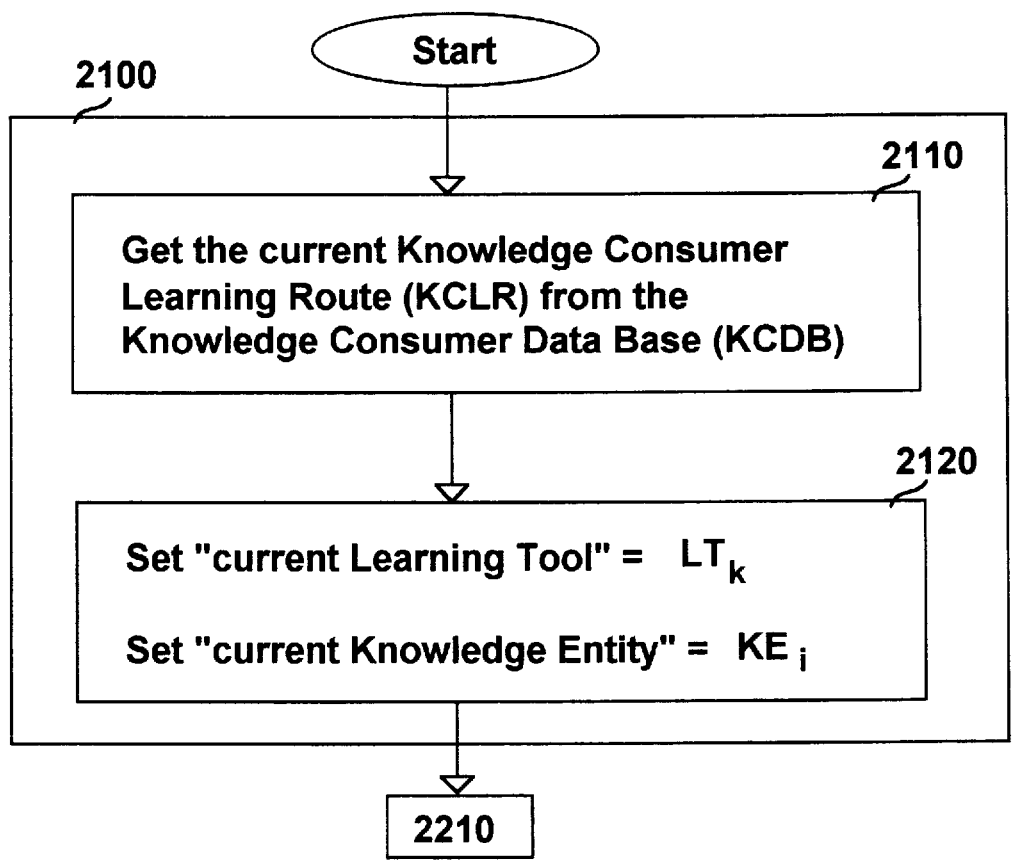
FIG. 35 is a more detailed flowchart of step 2100 of the high level flowchart depicted by FIG. 34.

FIG. 35 is a detailed flowchart of step 2100. As soon as the Knowledge Consumer has passed the Registration or Authentication phase (step 2110), the system retrieves his/her Learning Route from the Knowledge Consumer Data Base. Step 2120 sets the "current Learning Tool" and the "current Knowledge Entity" variables to the values obtained from the data base.

Figure 36:
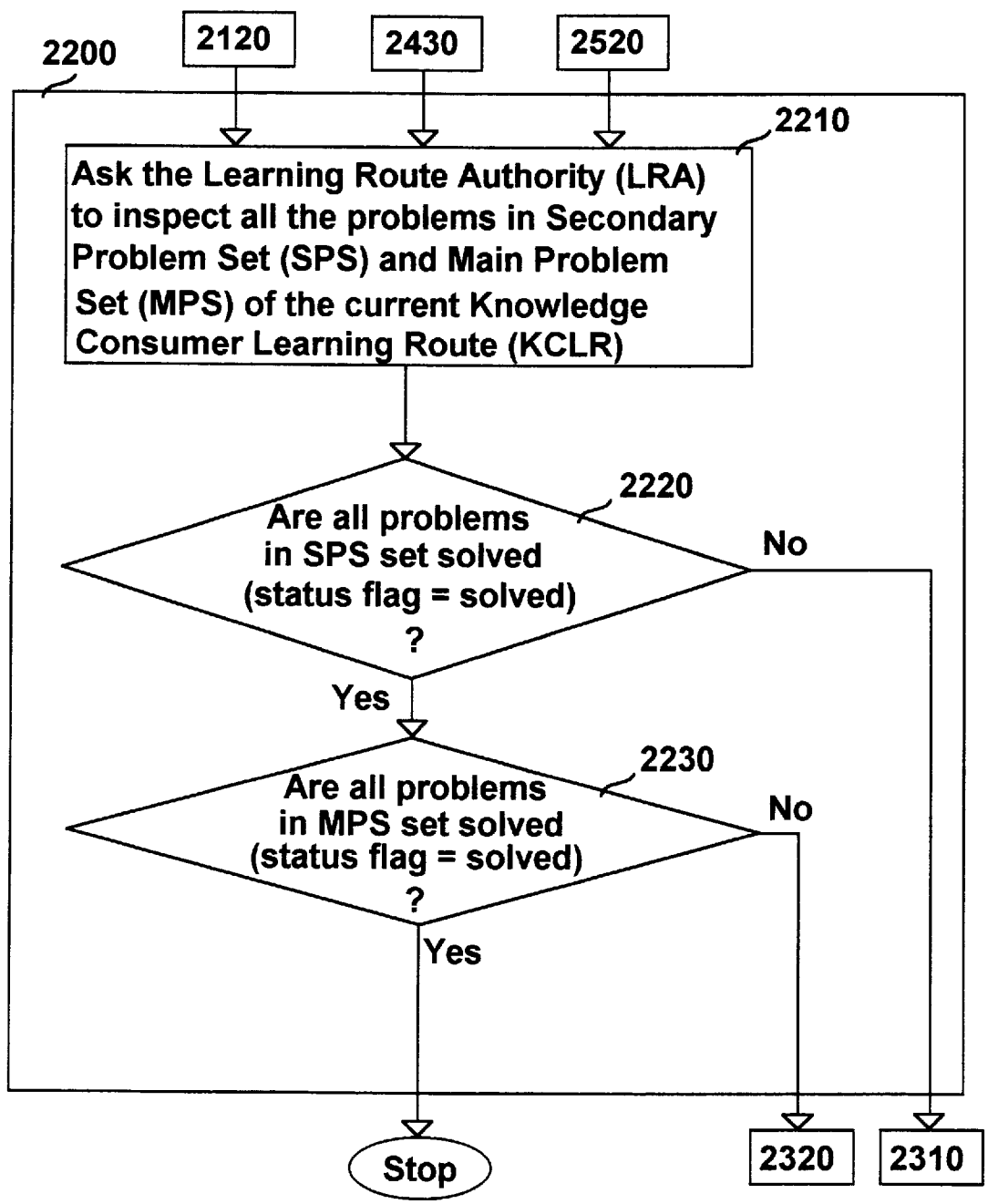
FIG. 36 is a more detailed flowchart of step 2200 of the high level flowchart depicted by FIG. 34.

FIG. 36 is a detailed flowchart of step 2200. Continuing from step 2120, at step 2210 the Learning Route Authority 1241 of FIG. 2*d* inspects the Secondary and Main Problem Sets (SPS, MPS) of the Knowledge Consumer Learning Route. Step 2220 makes a decision with regard to the SPS set. If there are elements of this set which are not solved the system goes to step 2310. Contrary, if all the Secondary Problems have been solved, this means it is time to go to the next floor, that is, to go to the next Main Problem. Step 2230 makes the decision with regard to the Main Problem Set. If all elements of this set are marked as solved the Knowledge Consumer has nothing left to do because all the problems in his/her Learning Route have been solved. Other wise, the system continues with step 2320.

Figure 37:
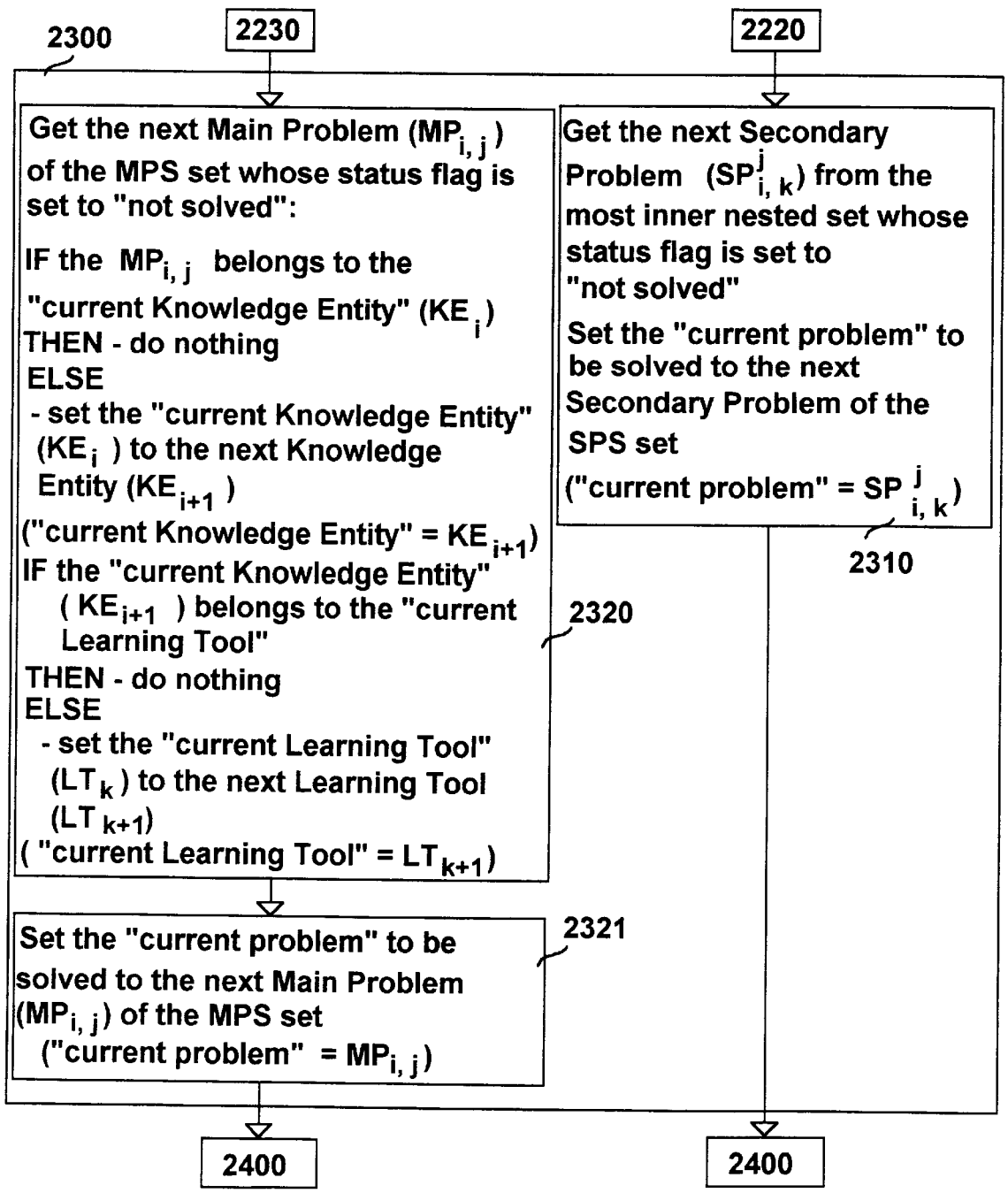
FIG. 37 is a more detailed flowchart of step 2300 of the high level flowchart depicted by FIG. 34.

FIG. 37 is a detailed flowchart of step 2300 called "update the current data" (see FIG. 34). At step 2320, the next element of the Main Problem Set which is not marked as solved is obtained and the "current Learning Tool" ($LT_k$) along with the "current Knowledge Entity" ($KE_i$), elements of the Knowledge Consumer Learning Route, are updated if necessary. Step 2321 sets the "current problem" variable to the Main Problem element obtained at step 2320. Similarly, step 2310 sets the "current problem" variable to the next Secondary Problem to be solved. It should be remembered that this Secondary Problem belongs to the most inner nested set as described above under FIG. 21.

Figure 38:
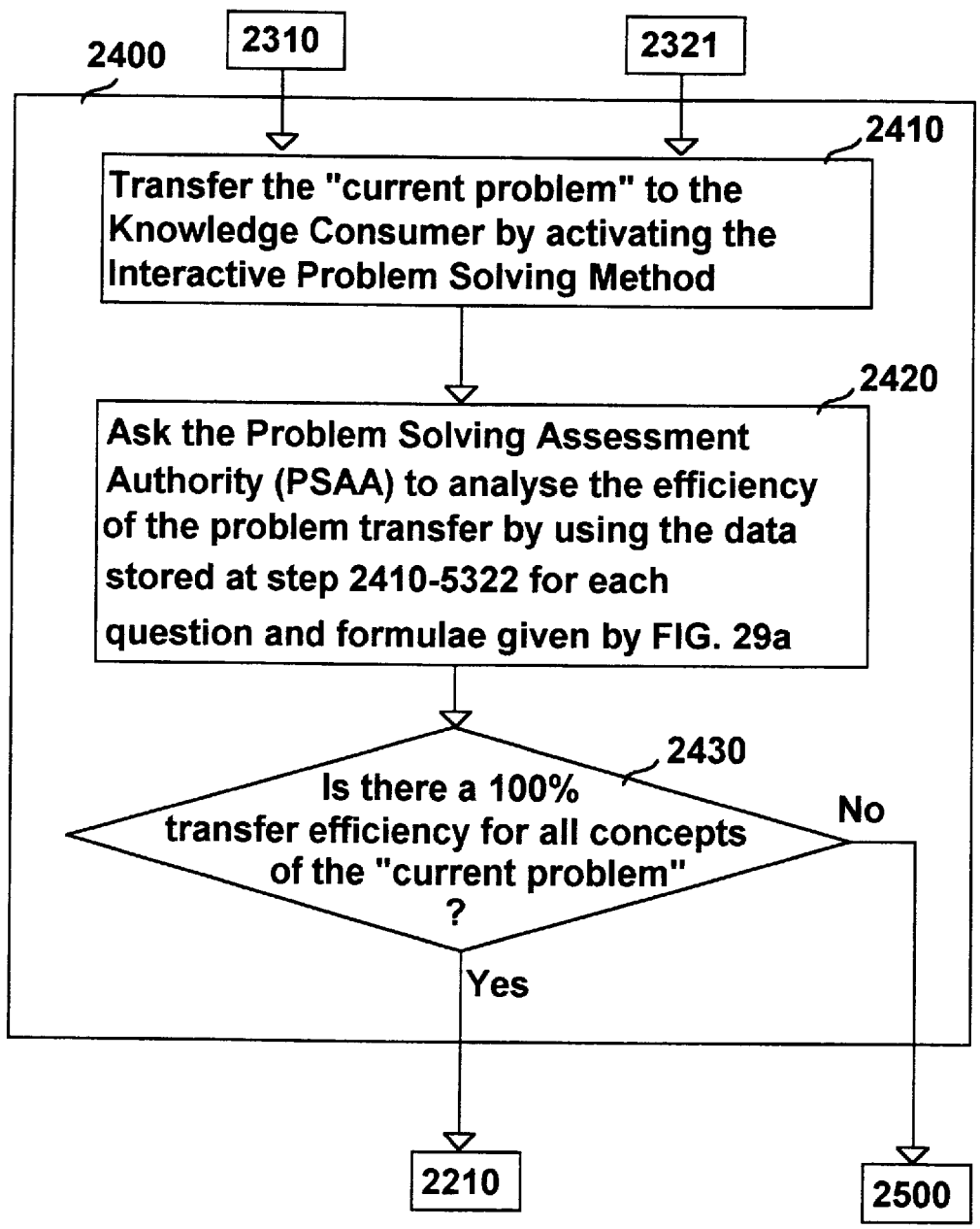
FIG. 38 is a more detailed flowchart of step 2400 of the high level flowchart depicted by FIG. 34.

FIG. 38 is a detailed flowchart of step 2400 of the high level flowchart shown by FIG. 34. Step 2410 performs the actual knowledge transfer by activating the second component of the Adaptive Problem Solving Method presented by the present invention, namely, the Interactive Problem Solving Method. This step is broken down in more detailed steps and captured in a proper flowchart starting with FIG. 40 described herein-below. At Step 2420 the Problem Solving Assessment Authority 1242 of FIG. 2*d* makes an analysis of-the efficiency of the knowledge transfer for the problem solved at step 2410. It should be remembered that this analysis is based on the score the Knowledge Consumer obtained on each question of the problem solved. Step 2430 is a decision step. If an efficiency of 100% has been achieved for all concepts of the problem solved the system goes back to step 2210 (see FIG. 36) and gets a new problem. Otherwise, the system goes to step 2500 to build the Adaptive Learning Route for the current Knowledge Consumer.

Figure 39:
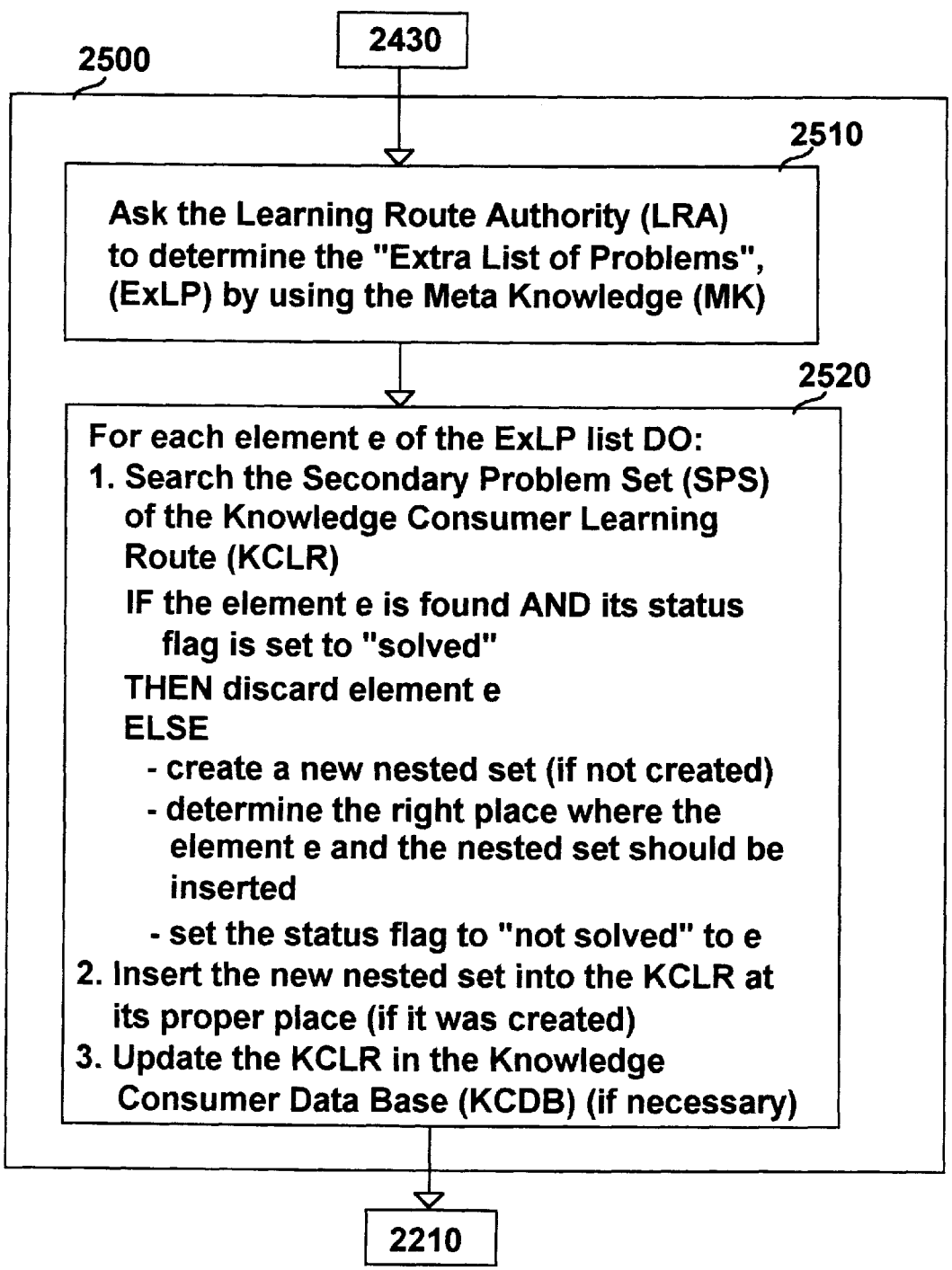
FIG. 39 is a more detailed flowchart of step 2500 of the high level flowchart depicted by FIG. 34.

FIG. 39 is a detailed flowchart of step 2500. At step 2510 the Learning Route Authority 1241 of FIG. 2*d* builds a temporary list of Secondary Problems, called the "Extra List of Problems" (ExLP). This temporary list is constructed by using the Meta Knowledge stored by the repository 1420 of FIG. 2 and the question assessment results obtained at step 2410 (stored by the Knowledge Consumer Data Base—see box 1430 of FIG. 2). Next, at step 2520, for each element of the ExLP list, the Learning Route Authority goes, though the elements of the Secondary Problem Set (SPS) of the current Knowledge Consumer Learning Route. If the element of the ExLP list is found in the SPS set and it is marked as solved that element is discarded. Otherwise it means that that problem has not yet been solved, therefore it will be inserted into the Knowledge Consumer Learning Route. It should be noted that if at least one unsolved element is found a new nested set of Secondary Problems is created as discussed above under the FIG. 21 paragraph. The Learning Route Authority has the responsibility to determine the proper place where this new set is inserted (into the Secondary Problem Set of the Knowledge Consumer Learning Route) and to make the actual insertion. After all the elements of the ExLP have been processed and a new nested set has been created, the Learning Route Authority updates the Knowledge Consumer Data Base with the new Knowledge Consumer Learning Route.

Figure 40:
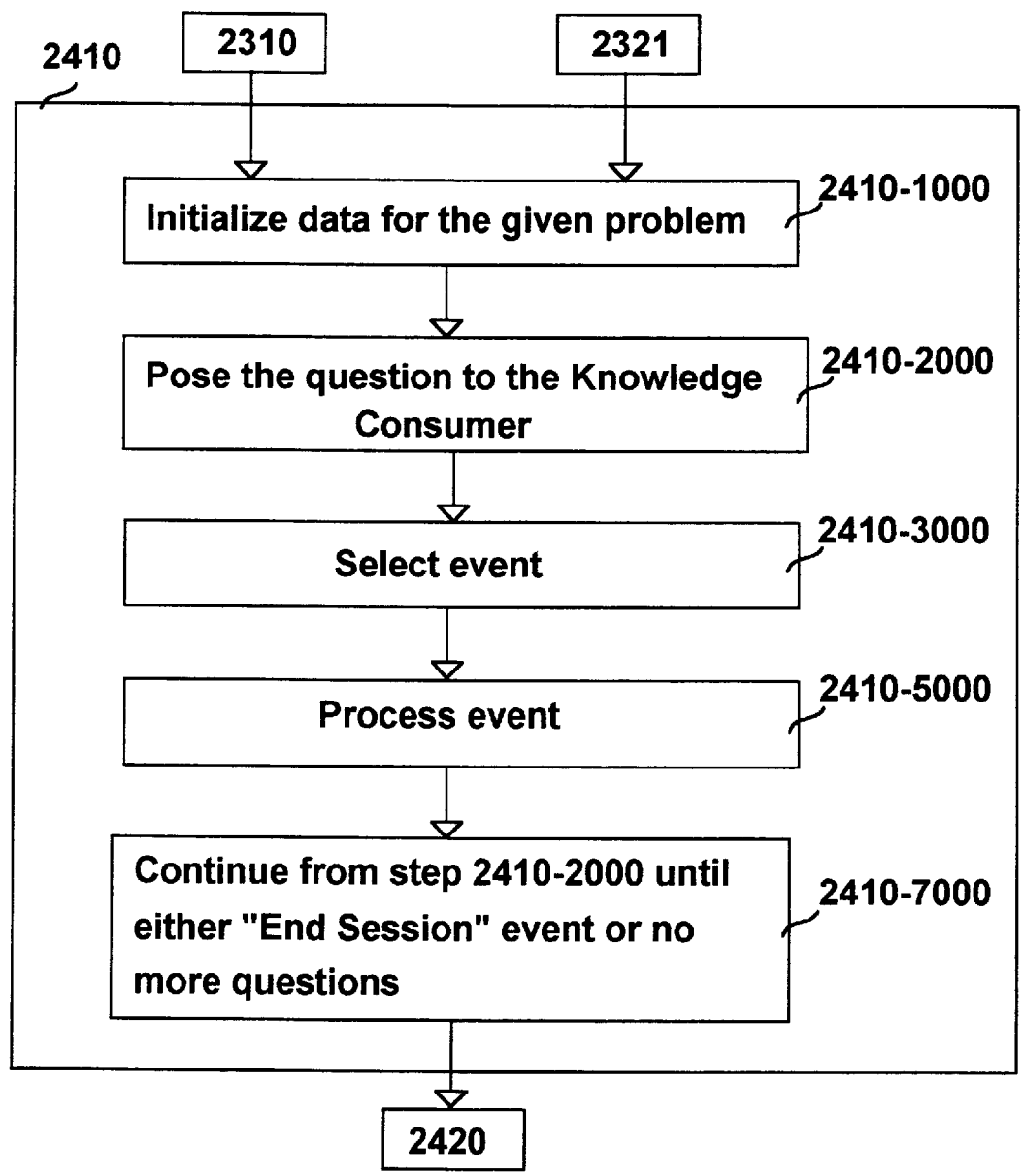
FIG. 40 illustrates the high level flowchart describing the Interactive Problem Solving Method presented by this invention. It is also a more detailed flowchart of step 2410 of FIG. 38.

FIG. 40 is a high level flowchart of step 2410 which represents the second component of the Adaptive Problem Solving Method, namely, the Interactive Problem Solving Method itself. Step 2410-1000 initializes the data for the "current problem". It should be remembered that the "current problem" is a Secondary Problem (step 2310) or a Main Problem (step 2321). Step 2410-2000 poses the question to the Knowledge Consumer. Step 2410-3000 selects, and step 2410-5000 processes the incoming event. Finally, step 2410-7000 continues form step 2410-2000 until all questions are posed or the incoming event is "End Session".

Figure 41:
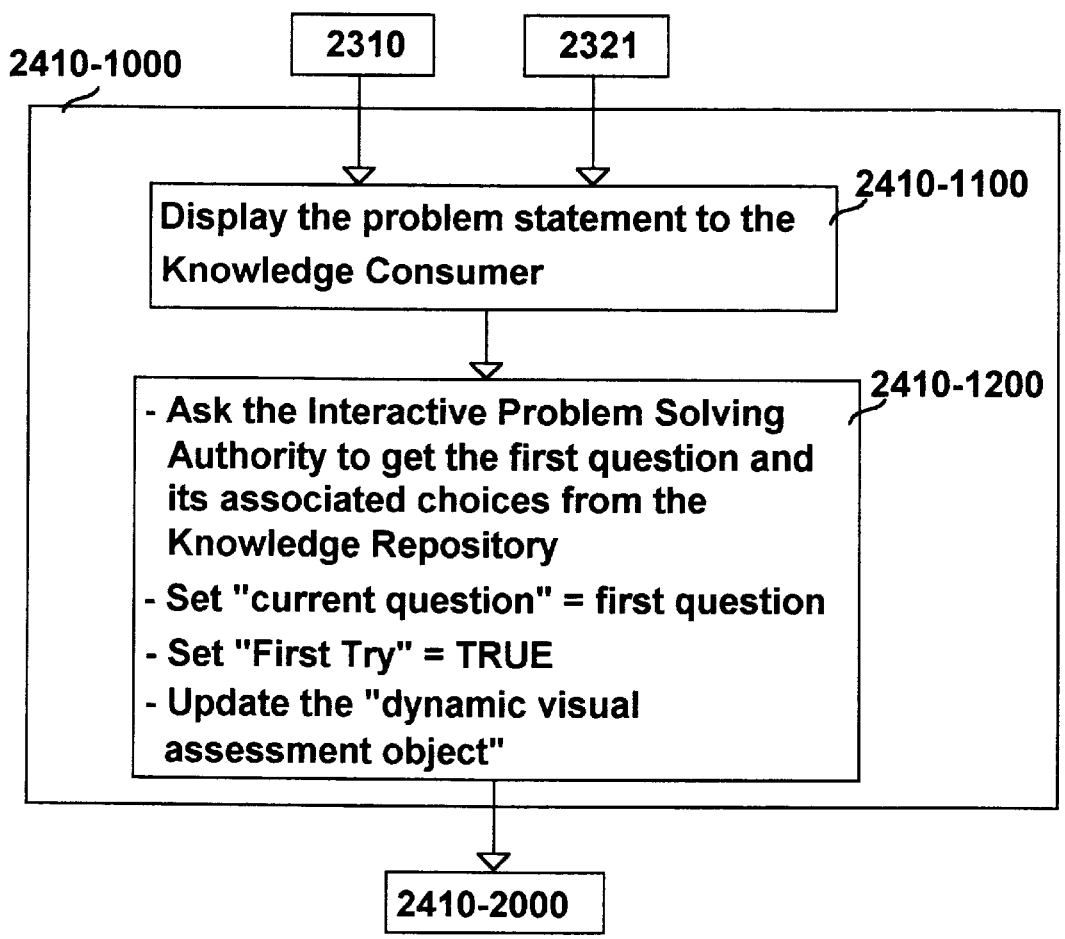
FIG. 41 is a more detailed flowchart of step 2410-1000 of the high level flowchart depicted by FIG. 40.

FIG. 41 is a detailed flowchart of step 2410-1000. Step 2410-1100 displays the problem statement to the Knowledge Consumer. At step 2410-1200, the Interactive Problem Solving Authority 1221 of FIG. 2*b* is contacted, the first question and its associated choices are extracted from the Knowledge Repository, and some data is initialized ("current question", "First Try" and the "Dynamic Visual Assessment Object"). Note: the "Dynamic Visual Assessment Object" is a Visual Interface component and will be described herein-below.

Figure 42:
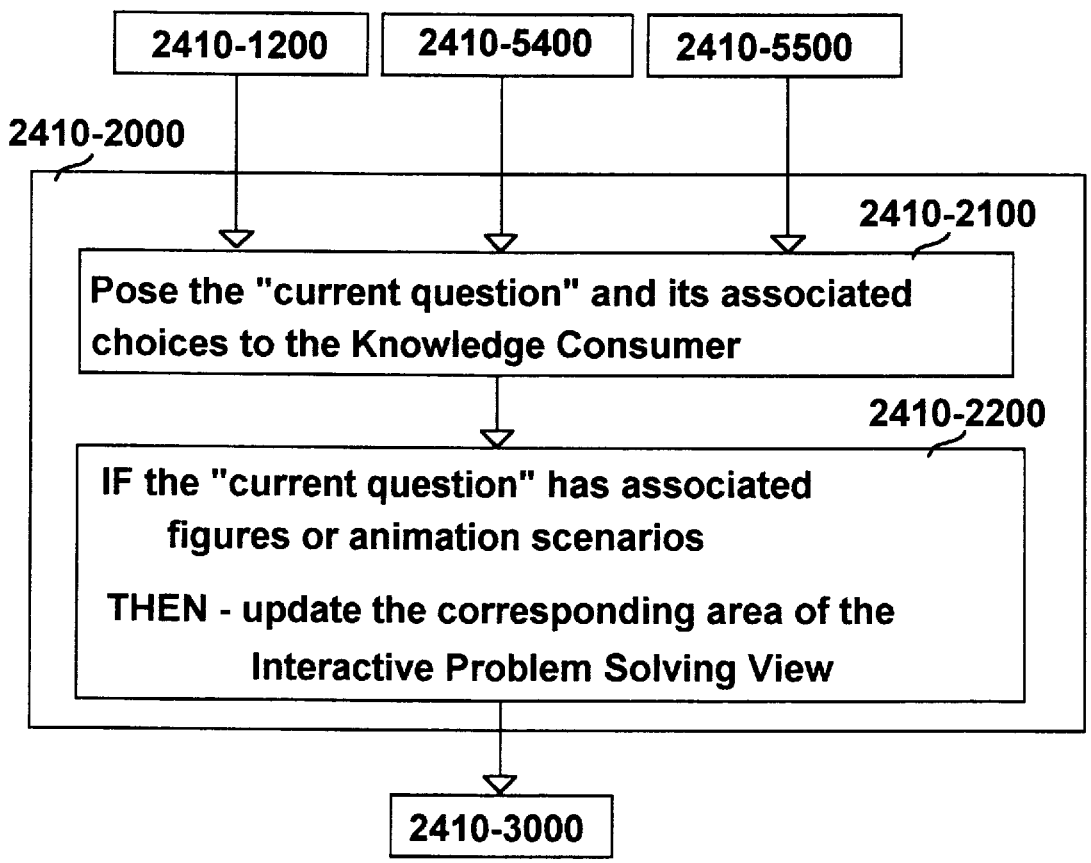
FIG. 42 is a more detailed flowchart of step 2410-2000 of the high level flowchart depicted by FIG. 40.

FIG. 42 is a detailed flowchart of step 2410-2000. It should be noted that this step can be reached from the previous step, 2410-1200, or from steps 2410-5400 and 2410-5500 which will be described herein-below. At step 2410-2100, the "current question" and its associated choices are presented to the Knowledge Consumer, and at step 2410-2200, the corresponding area of the Interactive Problem Solving View screen is updated if necessary.

Figure 43:
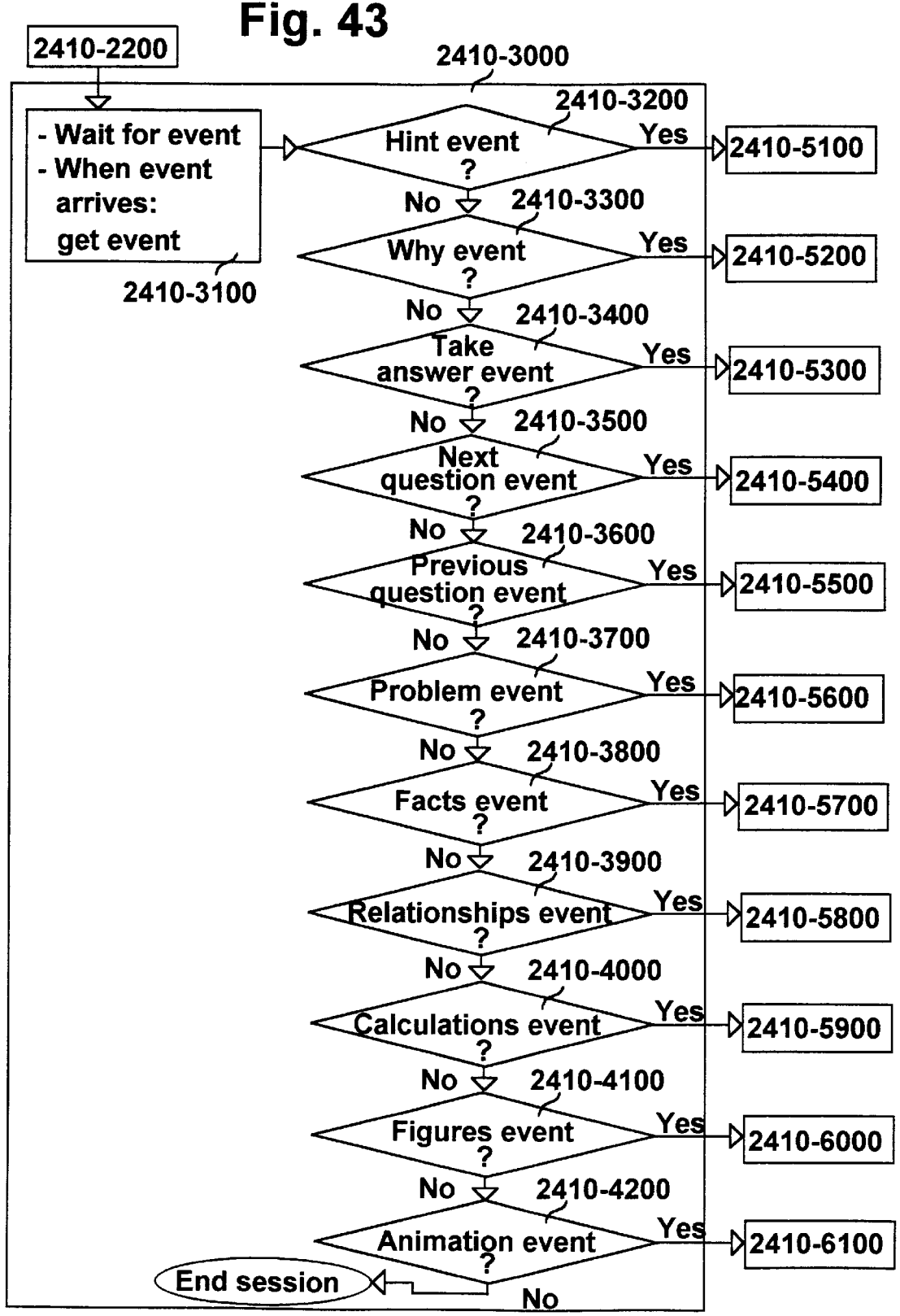
FIG. 43 is a more detailed flowchart of step 2410-3000 of the high level flowchart depicted by FIG. 40.

FIG. 43 is a detailed flowchart of the "Select event" step 2410-3000 shown in FIG. 40. The following are the main events which may occur during a problem solving session: Hint, Why, Take answer, Next question, Previous question, Problem statement, Facts, Relationships, Calculations, Figures, and Animation. As soon as the event has been identified, the system goes to the corresponding processing step.

Figure 44:
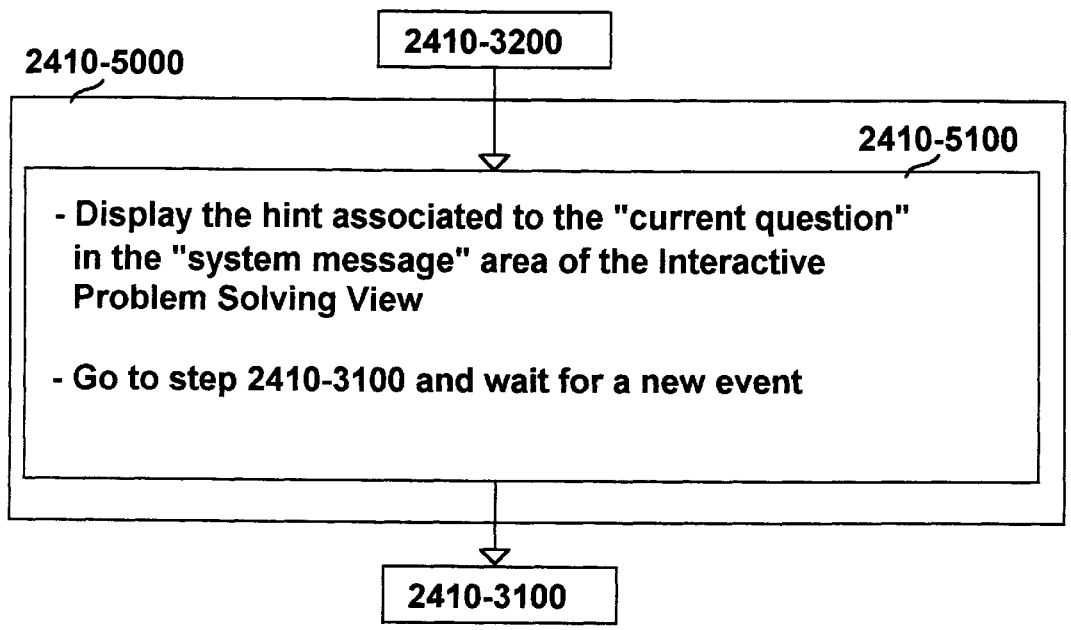
FIG. 44 shows the processing stage of the Hint event.

FIG. 44 shows the flowchart associated to the processing of the Hint event. At step 2410-5100, the corresponding hint message of the question posed is displayed in the "system message" area of the Interactive Problem Solving View screen, and the system goes to step 2410-3100 to wait for a new event.

Figure 45:
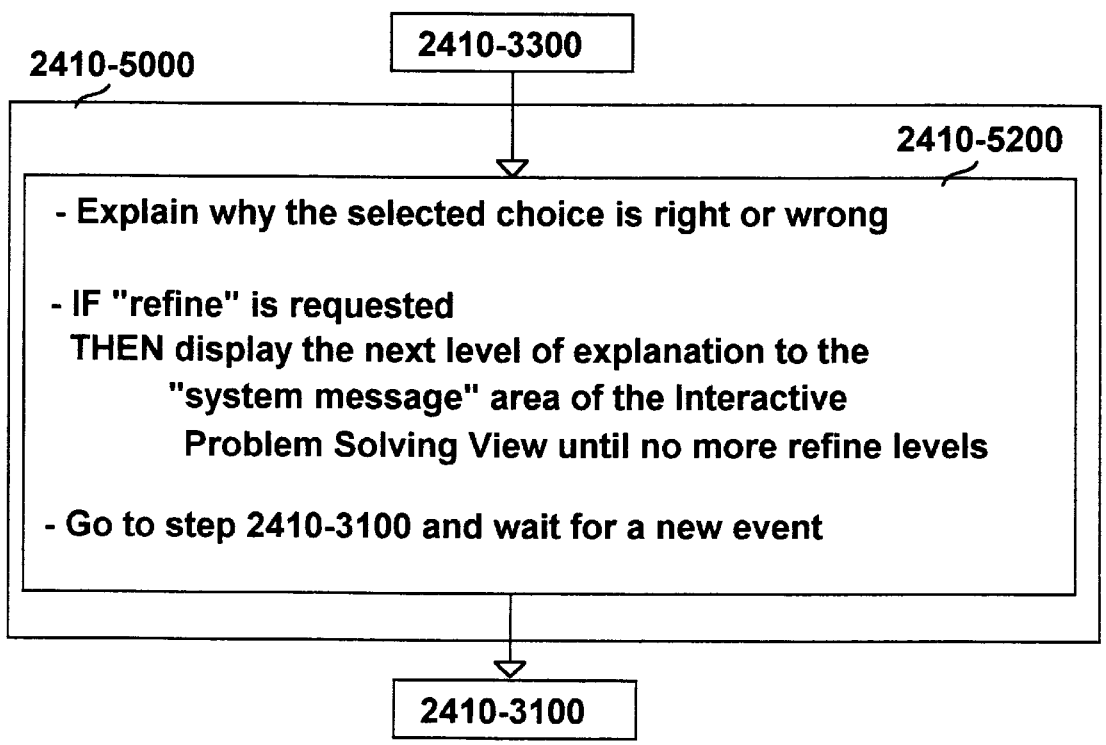
FIG. 45 shows the processing stage of the Why event.

FIG. 45 is a flowchart showing the processing of the Why event. As discussed above, the Why event explains to the Knowledge Consumer the reason why the selected choice represents the best, the worst, or not the best answer. If this does not satisfy the Knowledge Consumer, the next level of the explanation can be invoked through the refine mechanism described above under FIG. 29.

Figure 46:
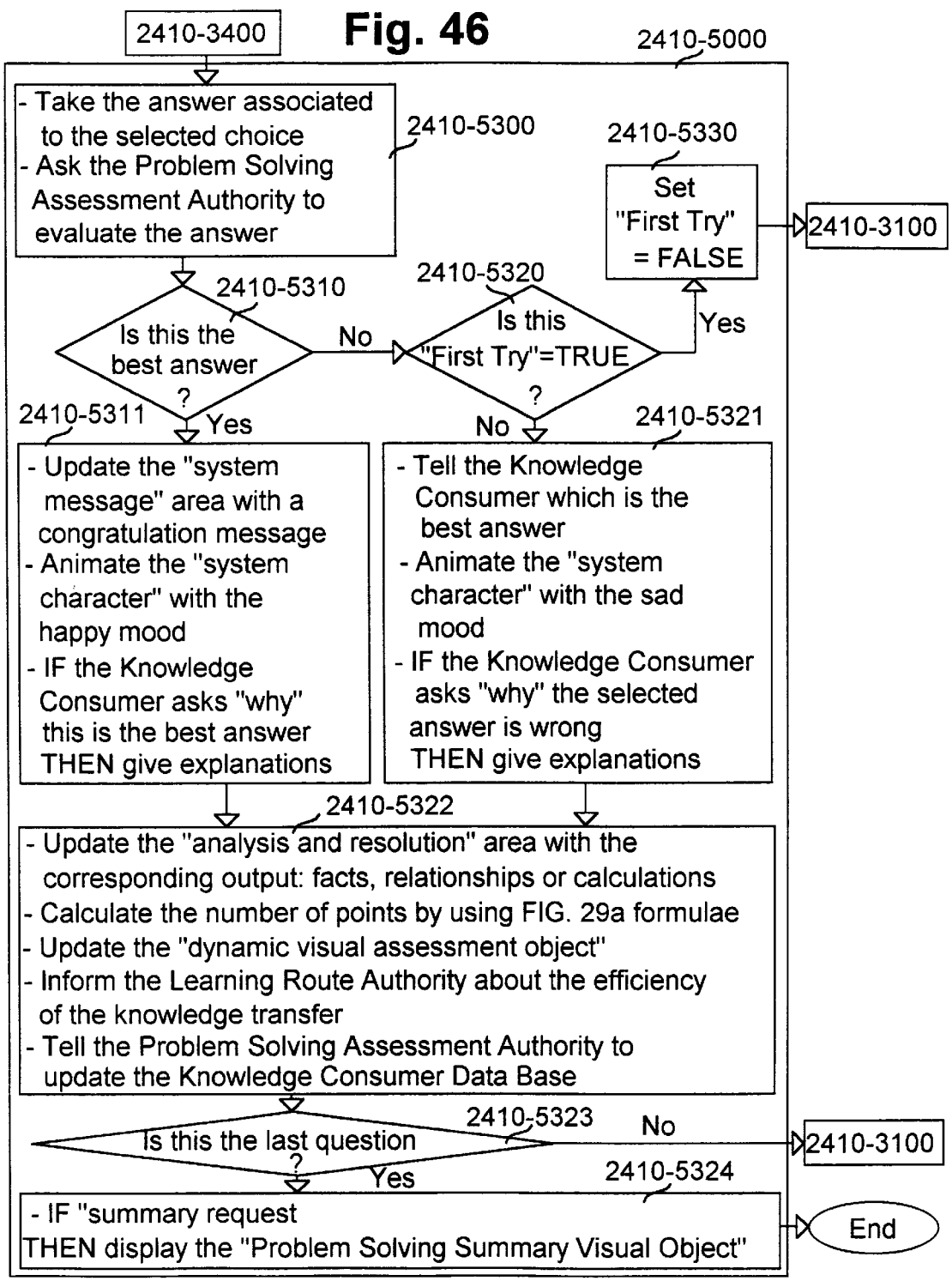
FIG. 46 shows the processing stage of the Take Answer event.

FIG. 46 is a detailed flowchart of step 2410-5000 for the Take answer event. At step 2410-5300, the Knowledge Consumer's answer is evaluated by the Problem Solving Assessment Authority 1242 of FIG. 2d. A decision is made at step 2410-5310 with regard to the choice selected. If this is not the best answer, at step 2410-5320, the system verifies the value of the "First Try" flag. If this was the first time the Knowledge Consumer tried to respond to the "current question", step 2410-5330 sets the "First Try" flag to FALSE and informs the Knowledge Consumer of the mistake. Next, the system gives one more chance to the Knowledge Consumer by going to step 2410-3100 (see FIG. 43) and waiting for a new event.

Continuing from step 2410-5310, if the selected choice represents the best answer, step 2410-5311 congratulates the Knowledge Consumer by voice and/or visual means. If a Why (or Why followed by refine) event is generated (by the Knowledge Consumer) then a message explaining the reason why this represents the best answer is displayed in the message area of the Interactive Problem Solving View screen. At the same time, the "system character" is animated to show a happy mood. The idea behind this character is that it represents the Knowledge Provider, namely the system, which participates in the Learning Process not as a competitor but rather as someone who wants to help the Knowledge Consumer. Therefore, every time the Knowledge Consumer succeeds, the system shows its happiness for his/her success. Contrary, when the Knowledge Consumer fails to get the right answer, even after the second try, the system displays its sadness by animating the "system character" in an appropriate manner.

The "system character" idea represents another objective of the present invention, namely, to highlight that the two parties involved in the Learning Process (the Knowledge Provider and the Knowledge Consumer) work together as a unit in order to achieve a highly efficient knowledge transfer. As described above, this transfer is done in small increments by each question. After each increment, the knowledge transfer is evaluated and the result generates a common emotional state for both parties.

Continuing from step 2410-5320, if the Knowledge Consumer makes a wrong selection (on the second try), at step 2410-5321, the system displays the right answer and the "system character" is animated for the sad mood. At this stage, if the Knowledge Consumer generates a Why (or a Why followed by refine) event, the system gives the necessary explanations. Next, at step 2410-5322, the following main activities are performed: 1) the "analysis and resolution" area of the Interactive Problem Solving screen is updated with the corresponding output resulting from the "current question"; 2) the number of points obtained for the "current question" are calculated by the Problem Solving Assessment Authority 1242 of FIG. 2d by using the formula (1) presented by FIG. 29a; 3) the "Dynamic Visual Assessment Object" is updated to show the number of points obtained for the "current question"; 4) the Learning Route Authority 1241 of FIG. 2d is informed about the efficiency of the knowledge transfer; 5) the corresponding entry in the Knowledge Consumer Data Base 1430 of FIG. 2 is updated by the Problem Solving Assessment Authority with the number of points obtained. Step 2410-5323 is a decision point with regard to the "current question". If this is not the last question of the "current problem" then the system goes to step 2410-3100 to wait for a new event. Usually, at this point, the Next question event follows. Contrary, if the "current question" is the last question, then, means for invoking the "Problem Solving Summary Visual Object" are provided at step 2410-5324.

The "Problem Solving Summary Visual Object" represents another improvement of the present invention. It shows, in a visual way, the essential steps taken by the Problem Solving Method to solve the "current problem". The idea behind this object is to present to the Knowledge Consumer a visual summary statement with the following content: 1) problem input, namely, the given data and facts; 2) problem reasoning, namely, the important steps made during the reasoning process along with their order; and 3) problem output, namely, the data and facts obtained as a result of reasoning made upon the problem input along with the conclusion reached.

Figure 47:
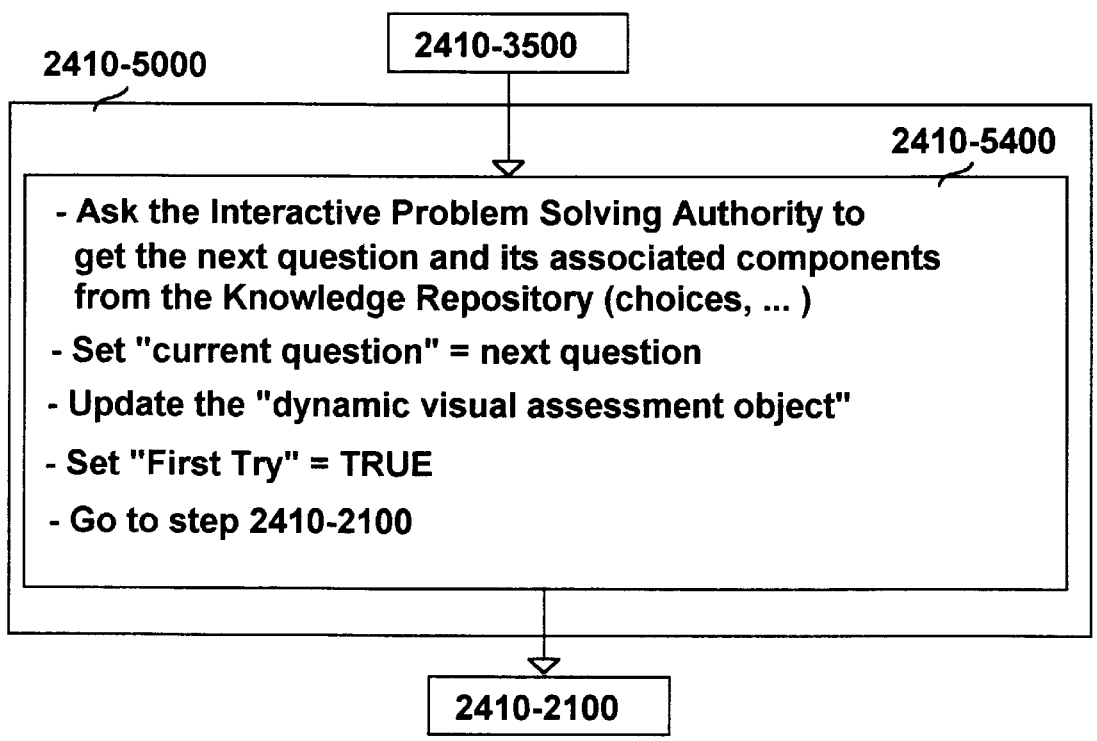
FIG. 47 shows the processing stage of the Next question event.

FIG. 47 is a detailed flowchart showing the processing of the Next question event. At step 2410-5400, the following actions are taken: 1) the Interactive Problem Solving Authority 1221 of FIG. 2b extracts the next question from the Knowledge Repository and its associated components such as choices, figures, and animation scenarios; 2) the "current question" variable is set to the new question; 3) the "Dynamic Visual Assessment Object" is updated to show the maximum number of points the new question has; and 4) the "First Try" flag is set to TRUE. Finally, the system goes to step 2410-2100 to pose the question to the Knowledge Consumer.

Figure 48:
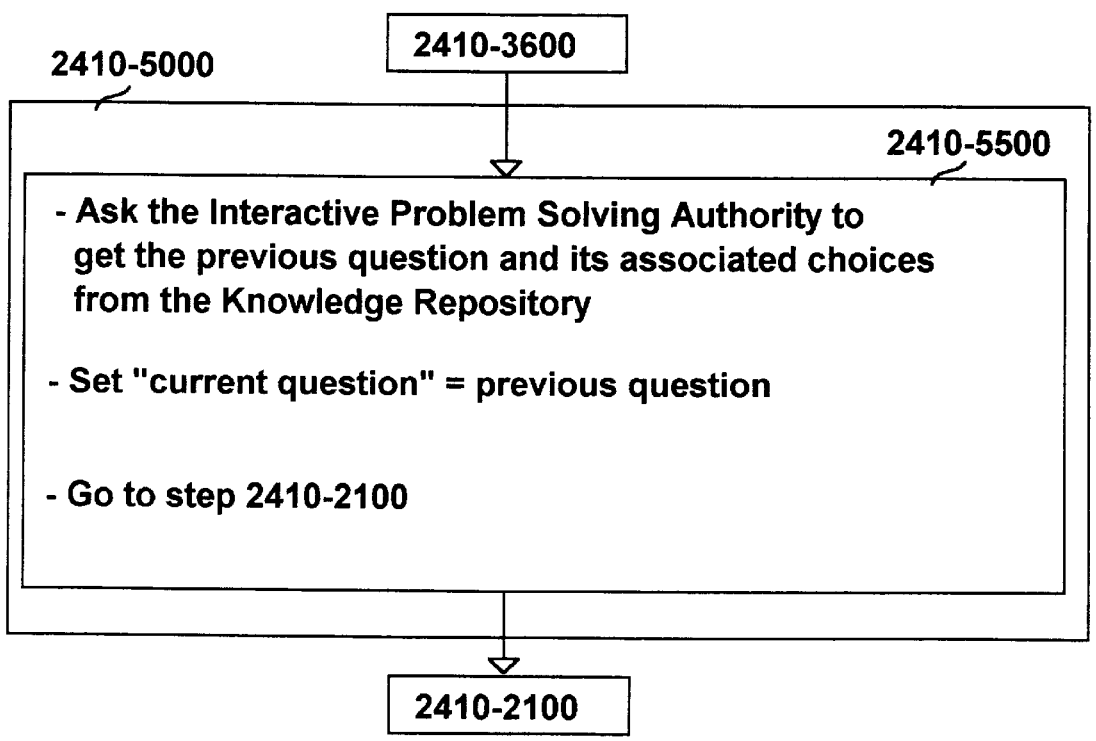
FIG. 48 shows the processing stage of the Previous question event.

FIG. 48 shows the small steps the system takes to process the Previous question event. It should be noted that together, the Previous and Next question events provide a means for Knowledge Repository navigation at the problem level (Problem scope—see discussion above—under FIG. 32).

Figure 49:
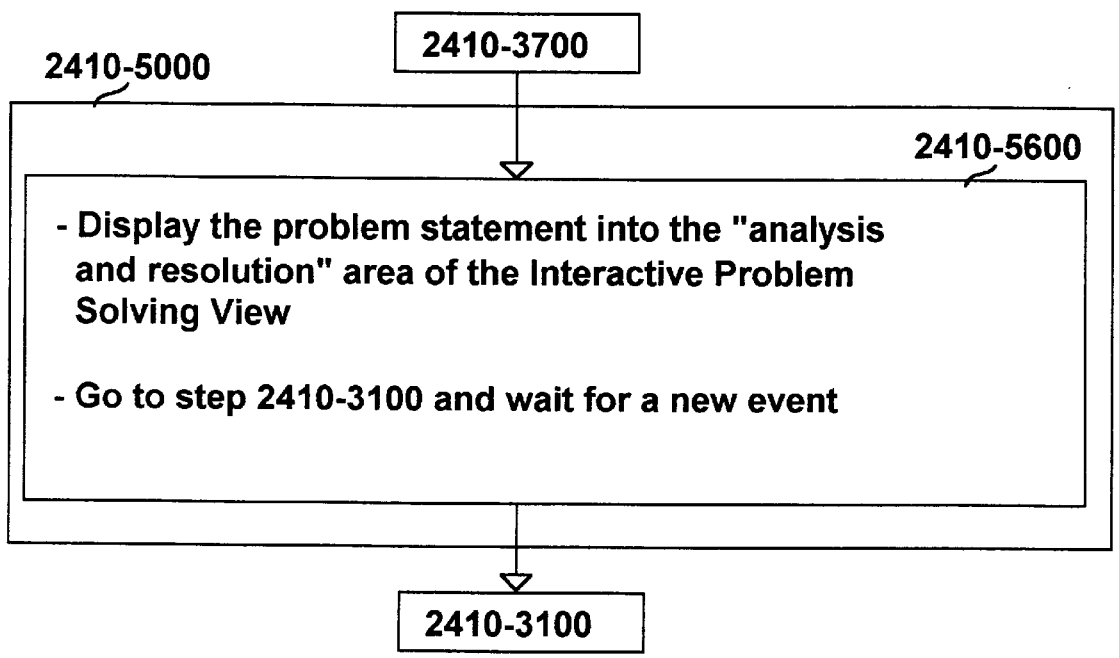
FIG. 49 shows the processing stage of the Problem statement event.

FIG. 49 represents the processing of the Problem statement event. At step 2410-5600 the problem body is extracted from the Knowledge Repository and displayed in the analysis and resolution area of the Interactive Problem Solving View screen.

Figure 50:
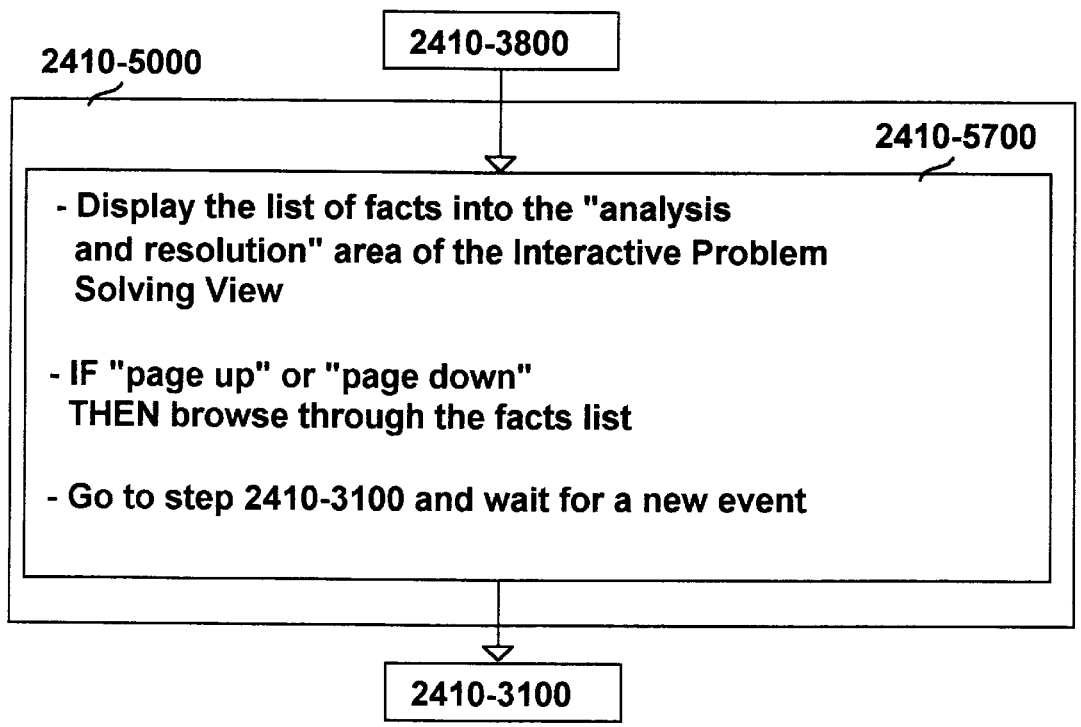
FIG. 50 shows the processing stage of the Facts event.

FIG. 50 is a flowchart representing the processing of the Facts event. As shown at step 2410-5700, a means of browsing through the list of facts is provided by the generation of two events, namely, Page up and Page down.

Figure 51:
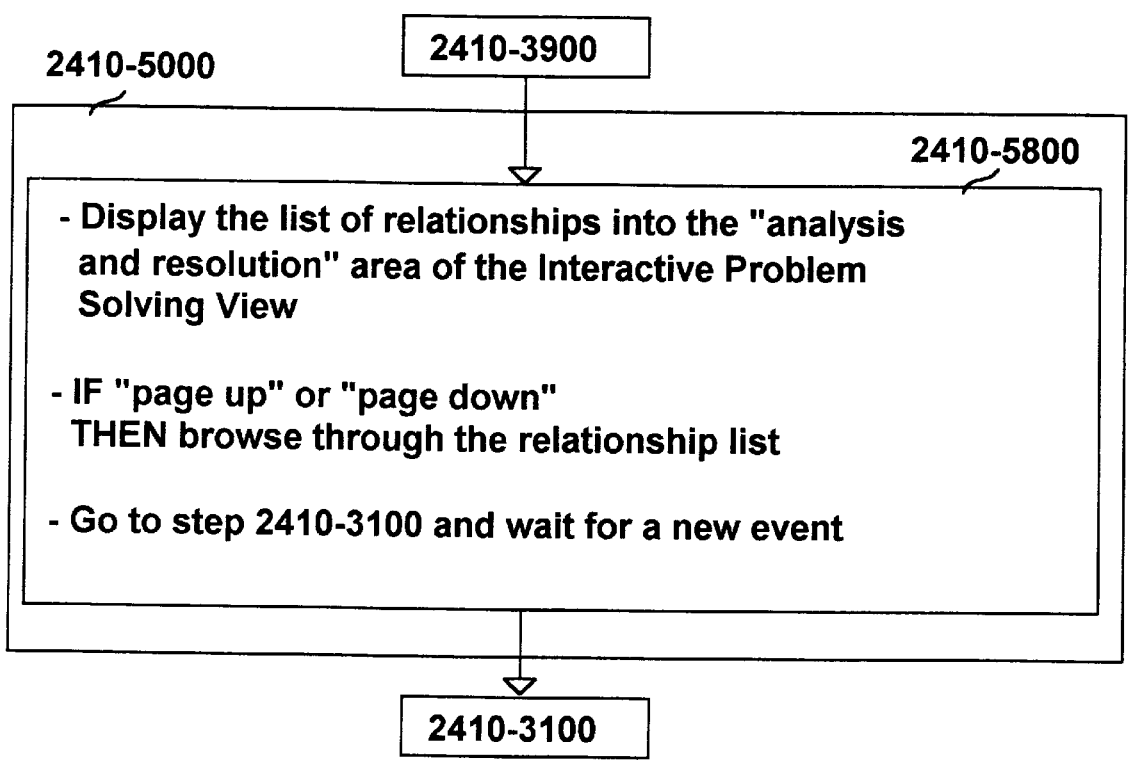
FIG. 51 shows the processing stage of the Relationships event.

FIG. 51 is a flowchart representing the processing of the Relationships event. As shown at step 2410-5800, the same kind of browsing mechanism (Page up and Page down) through the relationship list is provided.

Figure 52:
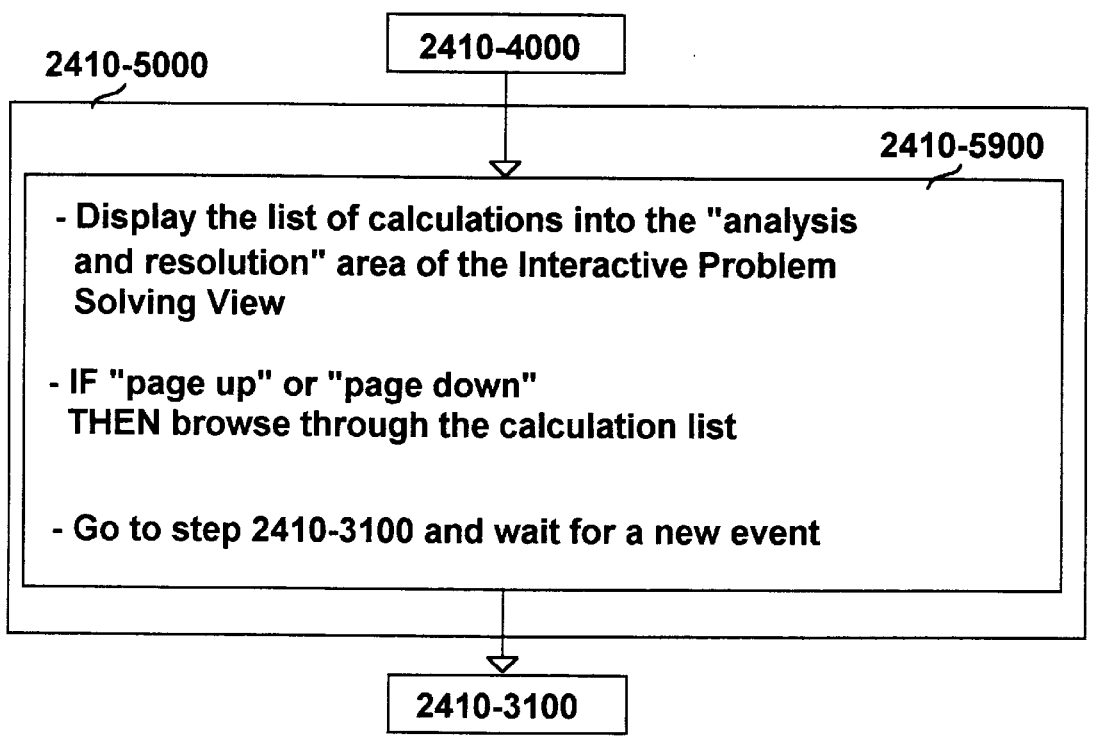
FIG. 52 shows the processing stage of the Calculations event.

FIG. 52 is a flowchart representing the processing of the Calculations event. Step 2410-5900 shows the same kind of browsing mechanism (Page up and Page down) through the calculation list.

Figure 53:
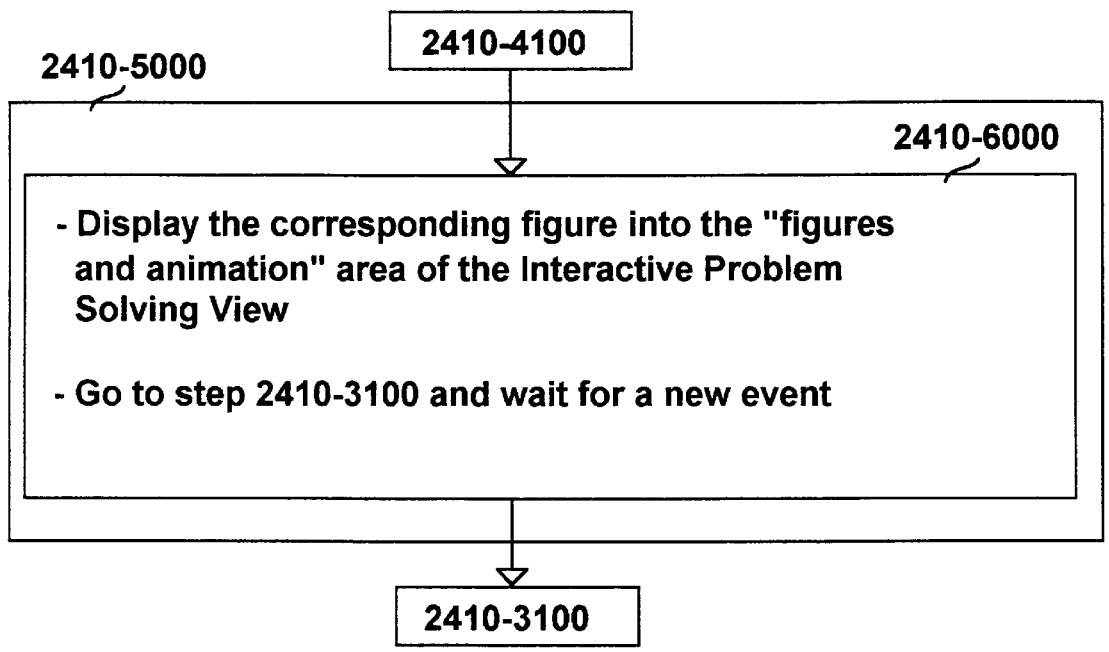
FIG. 53 shows the processing stage of the Figures event.

FIG. 53 represents the processing of the Figures event. Step 2410-6000 displays the corresponding figure in the figure animation area of the Interactive Problem Solving View screen.

Figure 54:
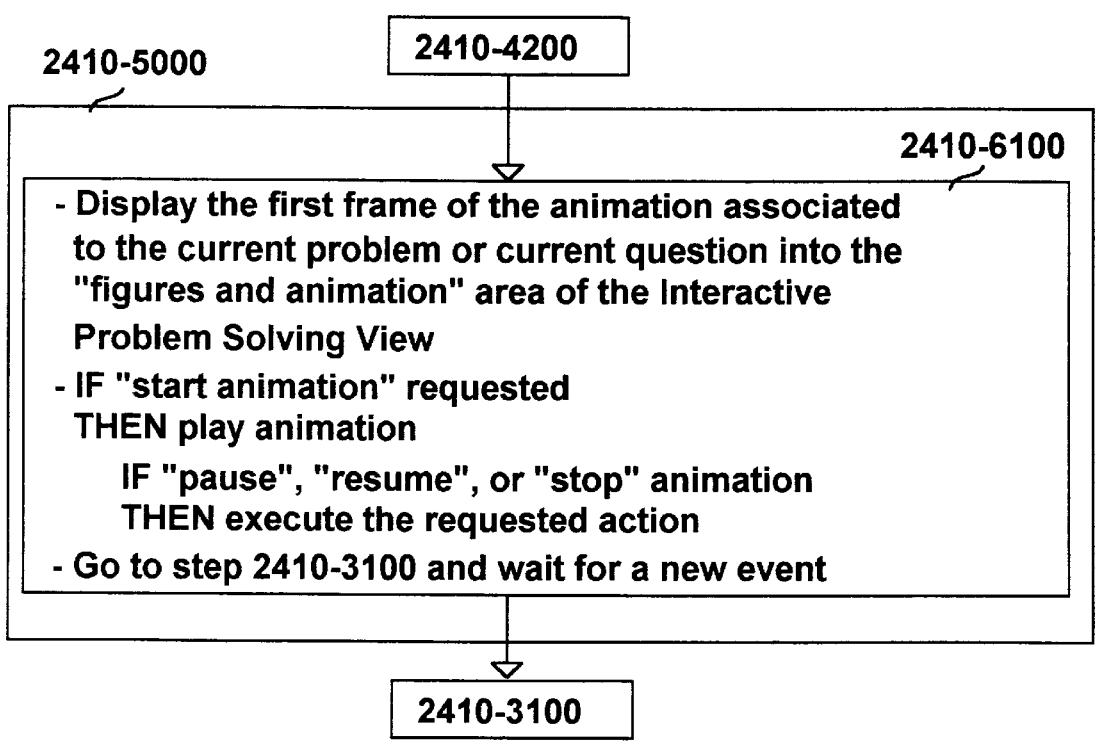
FIG. 54 shows the processing stage of the Animation event.

FIG. 54 represents the processing of the Animation event. Step 2410-6100 displays the first frame of the animation scenario corresponding to the "current problem" or "current question" in the figure animation area of the Interactive Problem Solving View screen. Means of control, such as start, pause, resume, and stop animation is provided.

FIG. 55 shows the main components of a Lab Experiment. The title is a concise and informative identification of the experiment. The objective represents a very clear statement of the experiment's purpose. An experiment is divided into a number of small tasks to be performed by the Knowledge Consumer under the system guidance. These tasks are described as a unit by a Procedure including how to set up the apparatus, what are the main measurements to be made, and what are the calculations to be performed (if any). An experiment is supported by a theory, and needs a set of apparatus and instruments in order to be performed. Finally, an experiment has an associated conclusion.

Figure 56:
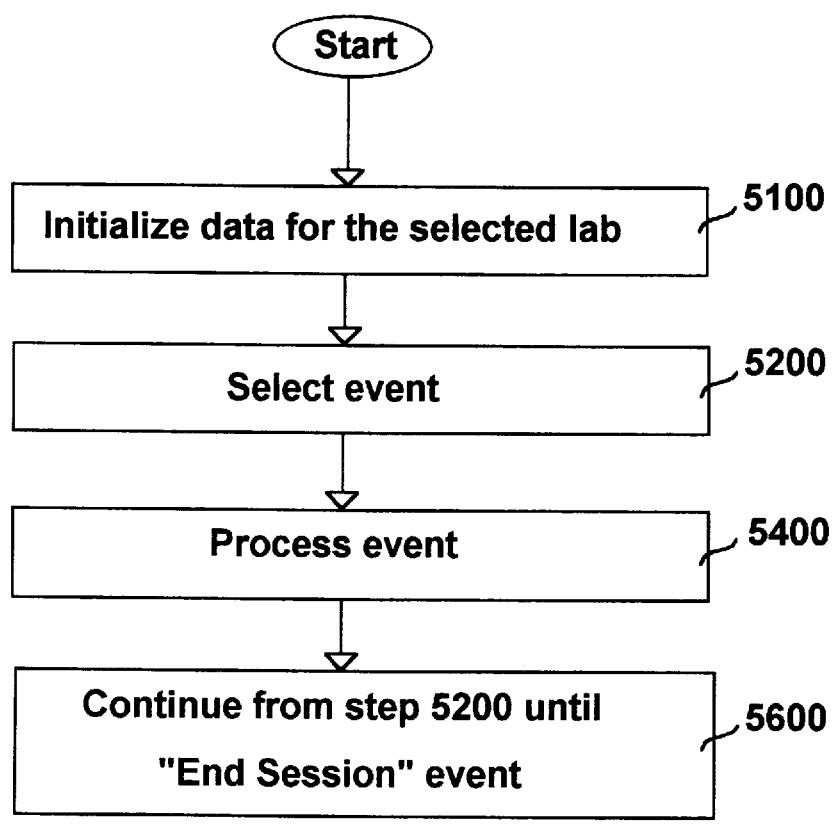
FIG. 56 is a high level flowchart of the Interactive Lab Experiment Method.

FIG. 56 is a high level flowchart of the Interactive Lab Experiment Method presented by the present invention. All the steps involved are explained in more detail by the following figures.

Figure 57:
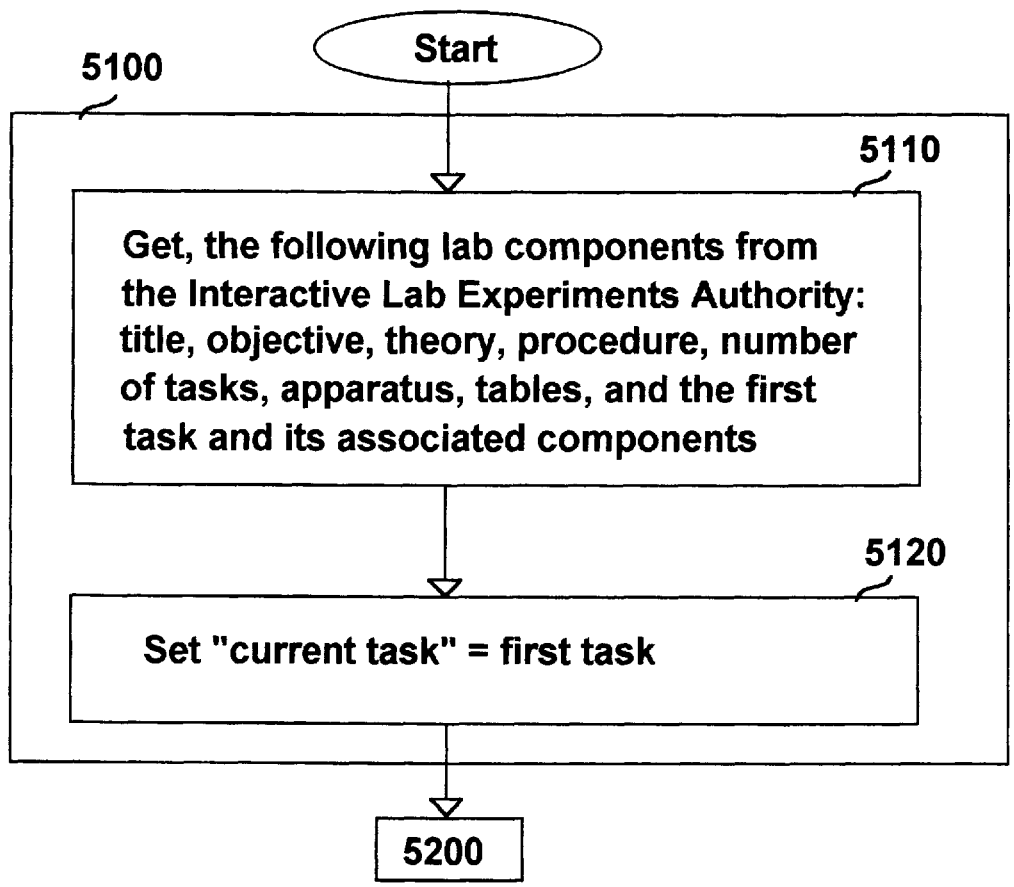
FIG. 57 is a more detailed flowchart of step 5100 of the high level flowchart depicted by FIG. 56.

FIG. 57 is an initialization step where some lab components are extracted from the Knowledge Repository 1410 of FIG. 2 by the Interactive Lab Experiments Authority 1223 of FIG. 2b.

Figure 58:
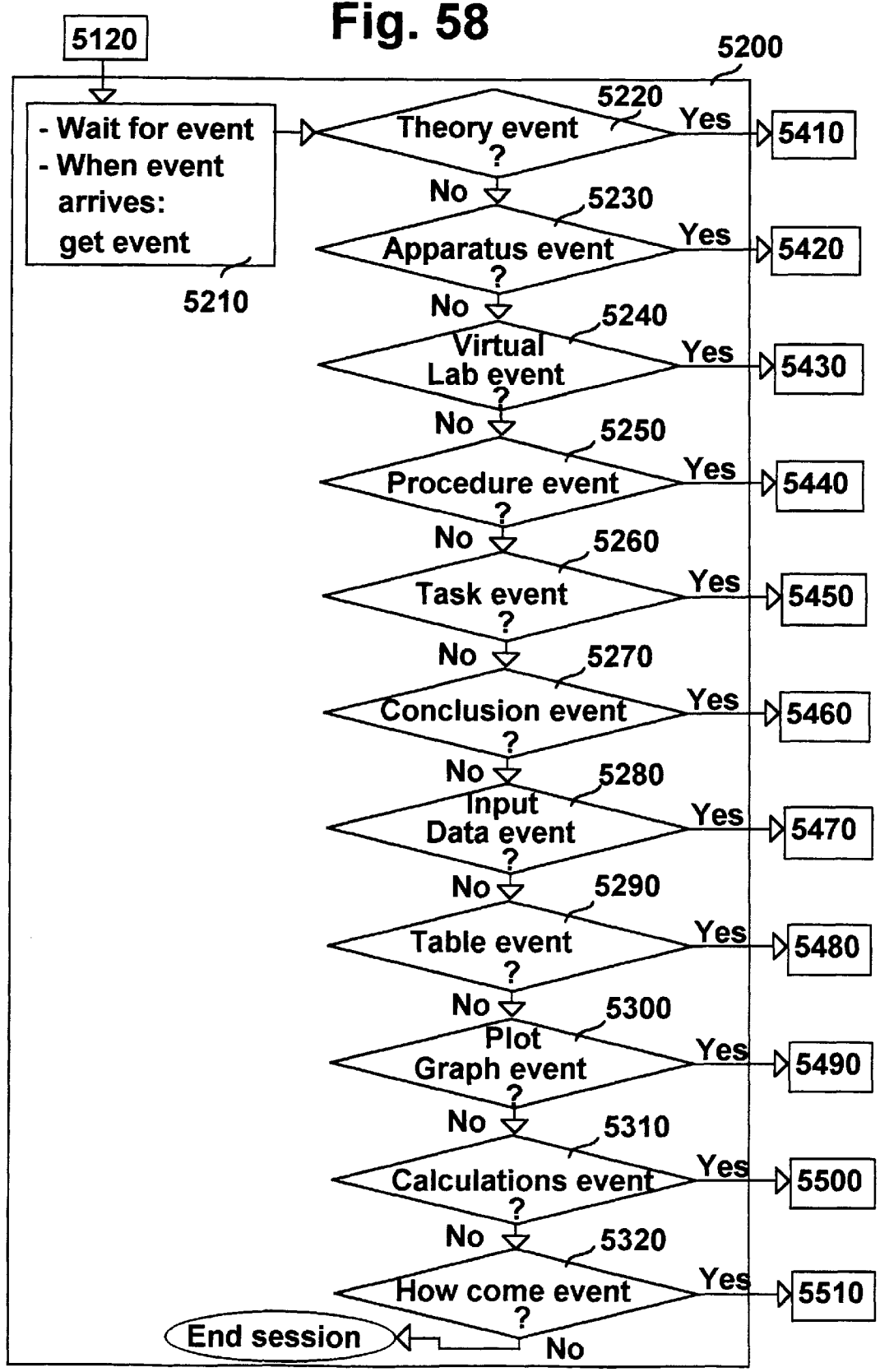
FIG. 58 is a more detailed flowchart of step 5200 of the high level flowchart depicted by FIG. 56.

FIG. 58 is a select event stage. The following events can be present: Theory, Apparatus, Virtual Lab, Procedure, Task, Conclusion, Input Data, Table, Plot Graph, Sample Calculations, and How come. Each of these events is processed at the next stage.

Figure 59:
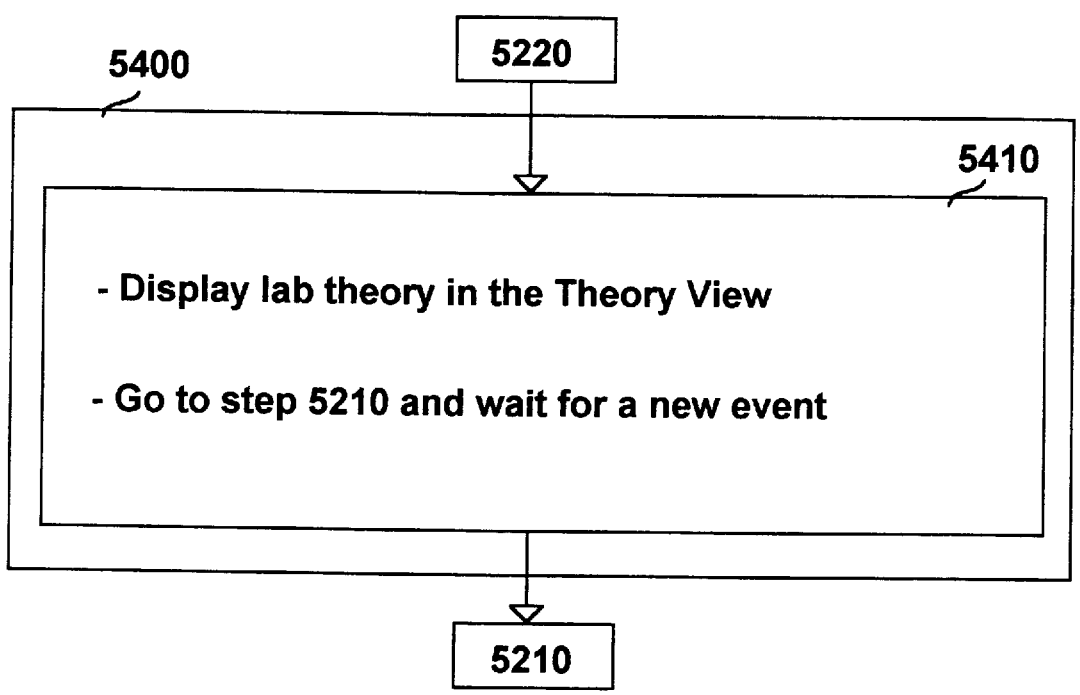
FIG. 59 is a flowchart showing the processing stage of the Theory event.

FIG. 59 shows the processing of the Theory event. The theory behind the experiment is displayed to the Knowledge Consumer in the Theory View screen.

Figure 60:
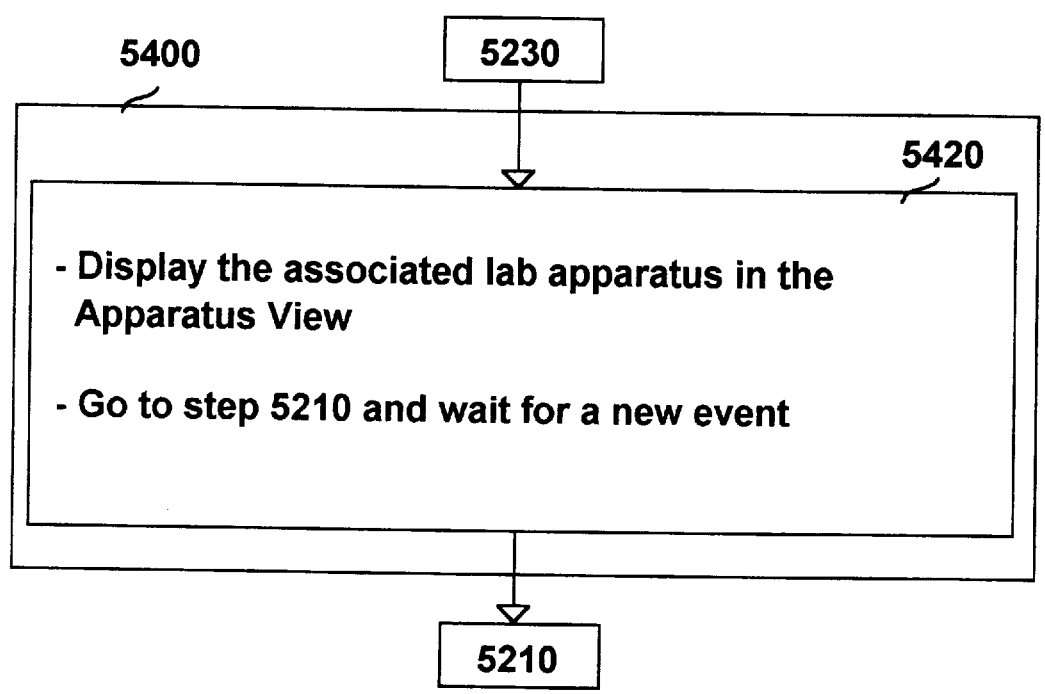
FIG. 60 is a flowchart showing the processing stage of the Apparatus event.

FIG. 60 shows the processing of the Apparatus event. All instruments and apparatus are displayed visually along with their errors or relative uncertainties which affect the measurements.

Figure 61:
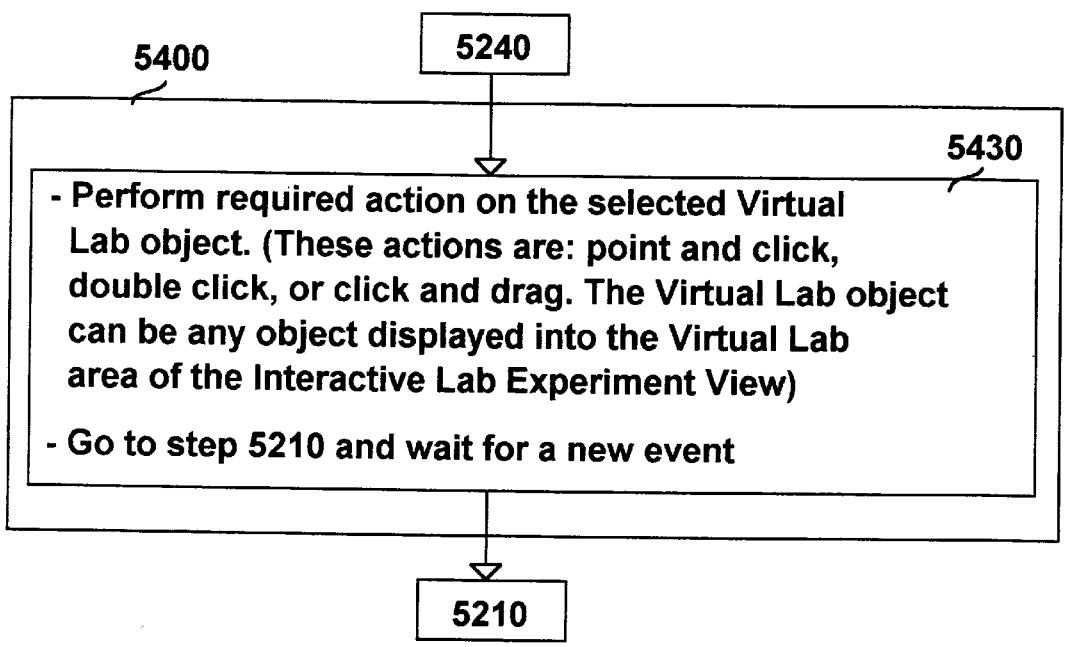
FIG. 61 is a flowchart showing the processing stage of the Virtual Lab events.

FIG. 61 is a flowchart showing the processing of the Virtual Lab events. These events are generated by the pointing device (controlled by the Knowledge Consumer) in the Virtual Lab area of the Interactive Lab Experiment View screen. They act on the virtual lab working objects and can be any combination of point and click, double click, and click and drag. For example, at a given task, the Knowledge Consumer may be asked by the system to move some objects in different regions of the Virtual Laboratory area, or put an object into another object (simulating measurements). The "do it yourself" character of this method should be noted. All the tasks, including measurements and calculations (if required) are executed by the Knowledge Consumer at the system guidance. All the observations and results are collected and analyzed by the system.

Figure 62:
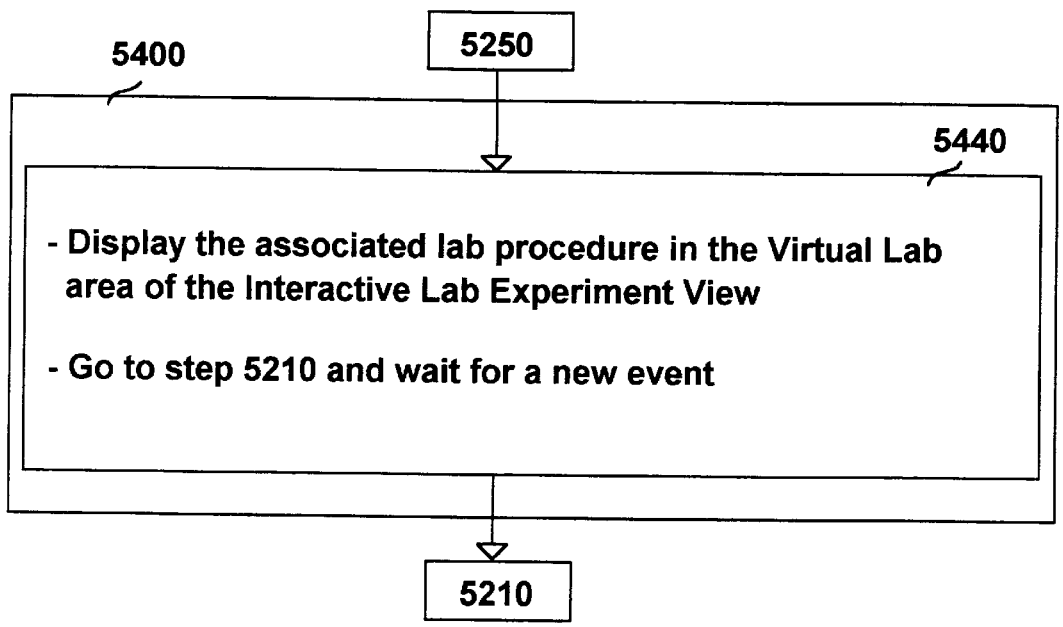
FIG. 62 is a flowchart showing the processing stage of the Procedure event.

FIG. 62 shows the processing of the Procedure event, namely, the procedure associated to the experiment is displayed in the Virtual Laboratory of the Interactive Lab Experiment View screen.

Figure 63:
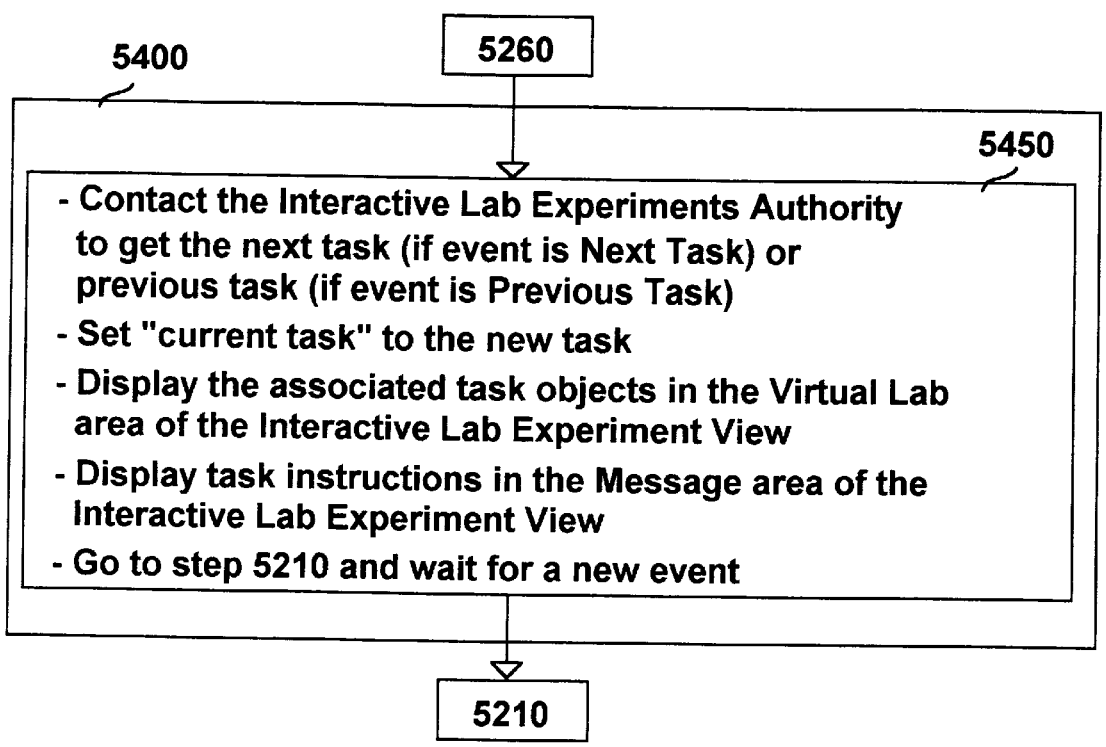
FIG. 63 is a flowchart showing the processing stage of the Task event.

FIG. 63 shows what happens when a Task event comes in, namely, Next Task or Previous Task.

Figure 64:
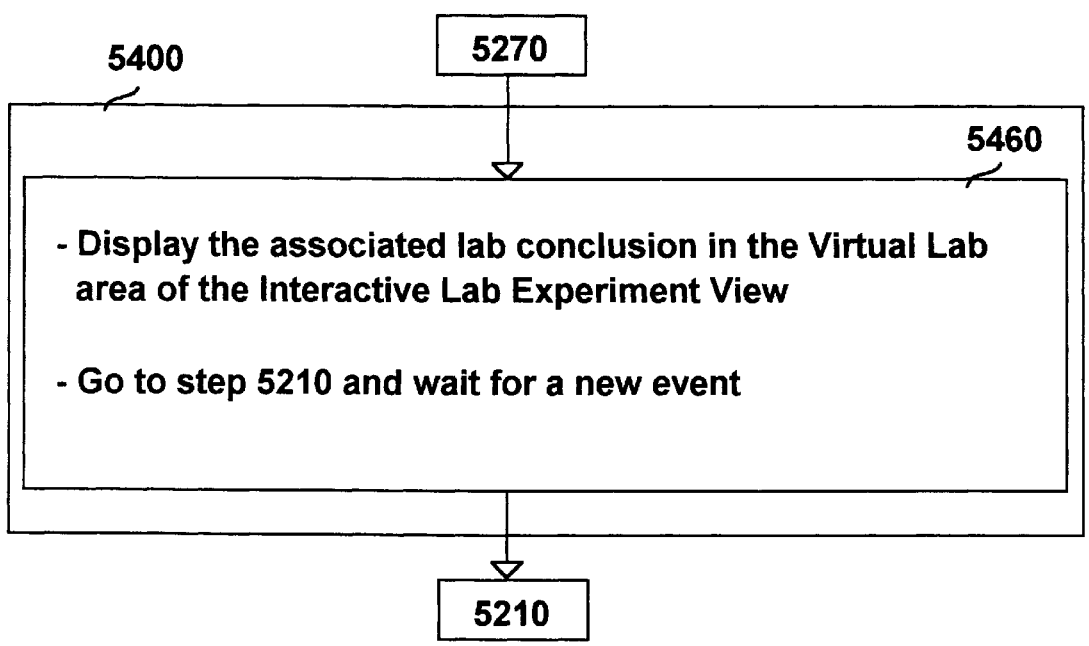
FIG. 64 is a flowchart showing the processing stage of the Conclusion event.

FIG. 64 shows the processing of the Conclusion event, namely, the lab conclusion is extracted from the Knowledge Repository 1410 of FIG. 2 by the Interactive Lab Experiments Authority 1223 of FIG. 2b and displayed to the Knowledge Consumer. This event can be generated only after the last task of the experiment has been executed.

Figure 65:
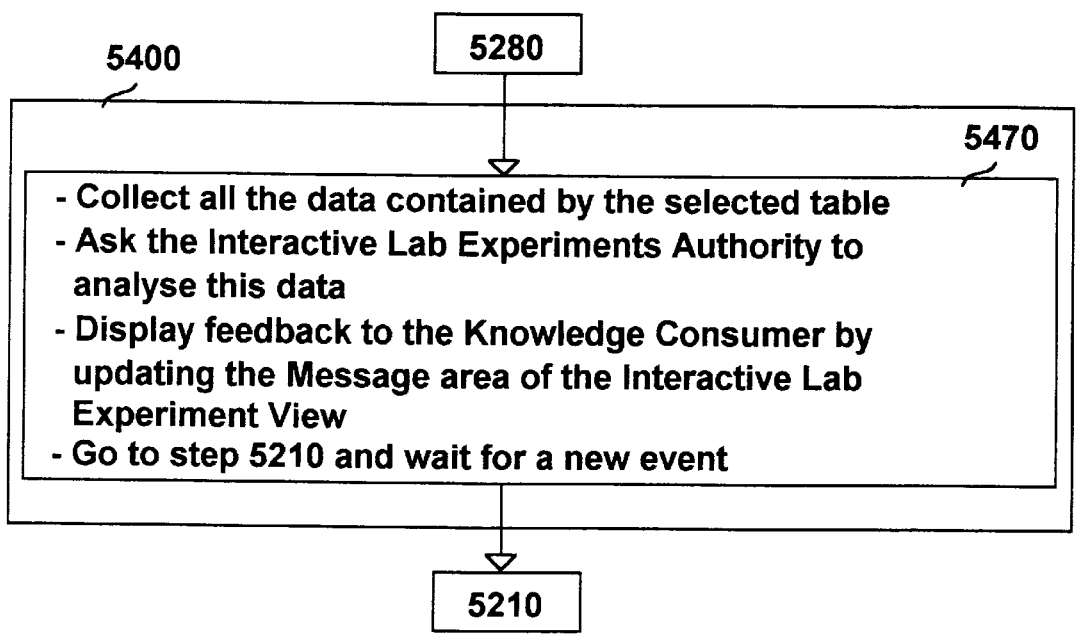
FIG. 65 is a flowchart showing the processing stage of the Input Data event.

FIG. 65 shows the processing of the Input Data event. It should be noted that the Knowledge Consumer is required to put the observation data (what has been observed or measured during the task) and the results of the data processing into a table. This implies that the Knowledge Consumer must do the actual work by himself/herself before the results are inputted into the system. The advantage of this method is the direct involvement (active role) of the Knowledge Consumer in the actual work compared with other methods where the system performs the work and the Knowledge Consumer is just a spectator (passive role).

Figure 66:
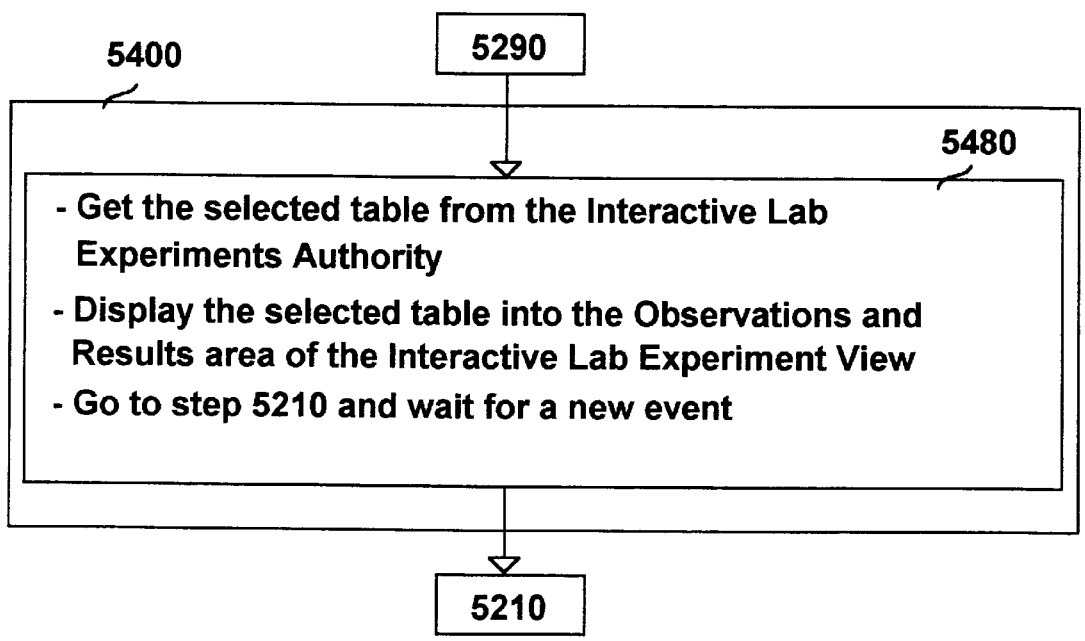
FIG. 66 is a flowchart showing the processing stage of the Table event.

FIG. 66 shows the processing of the Table event, namely, the selected table is extracted from the Knowledge Repository and displayed to the Knowledge Consumer to be filled in with observations and results data.

Figure 67:
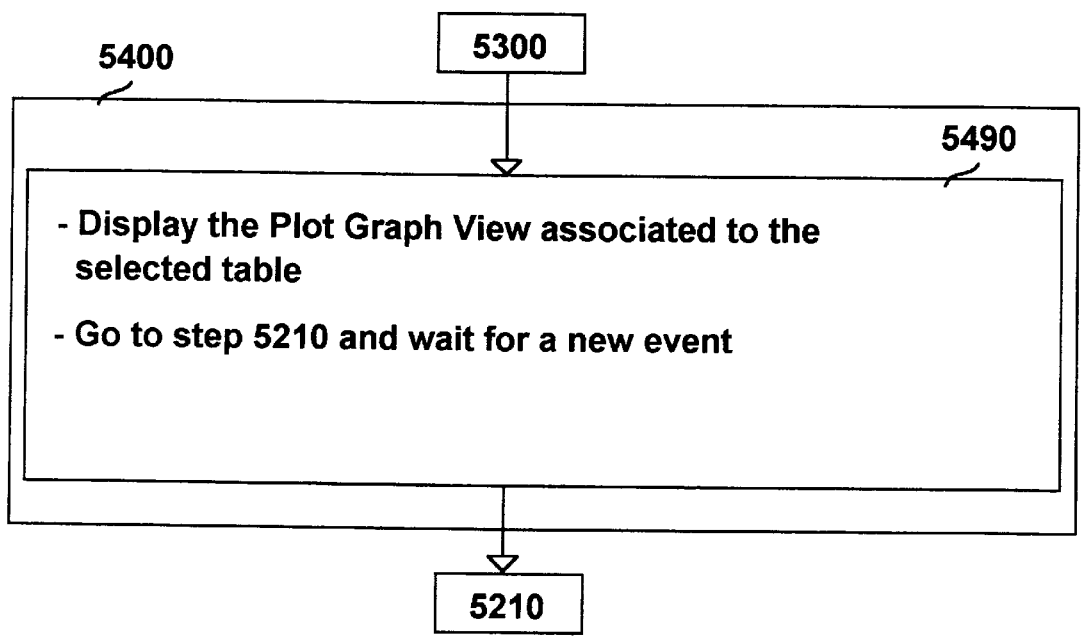
FIG. 67 is a flowchart showing the processing stage of the Plot Graph event.

FIG. 67 shows the processing of the Plot Graph event. The graph associated to the selected table is displayed. The Knowledge Consumer will do the actual plotting by marking the points on the graph.

Figure 68:
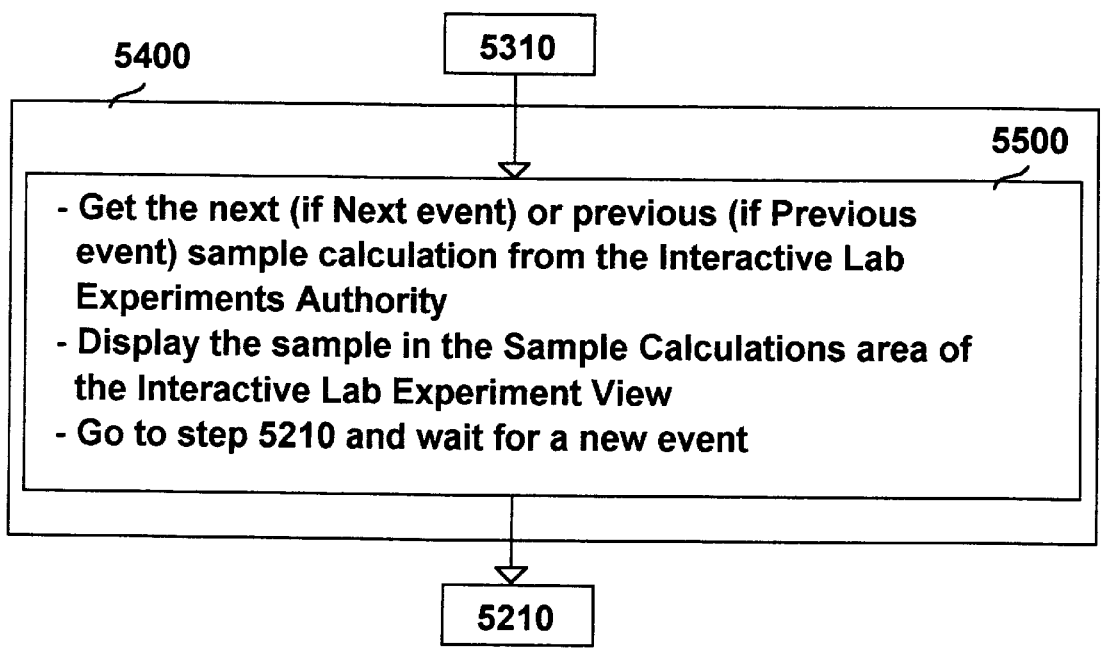
FIG. 68 is a flowchart showing the processing stage of the Sample Calculations event.

FIG. 68 shows the processing of the Sample Calculation events, namely, getting the next sample or previous sample calculation from the Knowledge Repository.

Figure 69:
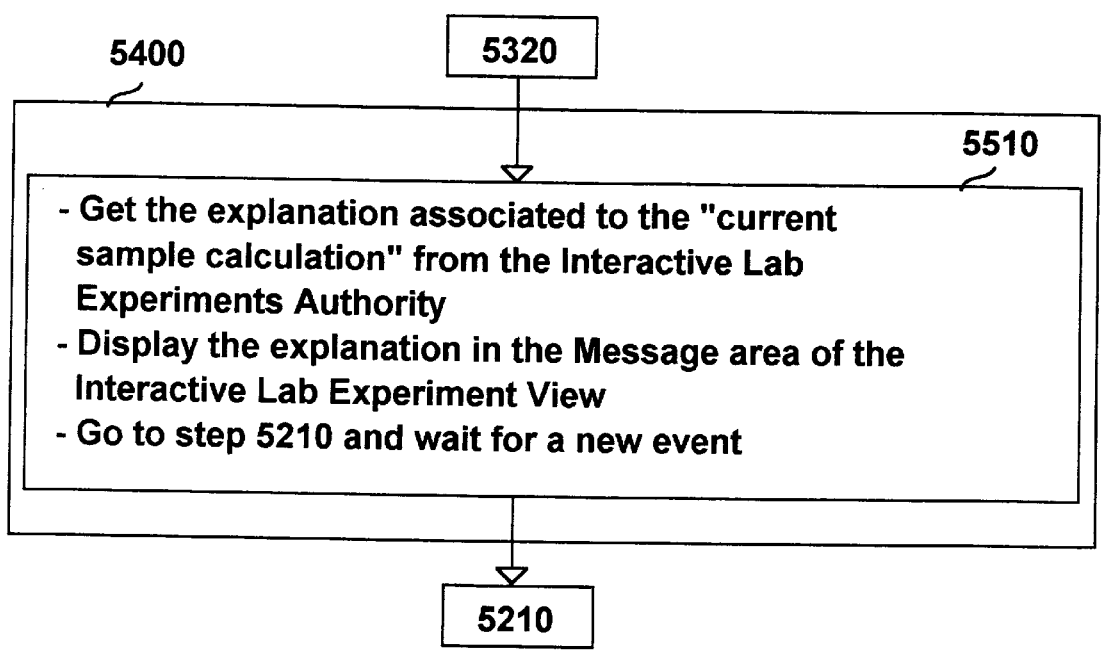
FIG. 69 is a flowchart showing the processing stage of the How come event.

FIG. 69 shows the processing of the "How come" event. If the Knowledge Consumer has a problem understanding the sample calculation displayed, the "How come" event brings the associated explanation from the Knowledge Repository and displays it in the Message area of the Interactive Lab Experiment View screen.

FIG. 70 shows the criteria a visual object must satisfy in order to visualize the Learning Process. It should be noted that a "hot area" is a small squared area of the output device (where the Visual Interface of the system is displayed) which is sensitive to the pointing device. When the pointing device enters into a "hot area" the Central Controller 1200 of FIG. 2 is notified and a specific action is initiated. For example, when a "hot area" is touched (by the pointing device) a specific piece of knowledge is extracted form the Knowledge Repository and displayed to the Knowledge Consumer. The Learning Process is a continuous process which evolves over time. For humans, it starts when we are born and ends when life stops. For societies, it began long, long ago and continues today and into the future. The Learning Process is also interactive, namely, during the learning of new concepts some of the previously learned concepts are re-learned and solidified. This has been achieved by the present invention through the Adaptive Problem Solving Method, namely, by the transformation of a Main Concept into a Secondary Concept, which can appear again any time during the Learning Process.

The Learning Process is a knowledge building process, where its building blocks have a very well defined place and must come in a very well defined ordered. For example, no one is able to read a book before learning the alphabet.

Figure 70A:
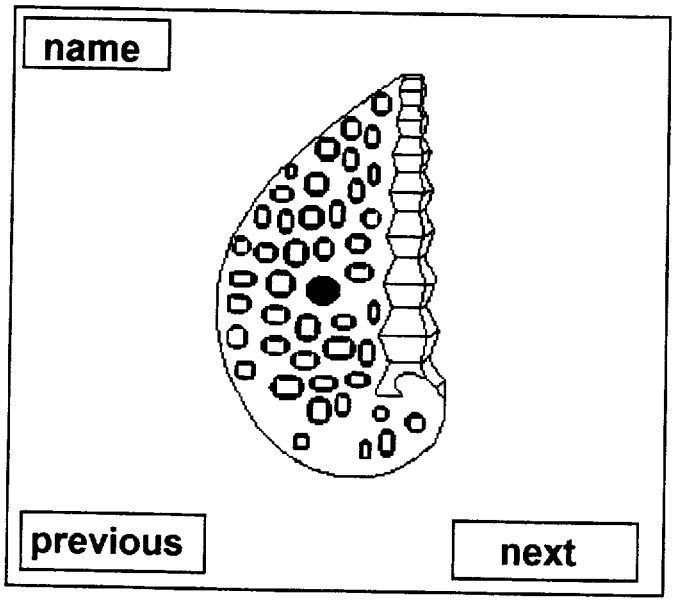
FIG. 70*a* is an example of a Learning Process Visual Object.

The above criteria is captured in the example presented by FIG. 70a. The spiral component of the object inspires the iterative nature of the Learning Process, namely, it starts at the joining point with the base of the pillar and evolves over time towards the other end of the pillar. The spiral model can be found in may places in nature and is the natural method of evolution in our universe (even the galaxies follow the spiral model). The pillar component of the object inspires the building nature of the Learning Process. Each block is a Knowledge Entity, which has been (or has to be) acquired by the Knowledge Consumer. The projection of the pillar's components are symbolically represented by the "hot areas", the spots on the spiral's surface. When the pointing device reaches a "hot area" its name is extracted immediately by the Navigation Controller 1230 of FIG. 2 from the Knowledge Repository and displayed to the Knowledge Consumer into the name box. If a selection is made (the pointer device selects a "hot area" with a click) the name of the selected "hot area" remains permanently in the name box and the selected area becomes highlighted. By activating the next and previous means the selected "hot area" moves accordingly on the spiral, these actions being equivalent with a repeatable selection of different "hot areas".

The idea of a visual object is very powerful and has two main benefits: 1) the economic use of real estate on the screen, namely, a lot of information is presented in a very tiny area (the "hot area"). To see its name (or its partial content—see FIG. 71a), the Knowledge Consumer simply has to bring the pointer device into the "hot area" (Further, the whole content of the information for a particular "hot area" can be seen by the well known technique of double clicking). The "hot area" mechanism presented by the present invention is far more economical (in terms of screen real estate) when compared with today's "list mechanism"; 2) the Knowledge Consumer can visualize immediately his/her progress in the Learning Process, namely, how far he/she has gone, and how far is still to go. These two. main advantages make the visual object idea very powerful for navigation through huge knowledge (or data) repositories.

Figure 71A:
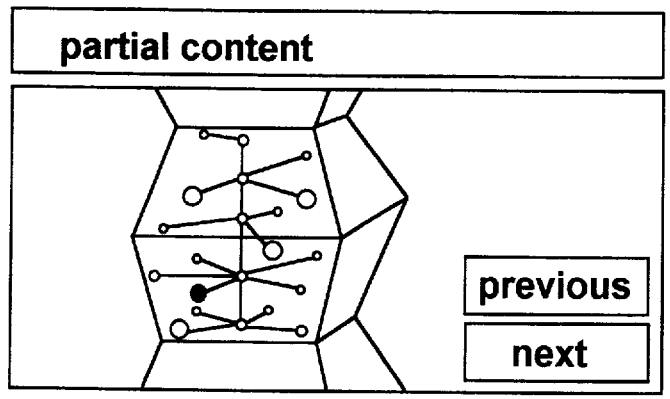
FIG. 71*a* is an example of a Knowledge Entity Visual Object.

FIG. 71 shows the criteria an object must satisfy in order to visualize a Knowledge Entity. Note that a Knowledge Entity is a container of related blocks of knowledge. FIG. 71a is an example of a possible object, showing the problems associated with a Knowledge Entity, and how they are related (the Floors, Main Problems, and Secondary Problems are shown). Each problem is a "hot area". The previous and next means provide a way to navigate inside the Knowledge Entity similar to the previous and next means discussed above for the Learning Process visualization.

Figure 72A:
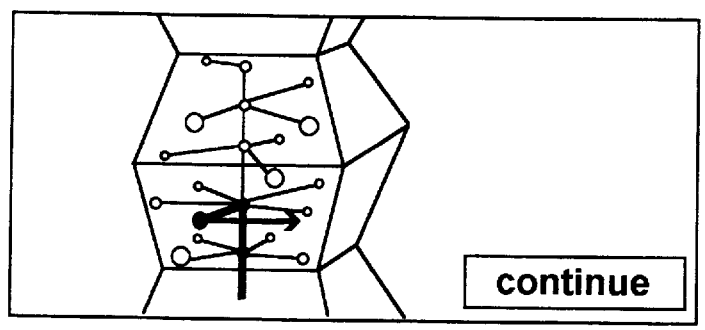
FIG. 72*a* is an example of a Dynamic Learning Route Visual Object.

FIG. 72 shows the criteria an object must meet in order to visualize the Knowledge Consumer Learning Route. FIG. 72a is an example of a possible object. Note the dynamic aspect of the object, namely, the arrow which comes from the previous Knowledge Entity is moving up in slow motion. When the continue means is activated, the arrow moves from the Main Problem of the first floor (of the Knowledge Entity shown) through to all the problems the Knowledge Consumer has resolved. The arrow stops at the last problem solved for the displayed Knowledge Entity. An activation of the continue means will show the Learning Route taken inside the next Knowledge Entity.

FIG. 73 shows the criteria an object must satisfy in order to visualize dynamic assessment. The execution of a task is an incremental activity. The incremental aspect of the Learning Process is achieved by the way a problem is solved and by the way a lab experiment is executed.

Figure 73A:
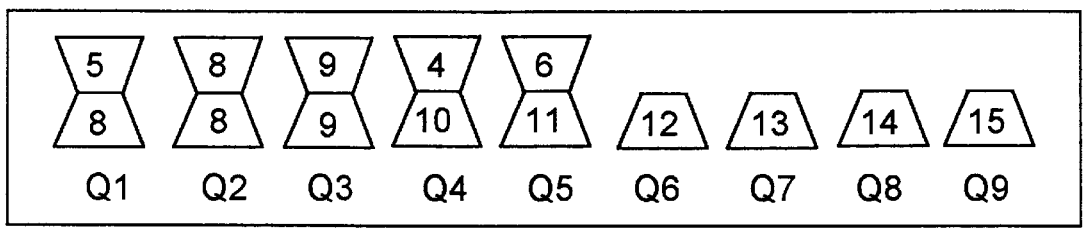
FIG. 73*a* is an example of a Dynamic Visual Assessment Object.

An example of an object which meets this criteria is shown in FIG. 73a. The status of this object indicates that the Knowledge Consumer is solving a problem which has 9 questions (Q9), and he/she is currently at question 6 (Q6). It also indicates the maximum number of points each question possesses (for example, Q6 has 12 points) and the number of points the Knowledge Consumer received for each question (for example, at Q5 the Knowledge Consumer received 6 points out of a possible 11).

The main benefits of this method of visualizing the assessment are: 1) economic use of the real estate on the screen, namely, the result of the assessment process can be displayed in a very small area. This is far more efficient (in terms of screen real estate) than the currently known bar, or pie charts; 2) the dynamic aspect, namely, the Knowledge Consumer continuously sees how he/she is doing (in terms of knowledge transfer efficiency) without having to do anything. As soon as a question is answered (after the Second Try), this object is updated automatically by the system as described above.

FIG. 74 shows the criteria an object must satisfy in order to visualize the Problem Solving Summary. The idea is to capture, in a visual way, the main items (such as facts and their relationships) of a problem along with the main reasoning steps made to reach the conclusion. The benefit of such an object is its value for the Knowledge Consumer, namely, it provides a visualization of the essence of the problem solving process.

Figure 75:
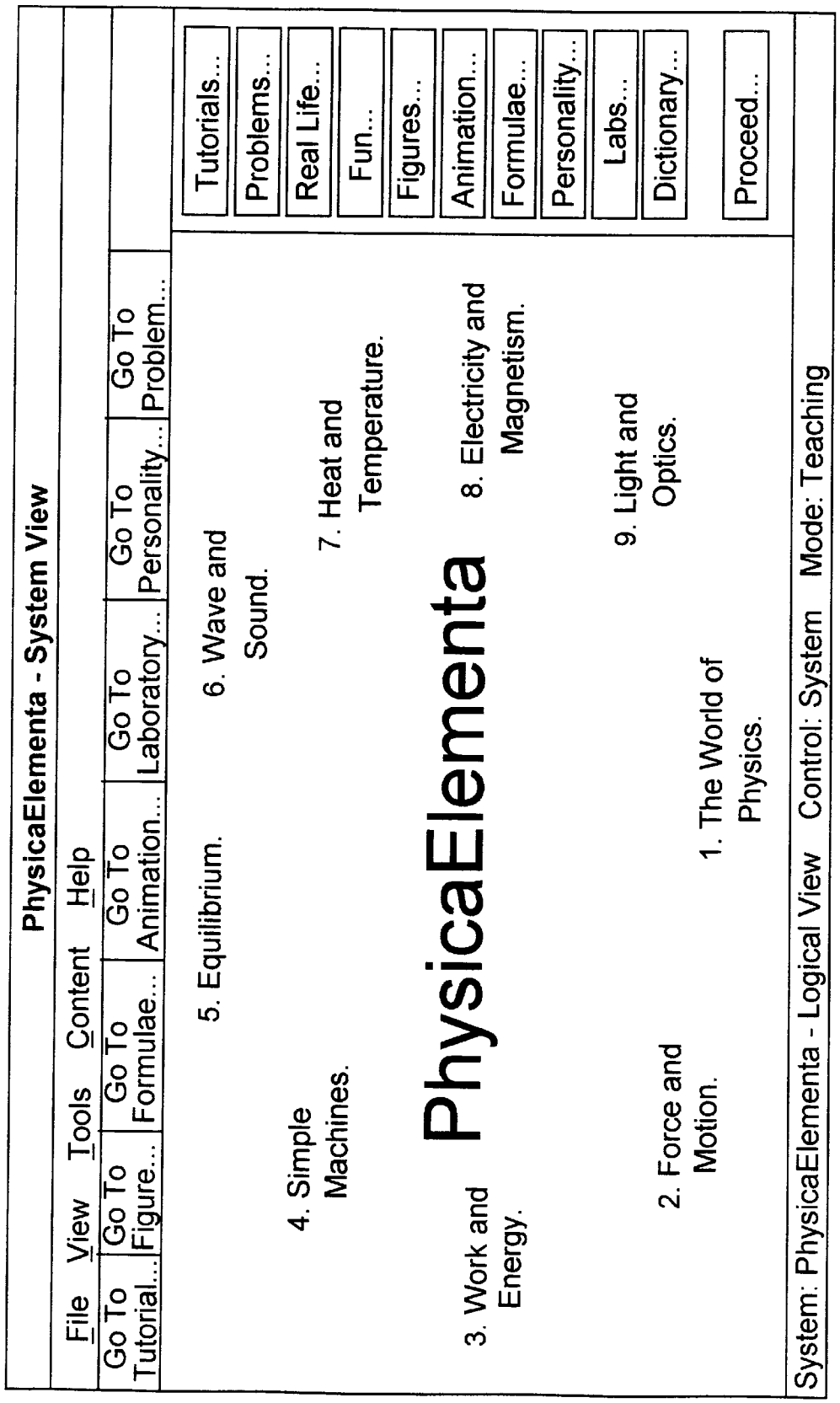
FIG. 75 is an example of the System View screen for the Knowledge Domain of Physics.
Figure 75A:
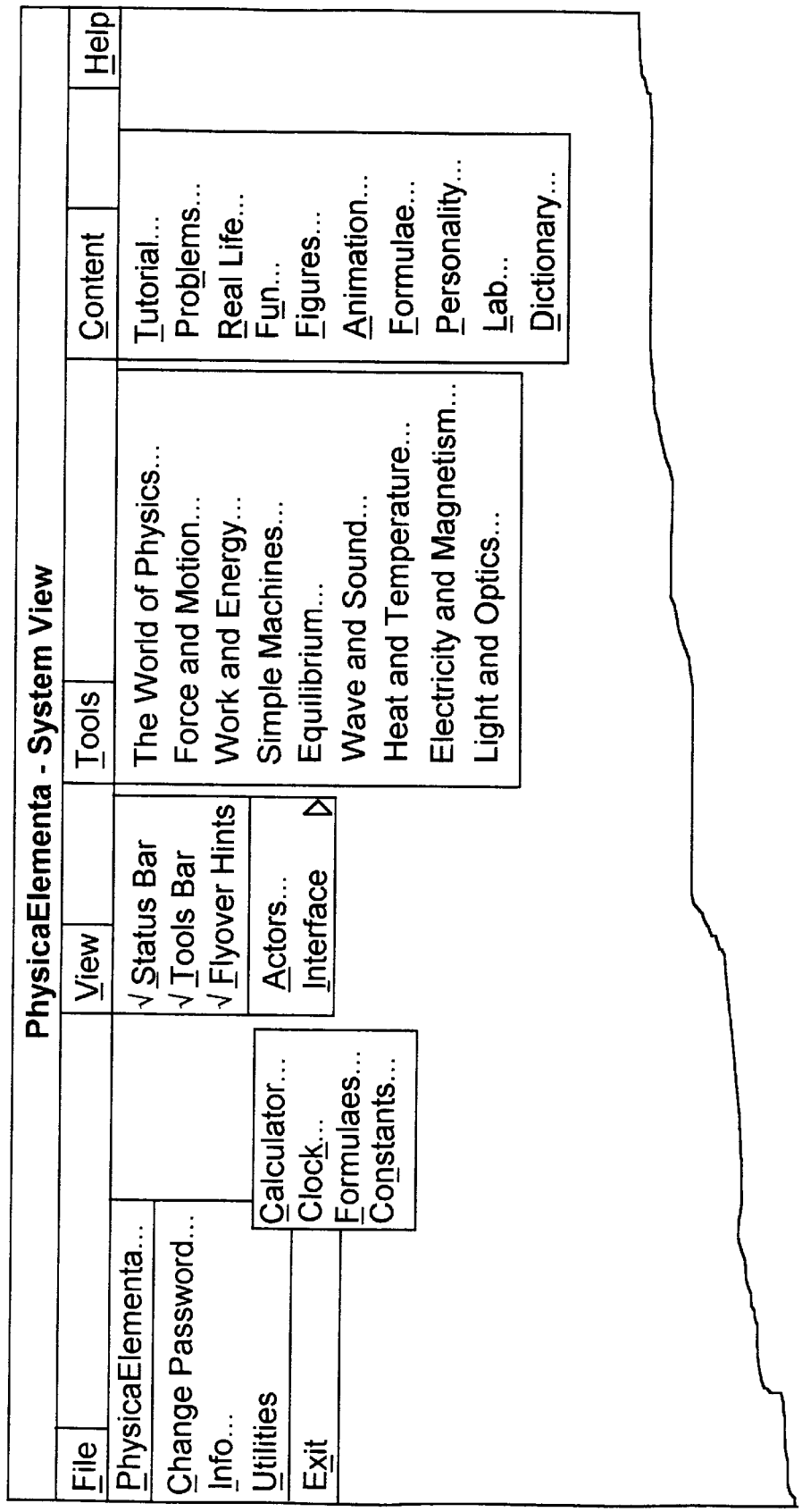
FIG. 75*a* shows the means available from the System View screen presented by FIG. 75.
Figure 76:
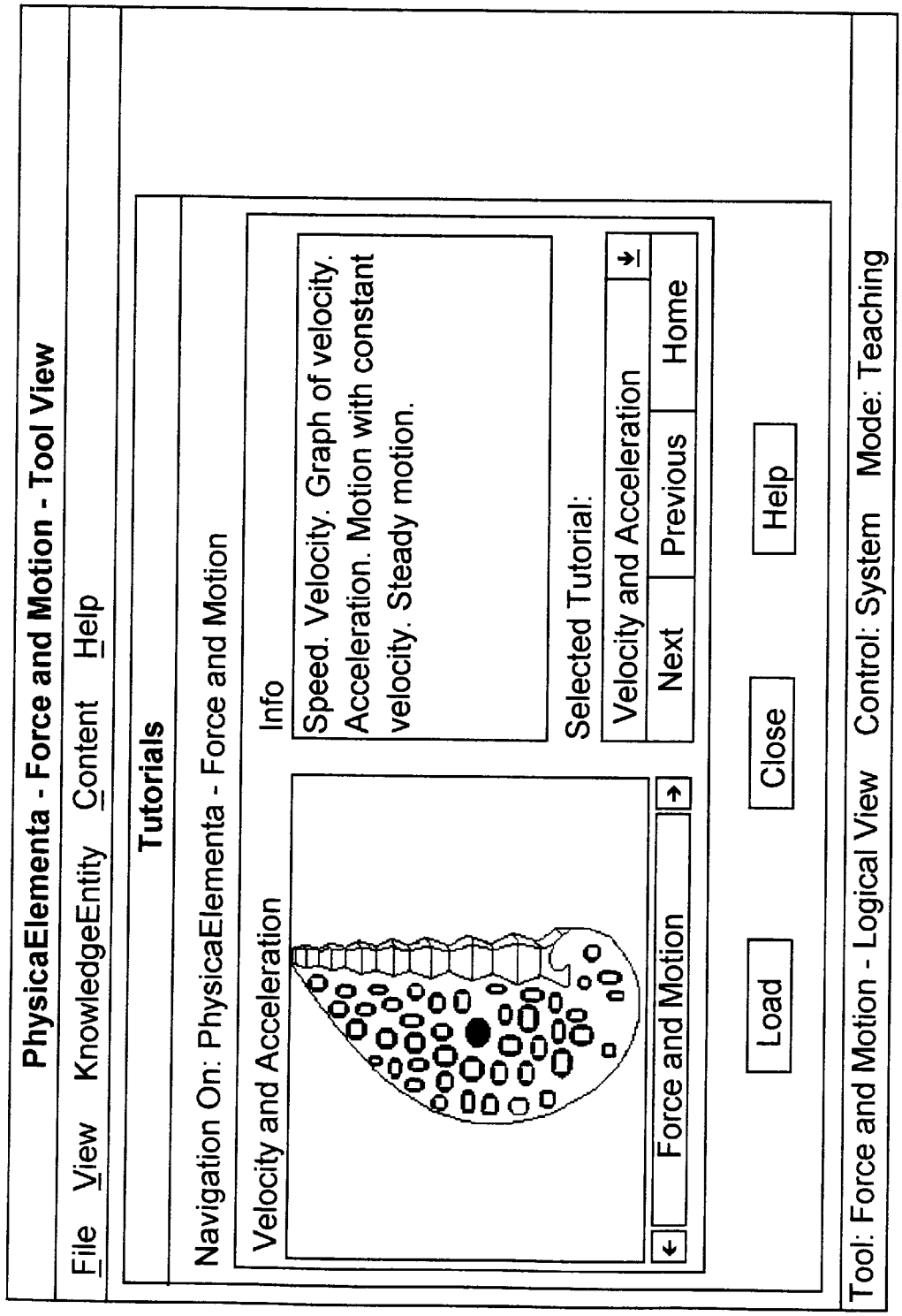
FIG. 76 is an example of the Tool View screen for the Knowledge Domain of Physics.
Figure 76A:
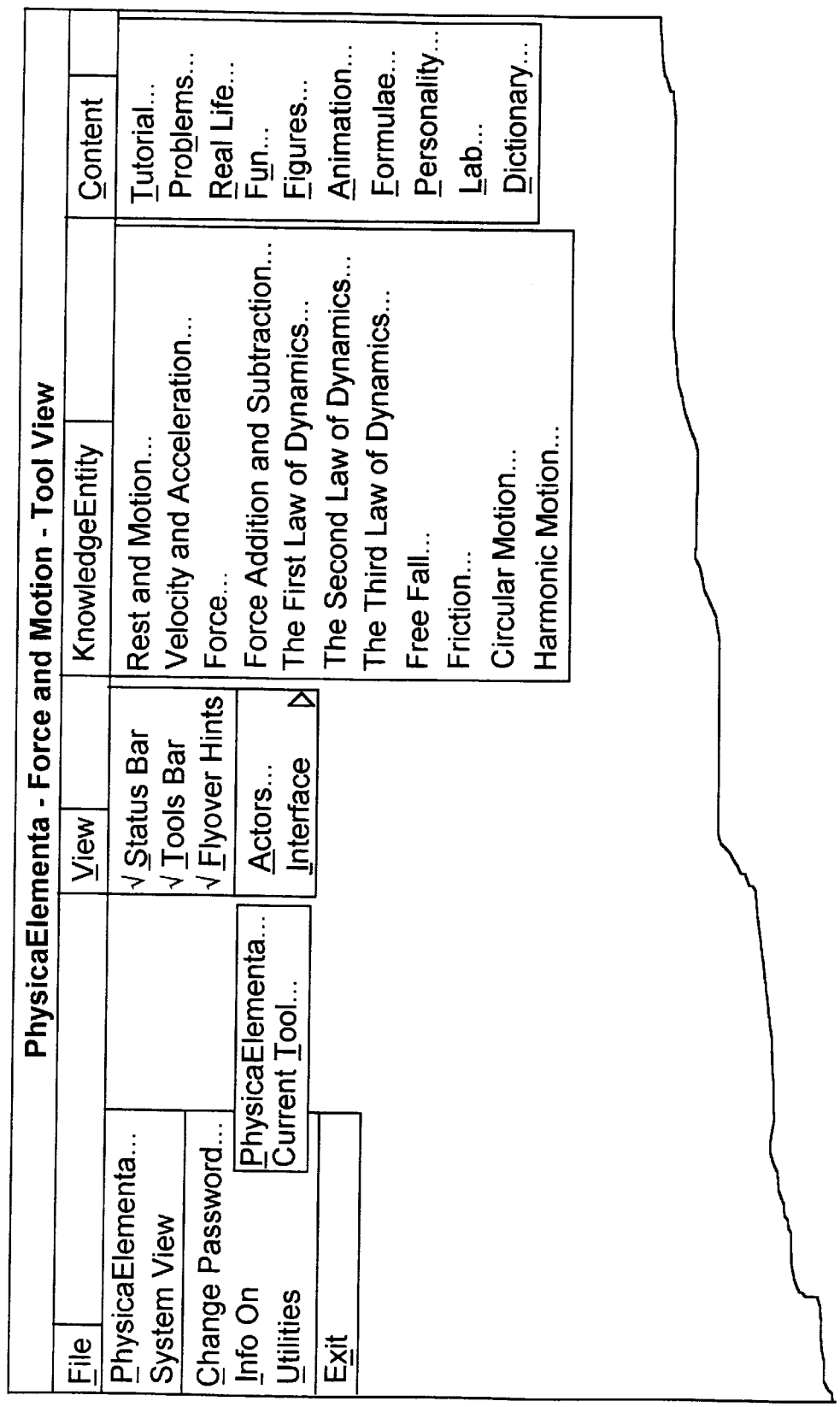
FIG. 76*a* shows the means available from the Tool View screen presented by FIG. 76.
Figure 77:
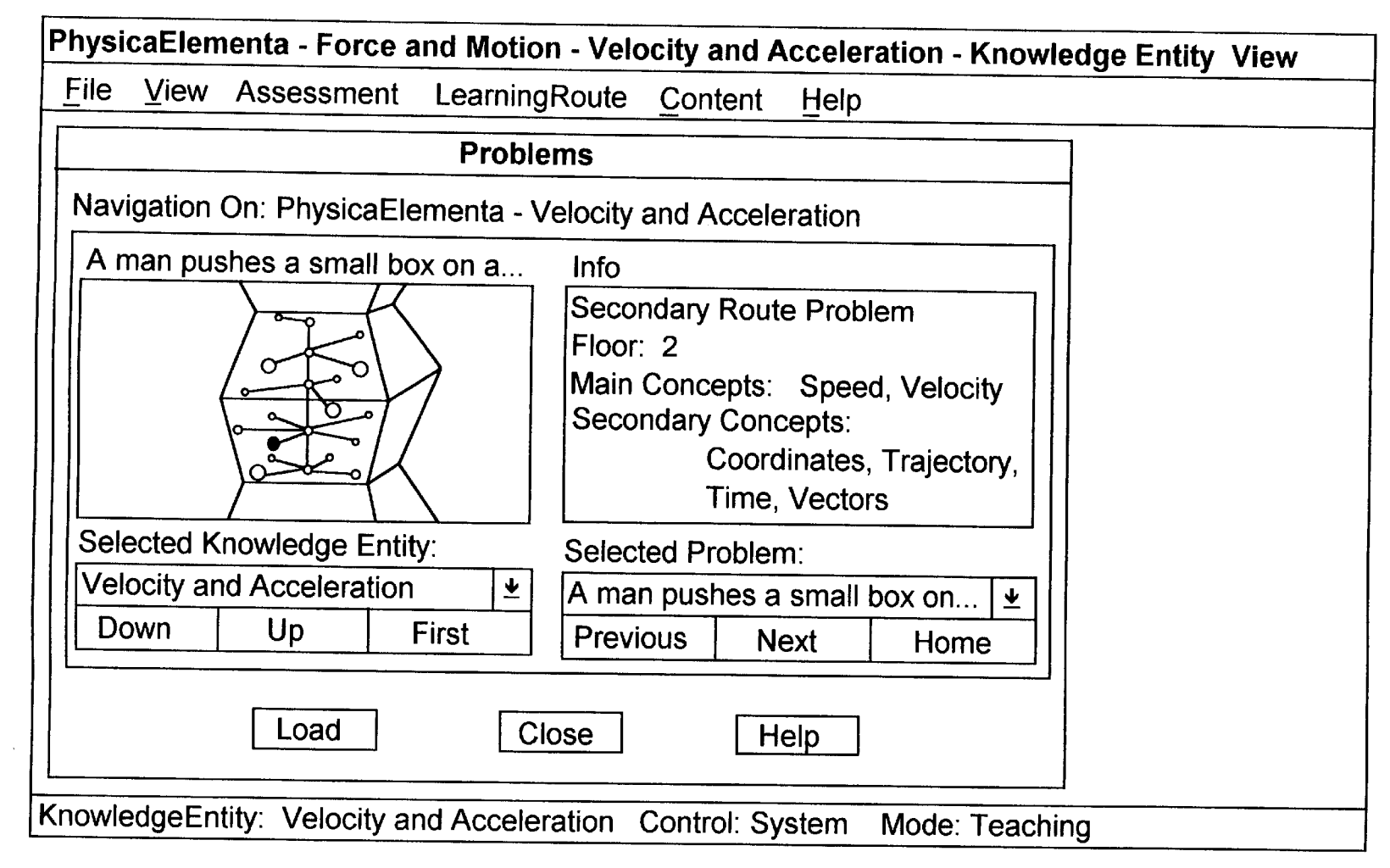
Figure 77A:
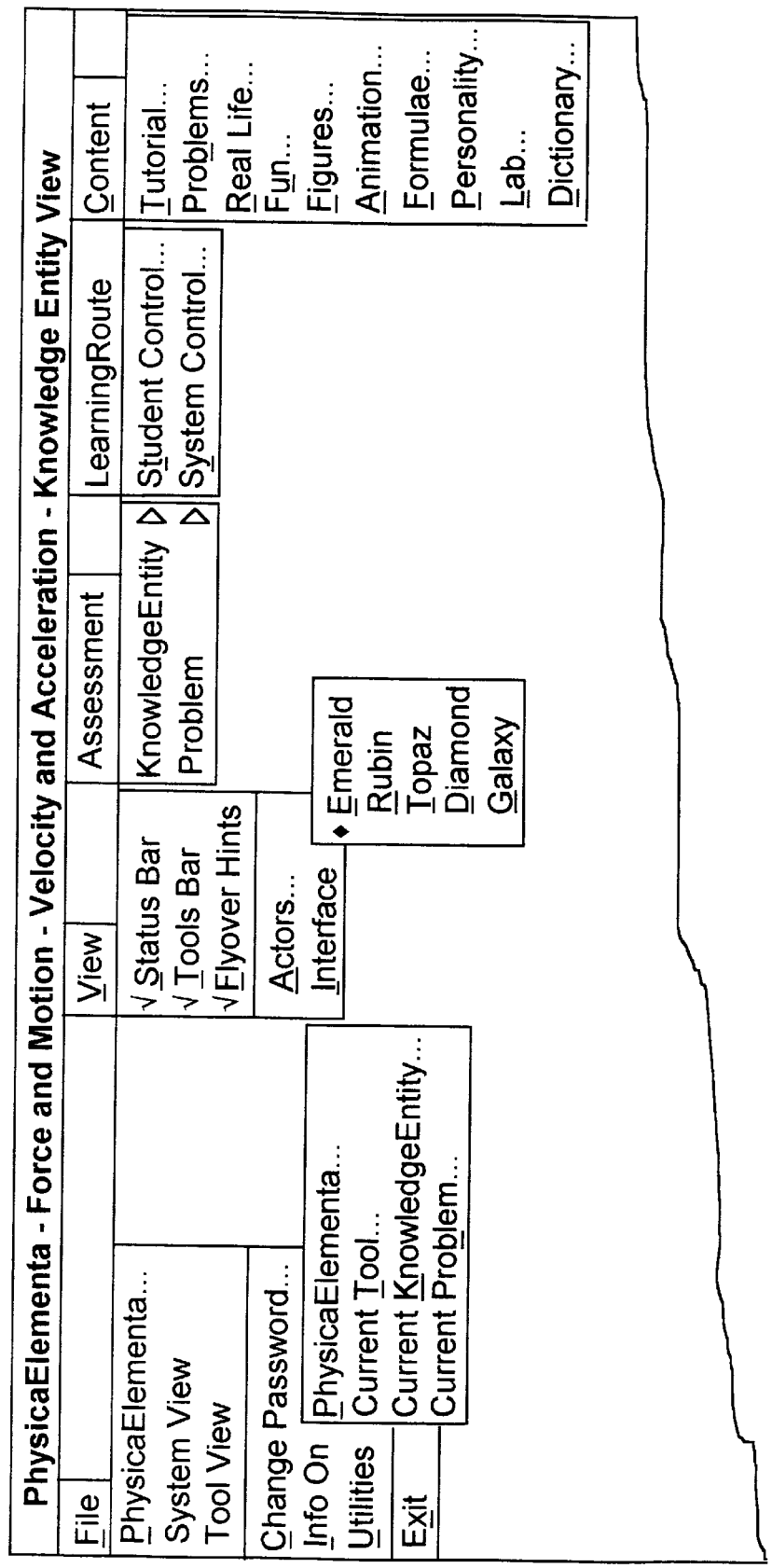
FIG. 77*a* shows the means available from the Knowledge Entity View screen depicted by FIG. 77.
Figure 78:
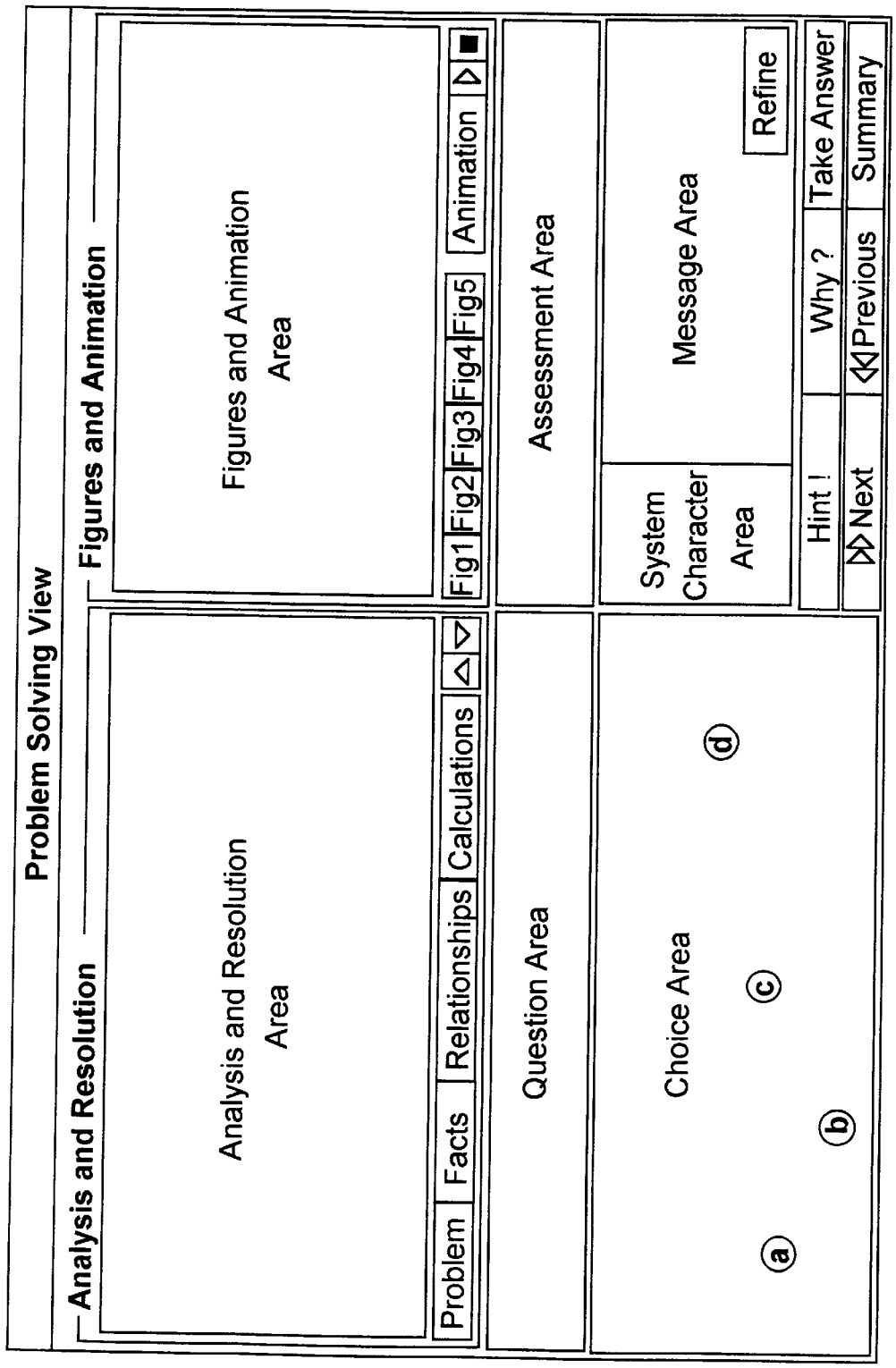
FIG. 78 is an example of the Interactive Problem Solving View screen
Figure 79:
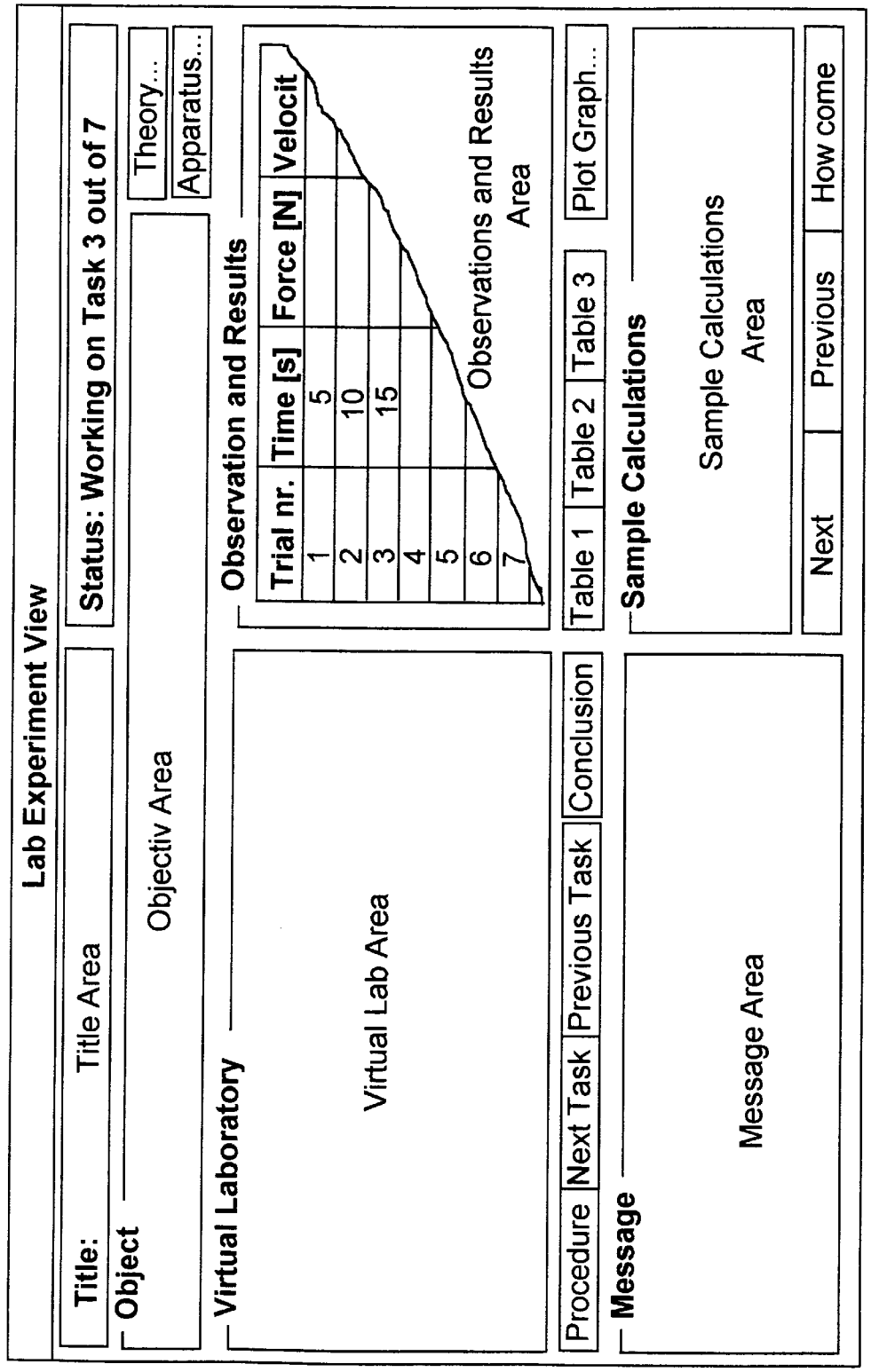
FIG. 79 is an example of the Interactive Lab Experiment View screen.

FIG. 75 to FIG. 79 are implementation examples of an embodiment of the present invention (captured in a static state) for the knowledge domain of Physics. FIG. 75 is the System View screen and FIG. 75a shows the entries available from each menu depicted by FIG. 75. FIG. 76 is the Tool View screen of the Force and Motion tool during a navigation activity. FIG. 76a shows the entries available from each menu depicted by FIG. 76. Next, FIG. 77 is the Knowledge Entity View screen of the Velocity and Acceleration during a navigation activity. FIG. 77a shows the entries available from each menu depicted by FIG. 77. Next, FIG. 78 is the Problem Solving View screen along with all relevant areas and means to generate specific events. FIG. 78a shows the Problem Solving View screen during the Problem Solving Process (at question 4). Finally, FIG. 79 is the Lab Experiment View screen and its relevant areas.

It should be noted that while particular embodiments of the present invention have been shown and described, it will be obvious to those skilled in the art that various changes and modifications may be made without departing from the present invention in its broader aspects. Therefore, it is the object of the appended claims to cover all such variations and modifications as come within the true spirit and scope of the present invention.

We claim:

1. A processing method for use in a computerized learning machine including an information processing device, a storage device, an output device and an input device, the processing method comprising the steps of:

a) retrieving from the storage device a first problem, the problem having a plurality of questions, each question having a concept and a plurality of answers;

b) outputting to the output device the problem;

c) outputting to the output device a question and the associated possible answers;

d) receiving from the input device an answer selection;

e) assigning a fuzzy logic coefficient to the answer, the fuzzy logic coefficient being related to the correctness of the answer;

f) if the fuzzy logic coefficient does not indicate a fully correct answer, outputting to the output device the other possible answers;

g) receiving from the input device an answer selection;

h) averaging the fuzzy logic coefficients of the answers;

i) repeating steps c) to h) for the remaining questions;

j) for each question, accessing from the storage device a learning route authority to determine the identity of at least one further problem, the determination being dependent on the average fuzzy logic coefficient and concept associated with the question;

k) repeating steps a) to j) for each problem determined in step j).

2. A processing method as defined in claim 1, further comprising the steps of:

l) accessing from the storage device a learning route authority to determine a second problem, the second problem being more advanced than the first problem; and m) repeating steps a) to l) for the second problem.

3. A processing method as defined in claim 2, wherein the problems are analytical type problems.

4. A processing method as defined in claim 2, wherein the problems are experimental type problems.

5. A processing method as defined in claim 2, wherein the problems are logical type problems.

6. A computerized learning machine including an information processing device, a storage device, an output device and an input device, wherein adaptive problem solving is implemented by:

a) retrieving from the storage device a first problem, the problem having a plurality of questions, each question having a concept and a plurality of answers;

b) outputting to the output device the problem;

c) outputting to the output device a question and the associated possible answers;

d) receiving from the input device an answer selection;

e) assigning a fuzzy logic coefficient to the answer, the fuzzy logic coefficient being related to the correctness of the answer;

f) if the fuzzy logic coefficient does not indicate a fully correct answer, outputting to the output device the other possible answers;

g) receiving from the input device an answer selection;

h) averaging the fuzzy logic coefficients of the answers;

i) repeating steps c) to h) for the remaining questions;

j) for each question, accessing from the storage device a learning route authority to determine the identity of at least one further problem, the determination being dependent on the average fuzzy logic coefficient and concept associated with the question;

k) repeating steps a) to j) for each problem determined in step j).

7. A computerized learning machine as defined in claim 6, wherein adaptive problem solving is implemented by, in addition:

l) accessing from the storage device a learning route authority to determine a second problem, the second problem being more advanced than the first problem; and m) repeating steps a) to l) for the second problem.

8. A machine as defined in claim 7, further comprising outputting to the output device feedback on the performance of the user.

9. A machine as defined in claim 8, wherein the feedback is visual.

10. A machine as defined in claim 7, further comprising outputting to the output device means for visualizing outputted problems.

11. A machine as defined in claim 8, wherein the feedback is audio.

* * * * *